(12) United States Patent
Amemiya

(10) Patent No.: US 10,292,181 B2
(45) Date of Patent: May 14, 2019

(54) INFORMATION COMMUNICATION METHOD AND INFORMATION PROCESSING APPARATUS

(71) Applicant: FUJITSU LIMITED, Kawasaki-shi, Kanagawa (JP)

(72) Inventor: Kouichirou Amemiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 14/632,309

(22) Filed: Feb. 26, 2015

(65) Prior Publication Data
US 2015/0264713 A1 Sep. 17, 2015

(30) Foreign Application Priority Data
Mar. 11, 2014 (JP) .................................. 2014-048196

(51) Int. Cl.
*H04W 74/04* (2009.01)

(52) U.S. Cl.
CPC .................................. *H04W 74/04* (2013.01)

(58) Field of Classification Search
None
See application file for complete search history.

(56) References Cited

U.S. PATENT DOCUMENTS

| 6,778,557 B1 | 8/2004 | Yuki et al. | |
| 8,837,398 B2 * | 9/2014 | Yuan | H04W 72/1289 370/329 |
| 2004/0032847 A1 * | 2/2004 | Cain | H04B 7/2643 370/338 |

(Continued)

FOREIGN PATENT DOCUMENTS

| JP | 2000-270010 | 9/2000 |
| JP | 2007-523513 A | 8/2007 |

(Continued)

OTHER PUBLICATIONS

Japanese Office Action dated Jul. 4, 2017 in Japanese Patent Application No. 2014-046196 (with unedited computer generated English translation).

*Primary Examiner* — Jeffrey M Rutkowski
*Assistant Examiner* — Mehedi S Aley
(74) *Attorney, Agent, or Firm* — Xsensus LLP

(57) ABSTRACT

A first information processing apparatus transmits a first transmission schedule for one or more data blocks to a second information processing apparatus that is a transmission destination of the one or more data blocks. The second information processing apparatus receives the first transmission schedule from the first information processing apparatus, and determines a second transmission schedule for at least one data block among the one or more data blocks that are defined in the first transmission schedule, based on the first transmission schedule and receiving resources of the second information processing apparatus, and transmits the second transmission schedule to the first information processing apparatus. The first information processing apparatus receives the second transmission schedule from the second information processing apparatus, and transmits one or plural data blocks that are defined in the second transmission schedule, based on the second transmission schedule to the second information processing apparatus.

9 Claims, 54 Drawing Sheets

(56) References Cited

U.S. PATENT DOCUMENTS

| | | | |
|---|---|---|---|
| 2005/0094642 A1 | 5/2005 | Rogers | |
| 2005/0286422 A1* | 12/2005 | Funato | H04L 29/06027 |
| | | | 370/235 |
| 2008/0075006 A1* | 3/2008 | Morita | H04W 28/22 |
| | | | 370/232 |
| 2009/0238130 A1* | 9/2009 | Nakatsugawa | H04W 74/06 |
| | | | 370/329 |
| 2011/0319072 A1* | 12/2011 | Ekici | H04W 48/18 |
| | | | 455/426.1 |
| 2012/0051316 A1* | 3/2012 | Yajima | H04W 72/1289 |
| | | | 370/329 |
| 2012/0287913 A1* | 11/2012 | Lee | H04W 72/1252 |
| | | | 370/337 |
| 2013/0003678 A1* | 1/2013 | Quan | H04W 72/04 |
| | | | 370/329 |
| 2013/0294234 A1 | 11/2013 | Thapliya et al. | |
| 2013/0332502 A1 | 12/2013 | Amemiya et al. | |
| 2016/0337167 A1* | 11/2016 | Kawato | H04L 67/06 |

FOREIGN PATENT DOCUMENTS

| | | |
|---|---|---|
| JP | 2011-61869 | 3/2011 |
| JP | 2013-236182 A | 11/2013 |
| JP | 2013-254311 | 12/2013 |

* cited by examiner

| Data ID | ID OF Data ($d_j$) |
|---|---|
| Destination | ID OF DESTINATION NEXT Node OF Data |
| Data | Data BODY |

FIG.6

| Data ID | ID OF Data ($d_j$) |
|---|---|
| Destination | ID OF DESTINATION NEXT Node OF Data |
| E2E Time Limit | DELIVERY TIME LIMIT OF DATA $d_j$ |
| Data | Data BODY |

FIG.7

| Data ID | End to End Latency Requirement |
|---|---|
| ID OF Data ($d_j$) | LATENCY ($t_{lim,j}$) |

FIG.8

| Link ID | Source | Destination | Link Latency |
|---|---|---|---|
| ID OF LINK ($L_{x,y}$) | ID ($Nd_s$) | ID ($Nd_d$) | LATENCY ($Nd_s$ TO $Nd_d$) |

FIG.9

| Data ID | Transfer Route |
|---|---|
| ID OF Data ($d_j$) | ($[L_{1,2}, L_{2,3}, ..., L_{n-1,n}]$) |

FIG.10

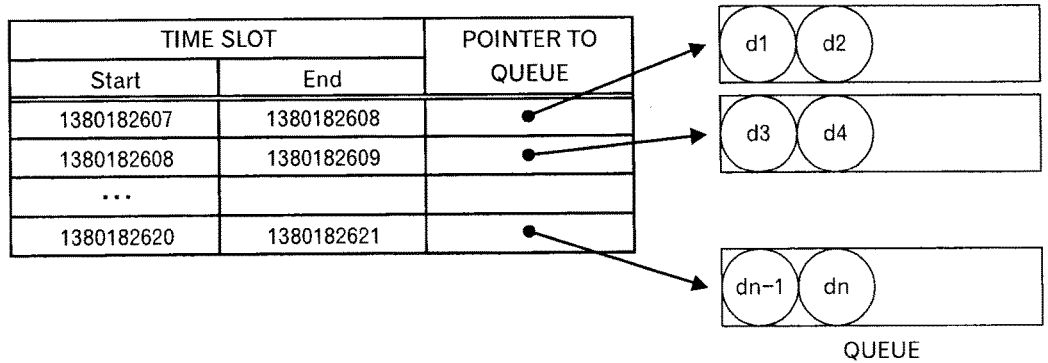

FIG.11A

| data_id | End to end time limit | Node local time limit | data |
|---|---|---|---|
| ID OF Data | DELIVERY TIME LIMIT | TRANSMISSION TIME LIMIT AT NODE | DATA BODY/LINK |

FIG.11B

| data_id | End to end time limit | Node local time limit |
|---|---|---|
| ID OF Data | DELIVERY TIME LIMIT | TRANSMISSION TIME LIMIT AT Node |

FIG.13

| Node ID | Schedule request Message | Fixed Schedule |
|---|---|---|
| ID OF Node OF SCHEDULING REQUESTING SOURCE ($Nd_x$) | BODY OF SCHEDULING REQUEST OR LINK TO SCHEDULING REQUEST | SCHEDULING RESULT OF Node x |

FIG.14

| From | TRANSMISSION SOURCE Node ID | |
|---|---|---|
| To | DESTINATION Node ID | |
| Time slot 1 | IDENTIFICATION INFO. OF Time slot 1 REQUESTED TO USE RESOURCES | |
| Data | INFO. OF data WHOSE TRANSMISSION IS REQUESTED IN Time slot 1 | |
| | Data1-1 | Data_id | ID OF Data |
| | | E2E time limit | DELIVERY TIME LIMIT |
| | | Local time limit | TRANSMISSION TIME LIMIT |
| | Data1-2 | ditto | |
| | ... | | |
| | Data1-n | | |
| Time slot 2 | IDENTIFICATION INFO. OF Time slot 2 REQUESTED TO USE RESOURCES | |
| Data | INFO. OF data WHOSE TRANSMISSION IS REQUESTED IN Time slot 2 | |
| | Data2-1 | ditto | |
| | ... | | |
| | Data2-n | | |

FIG.17

```
{
 From: Nd_a,
 To: Nd_b,
 Scheduling_window: {
    1380182607-1380182608: [
      {data_id: 'd_1', e2e_limit: 1380182637, local_limit: 1380182617},
      {data_id: 'd_2', e2e_limit: 1380182617, local_limit: 1380182612}
    ],
    1380182608-1380182609: [
      {data_id: 'd_3', e2e_limit: 1380182628, local_limit: 1380182618},
      {data_id: 'd_4', e2e_limit: 1380182638, local_limit: 1380182628}
    ],
    ...
    1380182620-1380182621: [
      {data_id: 'd_n-1', e2e_limit: 1380182629, local_limit: 1380182625},
      {data_id: 'd_n', e2e_limit: 1380182640, local_limit: 1380182630}
    ]
 }
}
```

FIG.18

NODE A
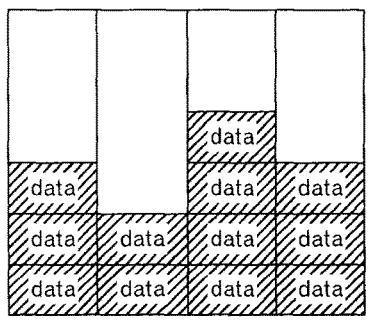
NODE B
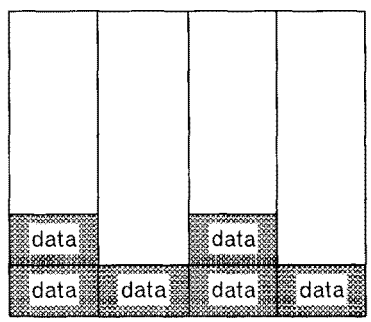
NODE C
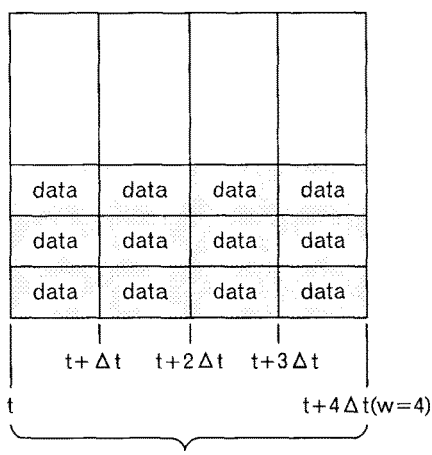
SCHEDULING WINDOW
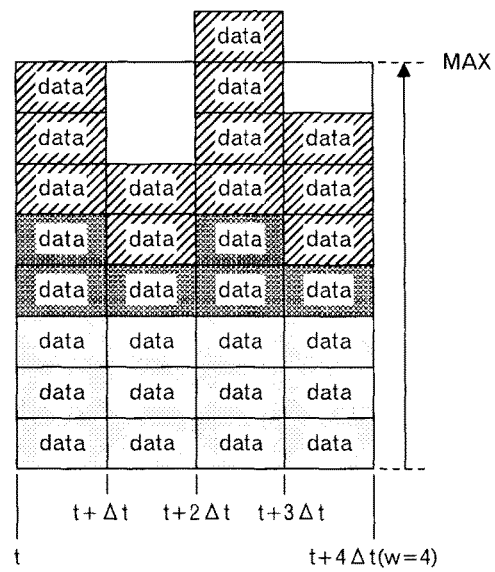
FIG.22

FIG.29

| Link ID | Source | Destination | Link Capacity |
|---|---|---|---|
| ID ($L_{x,y}$) OF LINK | ID ($Nd_s$) OF TRANSMISSION SOURCE Node | ID ($Nd_d$) OF TRANSMISSION DESTINATION Node | Link BANDWIDTH [bps] ($Nd_s$ TO $Nd_d$) |

FIG.30

| data_id | End to end time limit | Node local time limit | data size | data |
|---|---|---|---|---|
| ID OF Data | DELIVERY TIME LIMIT | TRANSMISSION TIME LIMIT AT THIS NODE | SIZE OF DATA (bytes) | DATA BODY/LINK |

| From | TRANSMISSION SOURCE Node ID | |
|---|---|---|
| To | DESTINATION Node ID | |
| Time slot 1 | IDENTIFICATION INFO. OF Time slot 1 REQUESTED TO USE RESOURCES | |
| Data | INFO. OF data WHOSE TRANSMISSION IS REQUESTED IN Time slot 1 | |
| | Data1-1 | Data_id | ID OF Data |
| | | E2E time limit | DELIVERY TIME LIMIT |
| | | Local time limit | TRANSMISSION TIME LIMIT |
| | | Data size(ds) | SIZE OF Data [bytes] |
| | Data1-2 | ditto | |
| | ... | | |
| | Data1-n | | |
| Time slot 2 | IDENTIFICATION INFO. OF Time slot 2 REQUESTED TO USE RESOURCES | |
| Data | INFO. OF data WHOSE TRANSMISSION IS REQUESTED IN Time slot 2 | |
| | Data2-1 | ditto | |
| | ... | | |
| | Data2-n | | |

FIG.33

```
{
  From: Nd_a,
  To: Nd_b,
  Scheduling_window: {
    1380182607-1380182608: [
      {data_id: 'd_1', e2e_limit: 1380182637, local_limit: 1380182617, ds: 1024},
      {data_id: 'd_2', e2e_limit: 1380182617, local_limit: 1380182612, ds: 10240}
    ],
    1380182608-1380182609: [
      {data_id: 'd_3', e2e_limit: 1380182628, local_limit: 1380182618, ds: 128},
      {data_id: 'd_4', e2e_limit: 1380182638, local_limit: 1380182628, ds: 512}
    ],
    ...
    1380182620-1380182621: [
      {data_id: 'd_n-1', e2e_limit: 1380182629, local_limit: 1380182625, ds: 2048},
      {data_id: 'd_n', e2e_limit: 1380182640, local_limit: 1380182630, ds: 1048576}
    ]
  }
}
```

FIG.34

| Time Slot | Maximum Resources |
|---|---|
| Δt | MAXIMUM NO. OF TRANSMITTABLE MESSAGES |

FIG.48

| Time Slot | Maximum Resources [bit] |
|---|---|
| Δt | MAXIMUM NO. OF TRANSMITTABLE BITS |

FIG.51

INFORMATION COMMUNICATION METHOD AND INFORMATION PROCESSING APPARATUS

CROSS-REFERENCE TO RELATED APPLICATIONS

This application is based upon and claims the benefit of priority of the prior Japanese Patent Application No. 2014-048196, filed on Mar. 11, 2014, the entire contents of which are incorporated herein by reference.

FIELD

This invention relates to a scheduling technique of data transmission among nodes.

BACKGROUND

Various devices that generate data are distributedly deployed. For example, a smart phone generates log data of the Global Positioning System (GPS), pictures, videos and the like, and a sensor device generates monitoring data. Such data is collected through a network including plural nodes, and is used by applications used by an end user and/or is used for control based on the monitoring.

A specific example of such a system is a disaster alert system. In this system, measurement data is always collected from a water level sensor of a river, an accelerometer or the like, and when a value of the measurement data exceeds a threshold, an alert is issued. In such a system, it is desired that a dangerous state that the value of the measurement data exceeds the threshold is recognized soon and is notified to citizens.

Moreover, a certain document discloses a system for delivering an appropriate advertisement according to properties and/or a state of a user such as a behavioral targeting advertising system. This is a system to display a recommended advertisement by a human preference (e.g. purchase history), a temperature of a location and/or the like. For example, when an advertisement content that corresponds to the preference of the purchaser and/or the temperature is displayed by a vending machine that has a display device, an identifier of the purchaser is obtained, and then, the advertisement content is delivered from the content delivery server in a short time to cause the display device of the vending machine to display the advertisement. Therefore, a transmission time is calculated based on the arrival time limit to the vending machine, the time required for data transmission and the like, and the data transmission is performed according to the calculated transmission time. However, when the same transmission time is calculated for a lot of data, the congestion occurs.

Moreover, another certain document discloses a communication system to communicate through a transmission line between a main apparatus and plural sub-apparatuses. Then, the sub-apparatus transmits an information amount of an information signal to be transmitted through the transmission line to the main apparatus, and the main apparatus calculates an information amount of information that the sub-apparatus can transmit based on the information amount received from the sub-apparatus, and transmits the calculated information amount to the sub-apparatus. In response to this, when the sub-apparatus receives the information amount of information that the sub-apparatus can transmit, the sub-apparatus transmits an information signal having the received information amount.

The main apparatus in such a communication system determines the information amount of the information that the sub-apparatus can transmit, only based on the received information amount, and cannot determine contents of information to be transmitted by the sub-apparatus, individually. Therefore, the transmission to the main apparatus may be delayed.

Patent Document 1: Japanese Laid-open Patent Publication No. 2011-61869

Patent Document 2: Japanese Laid-open Patent Publication No. 2000-270010

Patent Document 3: Japanese Laid-open Patent Publication No. 2013-254311

In other words, there is no conventional art that can sufficiently suppress the delay of the data transmission.

SUMMARY

An information communication method relating to a first aspect of this invention includes: (A) first transmitting, by a first information processing apparatus, a first transmission schedule for one or more data blocks to a second information processing apparatus that is a transmission destination of the one or more data blocks; (B) first receiving, by the second information processing apparatus, the first transmission schedule from the first information processing apparatus; (C) determining, by the second information processing apparatus, a second transmission schedule for at least one data block among the one or more data blocks that are defined in the first transmission schedule, based on the first transmission schedule and receiving resources of the second information processing apparatus; (D) second transmitting, by the second information processing apparatus, the second transmission schedule to the first information processing apparatus; (E) second receiving, by the first information processing apparatus, the second transmission schedule from the second information processing apparatus; and (F) third transmitting, by the first information processing apparatus, one or plural data blocks that are defined in the second transmission schedule, based on the second transmission schedule to the second information processing apparatus.

An information processing apparatus relating to a second aspect of this invention includes: a memory; and a processor configured to use the memory and execute a process including: (G) transmitting a first transmission schedule for one or more data blocks to an information processing apparatus that is a transmission destination of the one or more data blocks and determines a second transmission schedule for at least one data block among the one or more data blocks based on the first transmission schedule and receiving resources of the information processing apparatus; (H) receiving the second transmission schedule from the information processing apparatus; and (I) transmitting one or plural data blocks that are defined in the second transmission schedule, based on the second transmission schedule to the information processing apparatus.

An information processing apparatus relating to a third aspect of this invention includes: a memory; and a processor configured to use the memory and execute a process including: (J) receiving a first transmission schedule for one or more data blocks from an information processing apparatus that will transmit the one or more data blocks; (K) determining a second transmission schedule for at least one data block among the one or more data blocks that are defined in the first transmission schedule, based on the first transmission schedule and receiving resources; and (L) transmitting the second transmission schedule to the information processing apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a diagram to explain variables relating to the first embodiment and the like;

FIG. 6 is a diagram depicting a format example of a message received by the node relating to the first embodiment;

FIG. 7 is a diagram depicting a format example of the message received by the node relating to the first embodiment;

FIG. 8 is a diagram depicting a format example of data stored in a latency data storage unit;

FIG. 9 is a diagram depicting a format example of data stored in a link data storage unit;

FIG. 10 is a diagram depicting a format example of data stored in a data transfer route storage unit;

FIG. 11A is a diagram depicting a data structure example of a data queue;

FIG. 11B is a diagram depicting the data structure example of the data queue;

FIG. 13 is a diagram depicting a format example of data stored in the resource management data storage unit:

FIG. 14 is a diagram depicting a format example of data stored in a scheduling data storage unit;

FIG. 17 is a diagram depicting a data format example of a scheduling request;

FIG. 18 is a diagram depicting an example of the scheduling request in the JSON format;

FIG. 22 is a diagram to explain processing contents of a scheduling processing unit;

FIG. 29 is a diagram depicting a format example of data stored in the link data storage unit in a second embodiment;

FIG. 30 is a diagram depicting a format example of data stored in the data queue in the second embodiment;

FIG. 33 is a diagram depicting a data format example of a scheduling request in the second embodiment;

FIG. 34 is a diagram depicting a data format example of a scheduling request in the JSON format in the second embodiment;

FIG. 48 is a diagram depicting a format example of data stored in the resource data storage unit in the fourth embodiment;

FIG. 51 is a diagram depicting a format example of data stored in the resource data storage unit in a fifth embodiment;

DESCRIPTION OF EMBODIMENTS

Embodiment 1

Figure 1:
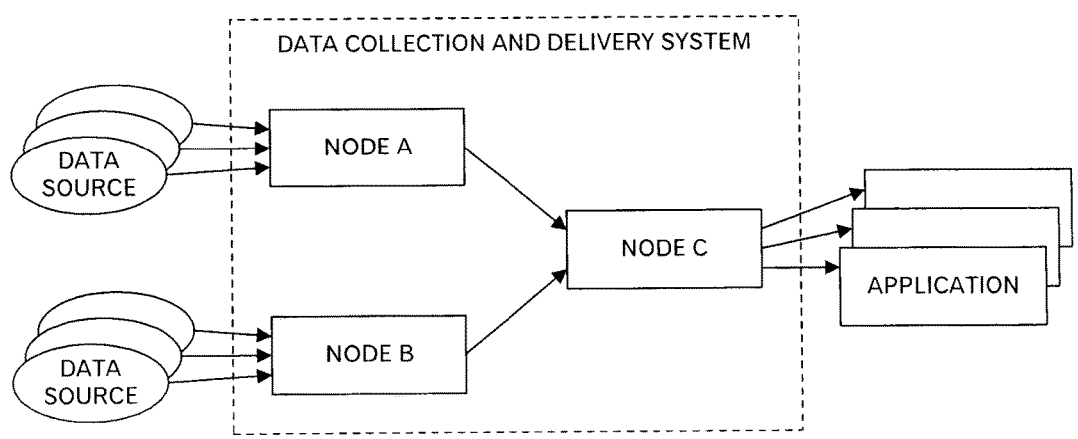
FIG. 1 is a diagram depicting an outline of a system relating to a first embodiment.

FIG. 1 illustrates an outline of a system relating to a first embodiment of this invention. A data collection and delivery system in FIG. 1 includes plural nodes A to C. The nodes A and B receive data from a data source such as a sensor, and transmit the received data to the node C. The node C outputs the received data to one or more applications that process the data.

The number of nodes included in the data collection and delivery system relating to this embodiment is not limited to "3", and the number of stages of nodes provided between the data source and the application is not limited to "2", and may be 2 or more. In other words, in this embodiment, nodes are connected so that plural stages of the nodes are made.

Here, definition of variables that will be used later is explained. In order to make it easy to understand the explanation, as illustrated in FIG. 2, the three-stage configuration of the nodes $Nd_a$ to $Nd_c$ is employed.

Figure 2:
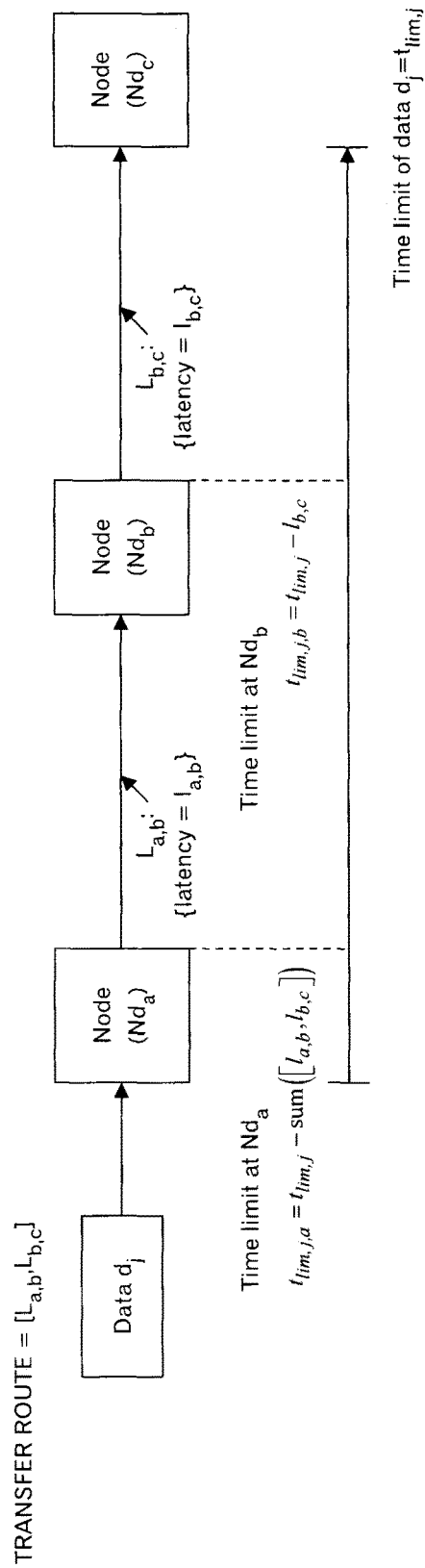

As illustrated in FIG. 2, a link $L_{a,b}$ is provided between the node $Nd_a$ and the node $Nd_b$, and a link $L_{b,c}$ is provided between the node $Nd_b$ and the node $Nd_c$. Moreover, data transfer latency of the link $L_{a,b}$ is represented as "$l_{a,b}$", and data transfer latency of the link $L_{b,c}$ is represented as "$l_{b,c}$".

At this time when a transfer route of data $d_j$ (whose data size is represented as $s_j$) as $[L_{a,b}, L_{b,c}]$, a time limit (called as "an arrival time limit" or "a delivery time limit") of the end-to-end from the node $Nd_a$ to the node $N_c$ is represented as "$t_{lim,j}$" in this embodiment. Moreover, the delivery time limit $t_{lim,j,a}$ of the data $d_j$ at the node $Nd_a$ becomes "$t_{lim,j}$−sum($[l_{a,b}, l_{b,c}]$)" ("sum" represents the total sum.). Similarly, the delivery time limit $t_{lim,j,b}$ of the data $d_j$ at the node $Nd_b$ becomes "$t_{lim,j}$−$l_{b,c}$".

The bandwidth (bit per second (bps)) of the link $L_{a,b}$ is represented as $c_{a,b}$.

Figure 3:
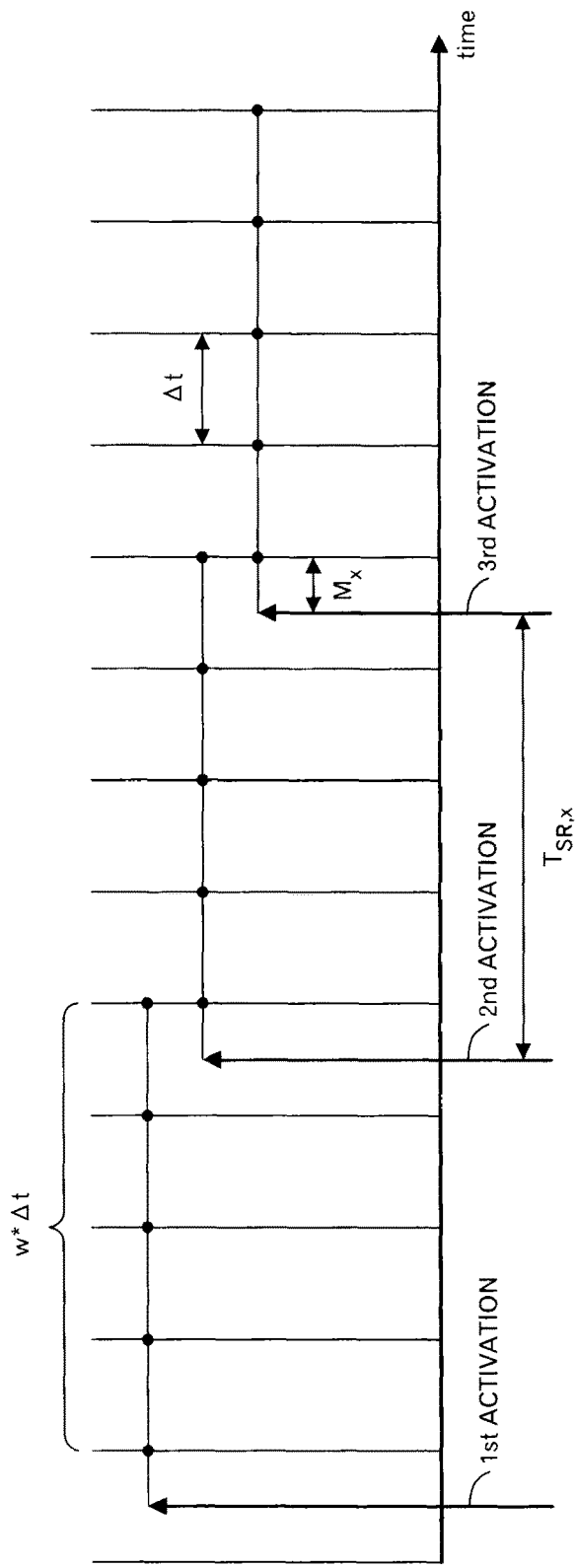
FIG. 3 is a diagram to explain time slots relating to the first embodiment.

In addition, time slots that will be described below are explained by using FIG. 3. The width of the time slot is represented by $\Delta t$, and the i-th time slot is represented as "$t_i$". Moreover, when the number of time slots that are scheduled once is represented as "w", the width of the scheduling (i.e. scheduling window) becomes $w\Delta t$. A cycle of a processing to send a scheduling request in the node $Nd_x$ (the interval between the first activation and the second activation, and the interval between the second activation and the third activation) is represented as "$T_{SR,x}$", and a difference between the activation of the processing to send the scheduling request and the beginning time of the scheduling window to be scheduled is represented as "$M_x$" in this embodiment. A cycle of a processing on a side that processes the scheduling request at the node $Nd_x$ is represented as "$T_{TLS-inter,x}$" in this embodiment.

Figure 4A:
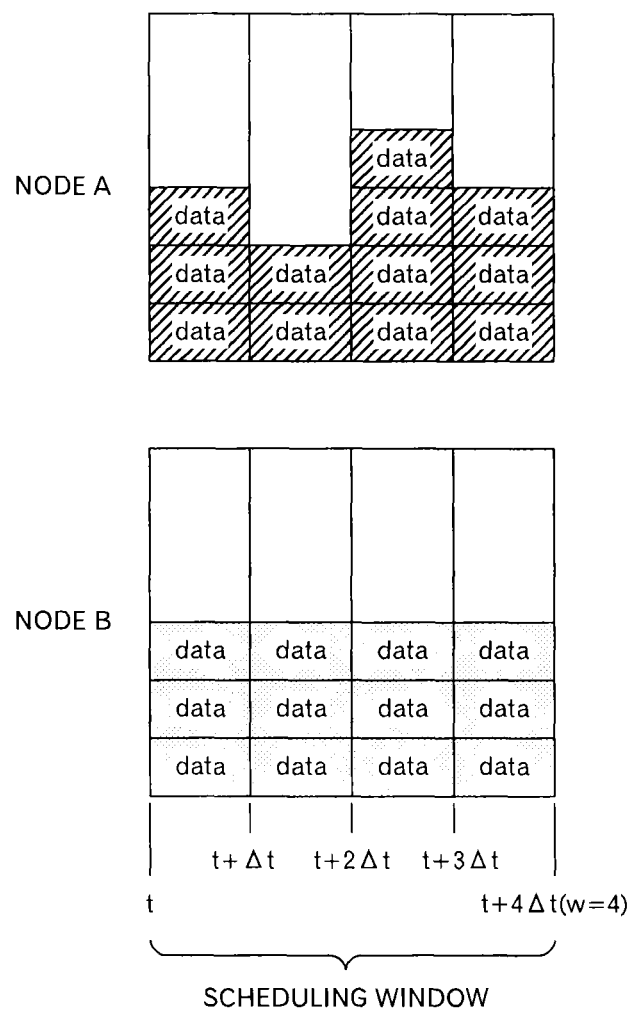
FIG. 4A is a diagram to explain a processing outline in the first embodiment.

In this embodiment, as illustrated in FIG. 4A, a transmission schedule at the node A and a transmission schedule at the node B are transmitted to the node C. The transmission schedule includes information concerning data to be transmitted in each slot within the scheduling window (here, w=4). Specifically, the transmission schedule includes the delivery time limit $t_{lim,j}$ up to the destination and the transmission time limit $t_{lim,j,x}$ at the node of the transmission source. FIG. 4A depicts data allocated to each of 4 time slots like a block, and hereinafter, a mass of data is called as "a data block" in this embodiment.

Figure 4B:
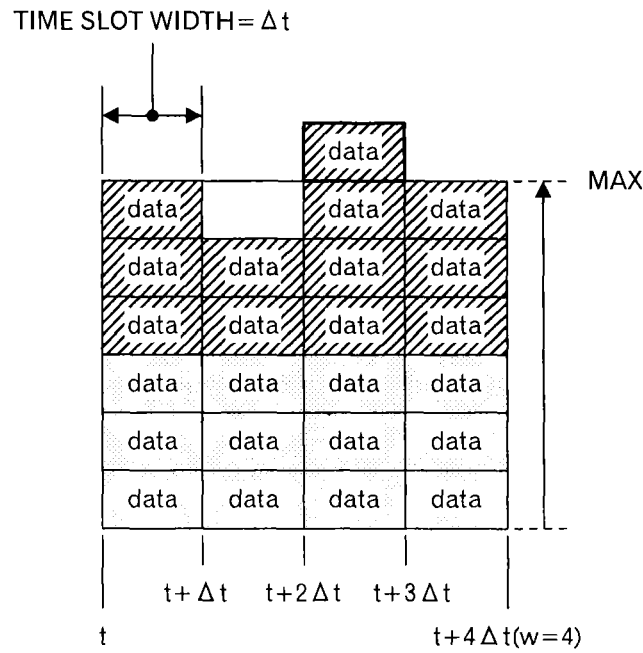
FIG. 4B is a diagram to explain the processing outline in the first embodiment.
Figure 4C:
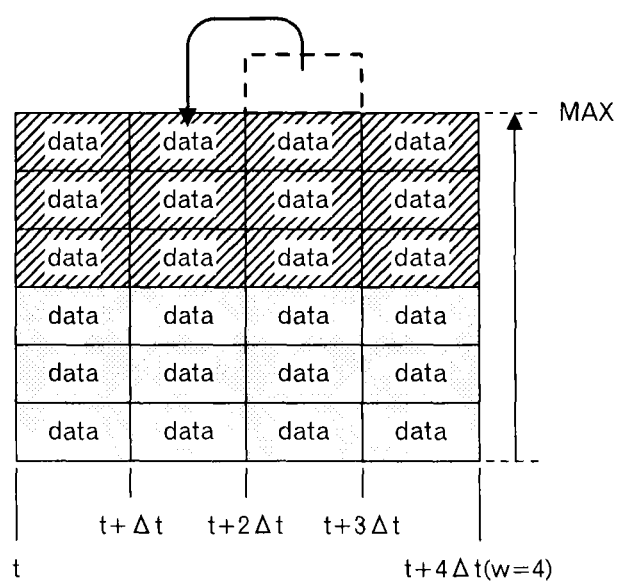
FIG. 4C is a diagram to explain the processing outline in the first embodiment.
Figure 4D:
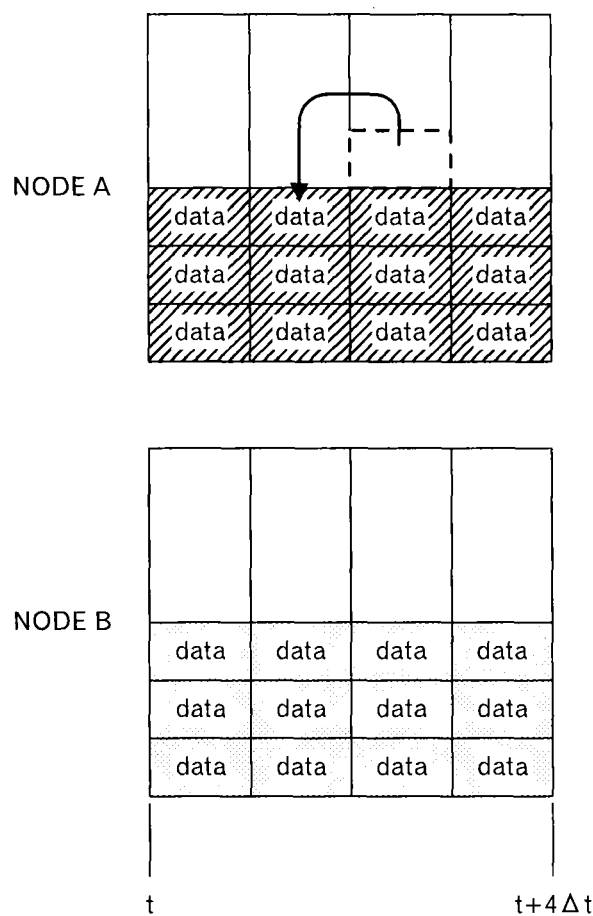
FIG. 4D is a diagram to explain the processing outline in the first embodiment.

When the node C receives the transmission schedule from the nodes A and B, the node C superimposes the transmission schedule as illustrated in FIG. 4B to determine whether or not the size of data to be transmitted is within receiving resources of the node C in each time slot. In an example of FIG. 4B, 6 data blocks can be received in one time slot. Therefore, in the third time slot, it can be understood that one data block cannot be received. Then, the data blocks allocated to the third time slot are sorted by $t_{lim,j,x}$ and $t_{lim,j}$ to give the data blocks their priorities. The node C selects a data block based on the priorities, and reallocates the selected data block to another time slot. Specifically, as illustrated in FIG. 4C, the node C allocates the selected data block to a time slot, which has a vacant receiving recourse, immediately before the third time slot. Then, the node C sends back such a scheduling result to the nodes A and B. As illustrated in FIG. 4D, the scheduling result of the node B is the same as the original transmission schedule, however, the scheduling result of the node A is different in the second time slot and the third time slot. The nodes A and B transmit data blocks according to such scheduling results.

Figure 5:
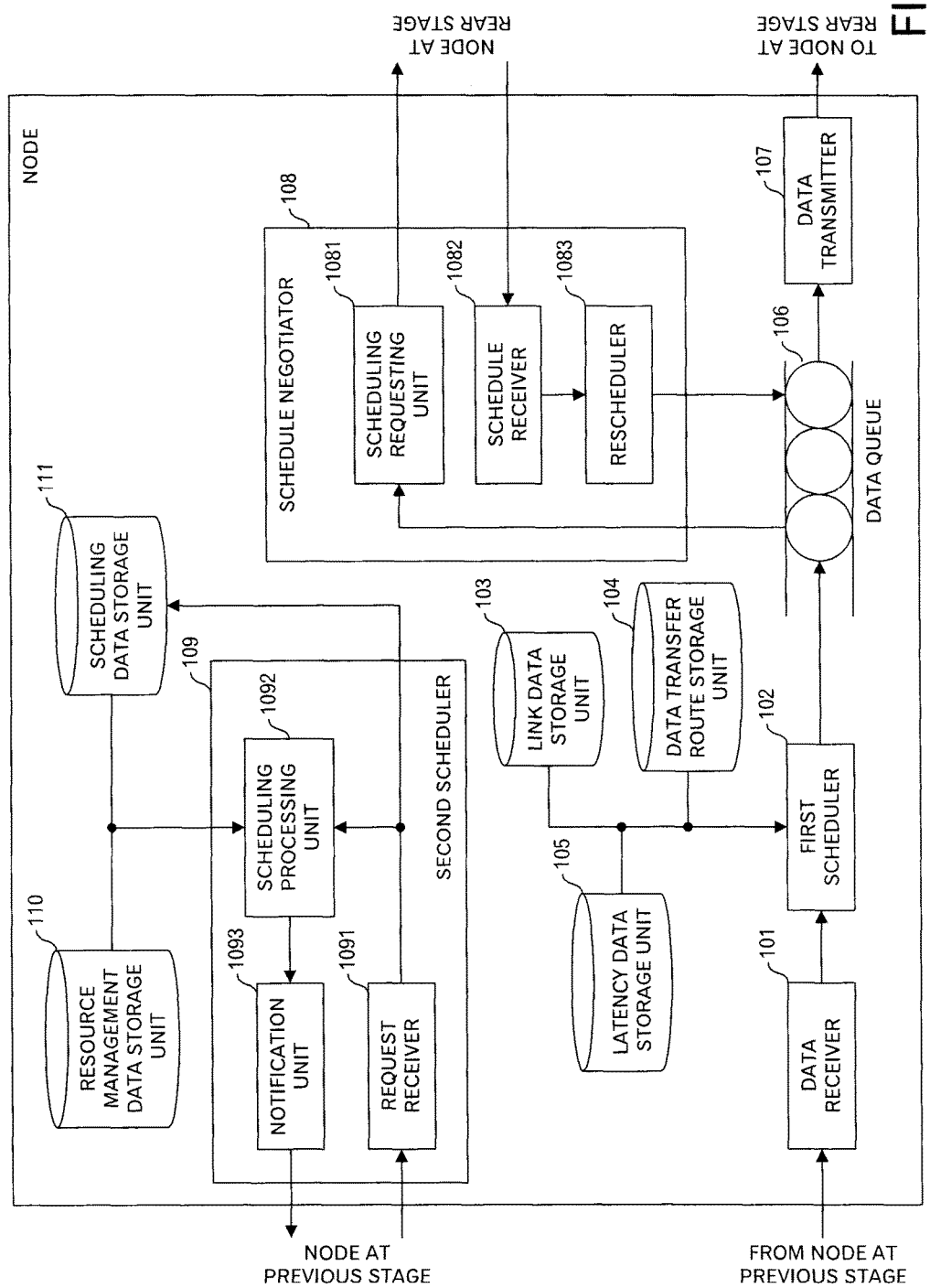
FIG. 5 is a diagram depicting a configuration example of a node relating to the first embodiment.

Next, FIG. 5 illustrates a configuration example of each of the nodes A to C to perform the processing as described above. The node has a data receiver 101, a first scheduler 102, a link data storage unit 103, a data transfer route storage unit 104, a latency data storage unit 105, a data queue 106, a data transmitter 107, a schedule negotiator 108, a second scheduler 109, a resource management data storage unit 110 and a scheduling data storage unit 111.

The data receiver 101 receives messages from other nodes or data sources. When the node itself performs a processing for data included in the message, a previous stage of the data receiver 101 performs the processing in this embodiment. In this embodiment, FIGS. 6 and 7 illustrate format examples of messages received by the data receiver 101. In case of the message received from the data source, as illustrated in FIG. 6, an ID ($d_j$) of data, an ID of a destination next node (i.e. a node of a direct transmission destination) of the data and a data body are included. The data body may include the ID of the data. Moreover, instead of the ID of the destination next node, a key to identify the destination next node may be included to identify the ID of the destination next node by using a data structure to identify, from the key, the ID of the destination next node.

In case of the message received from other nodes, as illustrated in FIG. 7, an ID of data, an ID of a destination next node of the data, a delivery time limit $t_{lim,j}$ up to the destination of the data $d_j$ and a data body are included.

As illustrated in FIG. 8, the latency data storage unit 105 stores, for each ID of the data, a latency that is allowed for the delivery from the data source to the destination.

Moreover, as illustrated in FIG. 9, the link data storage unit 103 stores, for each link ID, an ID of a transmission source (Source) node, an ID of a destination node (Destination), and a latency of the link.

Moreover, as illustrated in FIG. 10, the data transfer route storage unit 104 stores, for each ID of data, a link ID array ($[L_{1,2}, L_{2,3}, \ldots, L_{n-1,n}]$) of a transfer route through which the data passes.

The first scheduler 102 uses the link data storage unit 103, the data transfer route storage unit 104 and the latency data storage unit 105 to identify a delivery time limit (i.e. arrival time limit) up to the destination for the received message, identifies the transmission time limit at this node, and stores the identified transmission time limit and data of the message in the data queue 106.

FIGS. 11A and 11B illustrates a data structure example of the data queue 106. In an example of FIG. 11A, for each time slot identified by a start time and an end time, a pointer (or link) to a queue for this time slot is registered. In the queue, a message (which corresponds to a data block) thrown into that queue is stored.

FIG. 11B illustrates a data format example of data thrown into the queue. In an example of FIG. 11B, an ID of data, a delivery time limit up to the destination, a transmission time limit at this node and a data body or a link to the data are included.

The data transmitter 107 transmits, for each time slot defined in the data queue 106, messages allocated to the time slot to the destination node or application.

The schedule negotiator 108 has a scheduling requesting unit 1081, a schedule receiver 1082 and rescheduler 1083.

The scheduling requesting unit 1081 generates and transmits a scheduling request including a transmission schedule to a node of the message transmission destination by using data stored in the data queue 106. The schedule receiver 1082 receives schedule notification including a scheduling result from a node of the message transmission destination, and outputs the received schedule notification to the rescheduler 1083. The rescheduler 1083 updates contents of the data queue 106 according to the received scheduling result.

Moreover, the second scheduler 109 has a request receiver 1091, a scheduling processing unit 1092 and a notification unit 1093.

The request receiver 1091 receives scheduling requests from other nodes, stores the received scheduling requests in the scheduling data storage unit 111, and outputs the scheduling requests to the scheduling processing unit 1092. The scheduling processing unit 1092 changes a transmission schedule for each node based on the scheduling requests from plural nodes by using data stored in the resource management data storage unit 110.

Figure 12:
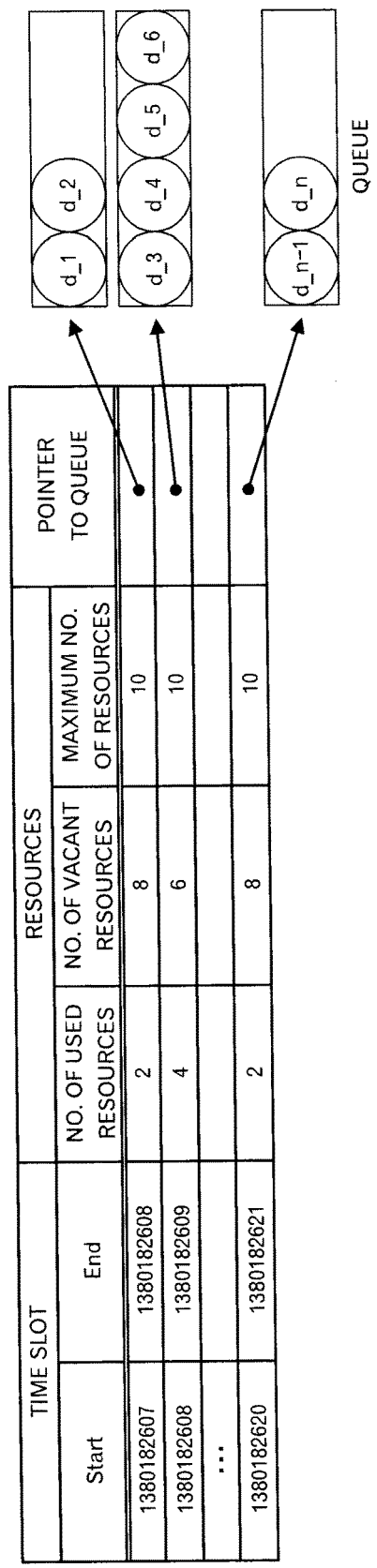
FIG. 12 is a diagram depicting a format example of data stored in a resource management data storage unit.

Data is stored in the resource management data storage unit 110 in data formats illustrated in FIGS. 12 and 13, for example. In other words, in an example of FIG. 12, for each time slot identified by the start time and the end time, the number of used resources, the number of vacant resources and the maximum number of resources for receiving resources of the node and a pointer to a queue (also called "a data list") for that time slot are stored. In this example, the width of the time slot is one second, and 10 data blocks (i.e. 10 messages) can be received per one time slot.

Information concerning data blocks thrown into a queue is stored in the queue. However, as illustrated in FIG. 13, this information includes, for each data block, an ID of data, a delivery time limit $t_{lim,j}$ and a transmission time limit $t_{lim,j,x}$ at a requesting source node x.

Moreover, data is stored in the scheduling data storage unit 111 in a data format as illustrated in FIG. 14, for example. In other words, for each ID of the node of the scheduling requesting source, a scheduling request itself or a link to the scheduling request and a scheduling result are stored.

The notification unit 1093 transmits, to each node, the scheduling result generated by the scheduling processing unit 1092.

Next, processing contents of the node will be explained by using FIGS. 15 to 28.

Figure 15:
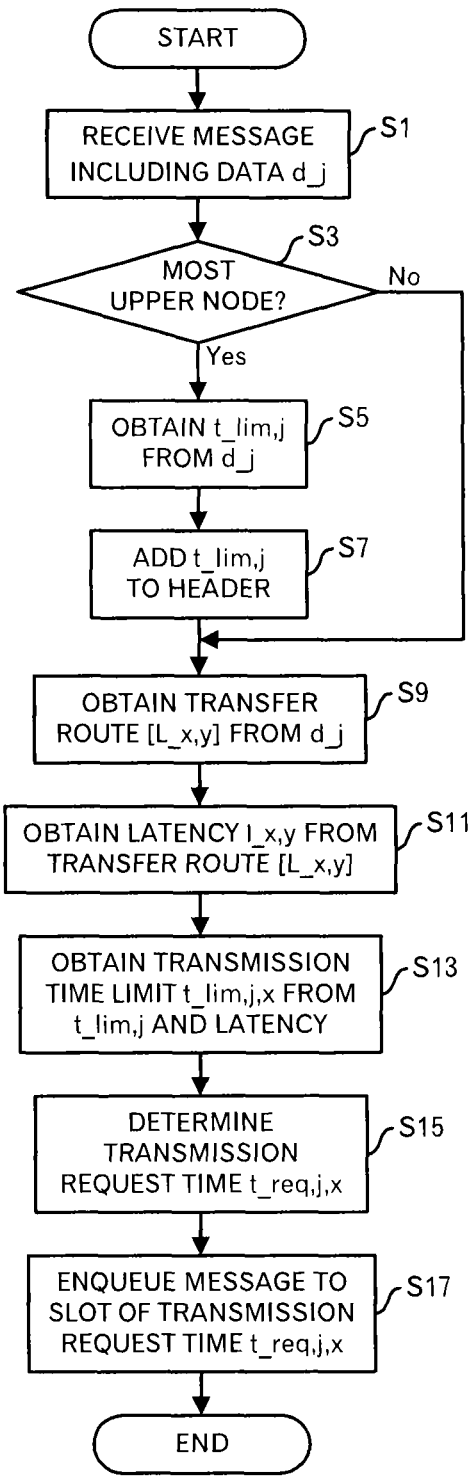
FIG. 15 is a diagram depicting a processing flow when data is received in the first embodiment.

Firstly, processing contents when the message is received will be explained by using FIG. 15. Underbars is used in figures to represent subscript letters.

The data receiver 101 receives a message including data ($d_j$) and outputs the message to the first scheduler 102 (step S1). When its own node is the most upper node connected to the data source (step S3: Yes route), the first scheduler 102 searches the latency data storage unit 105 for the data ID "$d_j$" to read out a latency that is allowed up to the destination, and obtains the delivery time limit $t_{lim,j}$ (step S5). For example, the delivery time limit is calculated by "present time+latency". When the delivery time limit itself is stored in the latency data storage unit 105, it is used. On the other hand, when its own node is not the most upper node (step S3: No route), the processing shifts to step S9.

Moreover, the first scheduler 102 adds the delivery time limit $t_{lim,j}$ to the received message header (step S7). By this step, a message as illustrated in FIG. 7 is generated.

Furthermore, the first scheduler 102 searches the data transfer route storage unit 104 for $d_j$ to read out a transfer route $[L_{x,y}]$ (step S9). In this embodiment, the transfer route is array data of link IDs.

Then, the first scheduler 102 searches the latency data storage unit 105 for each link ID in the transfer route $[L_{x,y}]$, and reads out the latency $l_{x,y}$ of each link (step S11).

After that, the first scheduler 102 calculates a transmission time limit $t_{lim,j,x}$ at this node from the delivery time limit $t_{lim,j}$ and the latency $l_{x,y}$ (step S13). Specifically, "$t_{lim,j}-\Sigma l_{x,y}$ (a total sum with respect to all links on the transfer route)" is performed.

Then, the first scheduler 102 determines a transmission request time $t_{req,j,x}$ from the transmission time limit $t_{lim,j,x}$ (step S15). "$t_{lim,j,x}=t_{req,j,x}$" may hold, and "$t_{req,j,x}=t_{lim,j,x}-\alpha$" may be employed considering a constant margin $\alpha$. In the following explanation, "the transmission time limit=transmission request time" holds in order to make the explanation easy.

Then, the first scheduler 102 throws the message and additional data into the time slot of the transmission request time $t_{req,j,x}$ (step S17). Data as illustrated in FIG. 11B is stored.

The aforementioned processing is performed every time when the message is received.

Next, processing contents of the schedule negotiator 108 will be explained by using FIGS. 16 to 20.

Figure 16:
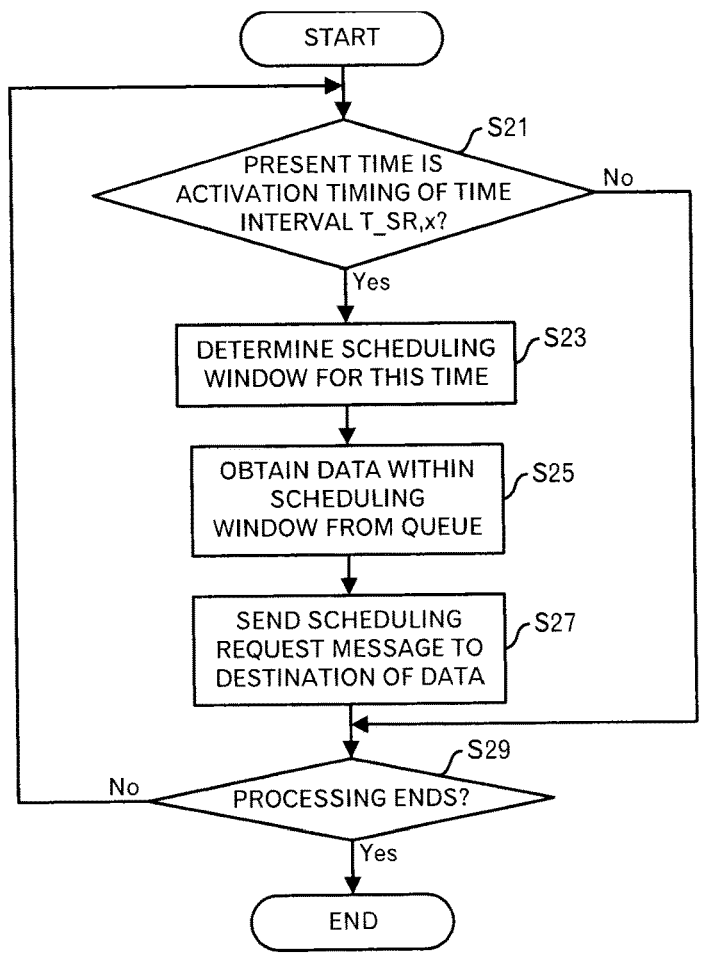
FIG. 16 is a diagram depicting a processing flow of a processing executed by a schedule negotiator.

Firstly, the schedule negotiator 108 determines whether or not the present time is an activation timing of a time interval $T_{SR,x}$ (FIG. 16: step S21). The processing shifts to step S29 when the present time is not the activation timing. On the other hand, when the present time is the activation timing, the scheduling requesting unit 1081 is activated, and the scheduling requesting unit 1081 determines a scheduling window for this time (step S23). Specifically, as explained in FIG. 3, when the present time is "t", a time band from "t+$M_x$" to "t+$M_x$+w$\Delta$t" is the scheduling window for this time. In this embodiment, all nodes within the system are synchronized.

Then, the scheduling requesting unit 1081 reads out data (except data body itself) within the scheduling window from the data queue 106, and generates a scheduling request (step S25).

FIG. 17 illustrates a data format example of the scheduling request. In an example of FIG. 17, an ID of a transmission source node, an ID of a destination node and data for each time slot are included. Data for each time slot includes identification information of the time slot (e.g. start time-end time), and an ID of data, a delivery time limit and a transmission time limit for each data block (i.e. message).

For example, when specific values are inputted in the Javascript Object Notation (JSON) format, an example of FIG. 18 is obtained. In the example of FIG. 18, data concerning two data blocks for the first time slot is included, data concerning two data blocks for the second time slot is included, and data concerning two data blocks for the last time slot is included.

After that, the scheduling requesting unit 1081 transmits the scheduling request to a transmission destination of the data (step S27).

Then, the schedule negotiator 108 determines whether or not the processing end is instructed (step S29), and when the processing does not end, the processing returns to the step S21. On the other hand, when the processing ends, the processing ends.

By transmitting the scheduling request for plural time slots as described above, adjustment of the transmission timing is properly performed.

Figure 19:
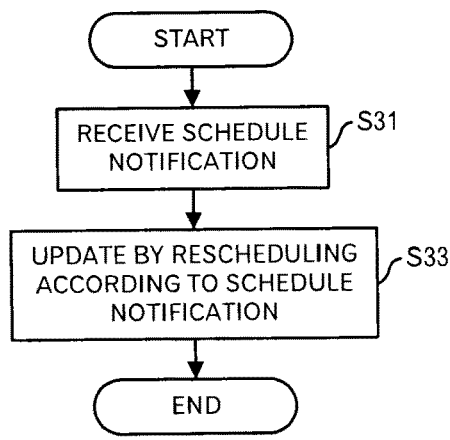
FIG. 19 is a diagram depicting a processing flow of a processing executed by the schedule negotiator.

Next, a processing when the scheduling result is received will be explained by using FIGS. 19 and 20.

The schedule receiver 1082 receives schedule notification including the schedule result (FIG. 19: step S31), and outputs the received notification to the rescheduler 1083. A data format of the schedule notification is a format as illustrated in FIGS. 17 and 18.

Then, when the rescheduler 1083 received the schedule notification, the rescheduler 1083 performs a processing to update the time slots into which the message in the data queue 106 (i.e. data block) is thrown according to the schedule notification (step S33). When the transmission schedule notified by the schedule notification is identical to the transmission schedule in the scheduling request, no special processing is performed. When a data block is moved to a different time slot, the data block is enqueued in a queue for the changed time slot. When there is no data for that time slot, the time slot is generated at this stage.

Thus, a transmission schedule adjusted in the node of the transmission destination can be reflected to the data queue 106.

Next, processing contents of the data transmitter 107 will be explained by using FIG. 20.

Figure 20:
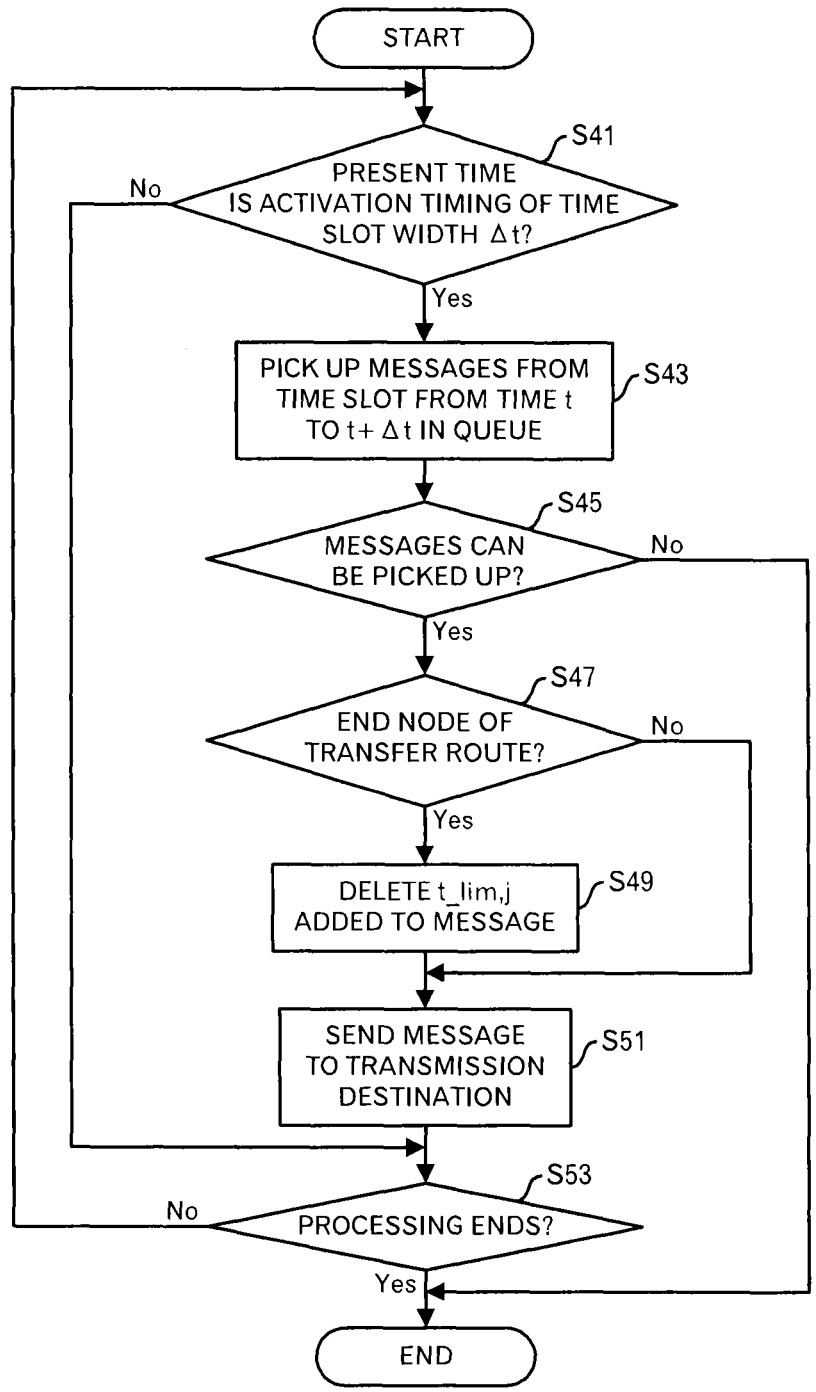
FIG. 20 is a diagram depicting a processing flow of a processing executed by a data transmitter.

The data transmitter 107 determines whether or not the present time becomes an activation timing t, which occurs at intervals of a time slot width $\Delta$t (FIG. 20: step S41). When the present time is not the activation timing t, the processing shifts to step S53. On the other hand, when the present time becomes the activation timing t, the data transmitter 107 performs a processing to read out messages (i.e. data blocks) from a queue for a time band from time "t" to "t+$\Delta$t" in the data queue 106 (step S43).

When it is not possible to read out data of the messages at the step S43 (step S45: No route), a processing for this time slot ends.

On the other hand, when the data of the messages can be read out (step S45: Yes route), the data transmitter 107 determines whether or not its own node is an end node of the transfer route (step S47). In other words, it is determined whether or not its own node is a node that outputs the messages to an application.

Then, when its own node is, the end node, the data transmitter 107 deletes the delivery time limit attached to the read message (step S49). On the other hand, when its own node is not the end node, the processing shifts to step S51.

After that, the data transmitter 107 transmits the read messages to the destinations (step S51). Then, the data transmitter 107 determines whether or not the processing ends (step S53), and when the processing does not end, the processing returns to the step S41. On the other hand, when the processing ends, the processing ends.

Thus, the message can be transmitted according to the transmission schedule determined by the node of the transmission destination. Therefore, data that can be received with the receiving resource of the node of the transmission destination is transmitted. Therefore, the delay of the data transmission is suppressed.

Next, processing contents of the second scheduler 109 will be explained by using FIGS. 21 to 28.

Figure 21:
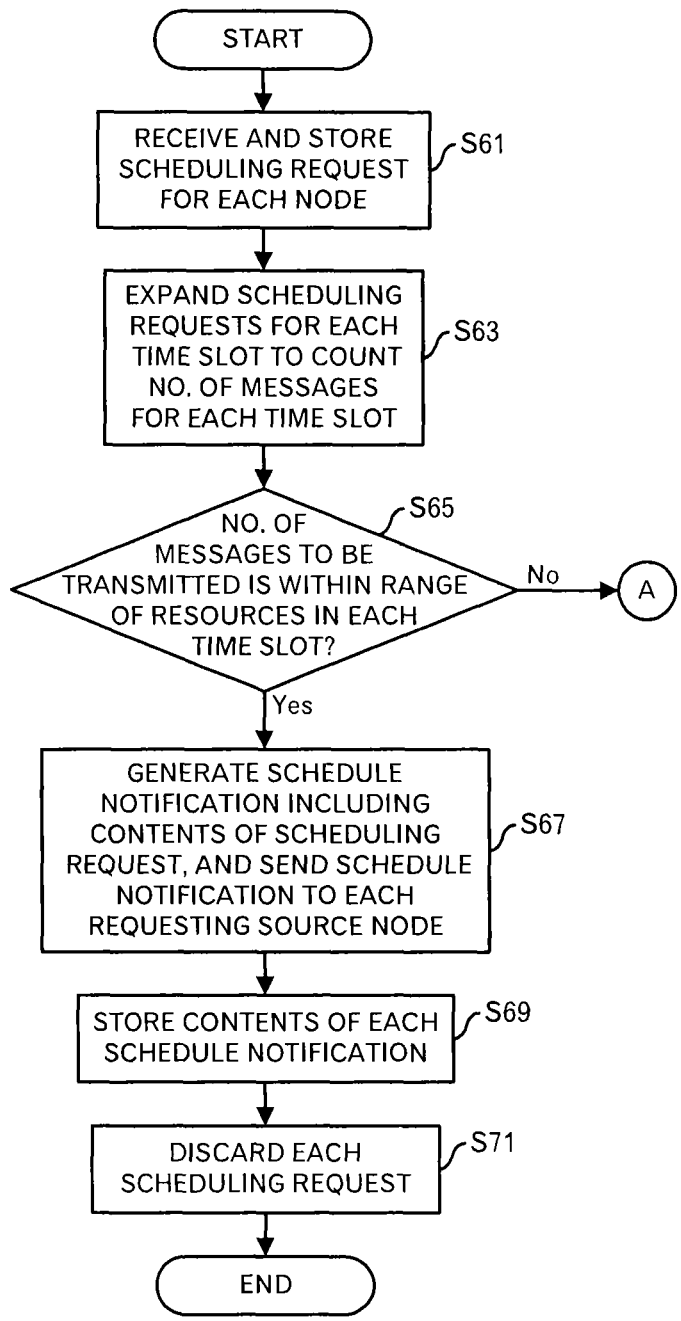
FIG. 21 is a diagram depicting a processing flow of a processing executed by a second scheduler.

The request receiver 1091 in the second scheduler 109 receives a scheduling request from each node near the data source, and outputs the received scheduling requests to the scheduling processing unit 1092 and stores the received messages in the scheduling data storage unit 111 (FIG. 21: step S61).

Then, the scheduling processing unit 1092 of the second scheduler 109 expands the respective scheduling requests for the respective time slot to count the number of messages (i.e. the number of data blocks) for each time slot (step S63). This processing result is stored in the resource management data storage unit 110 as illustrated in FIGS. 12 and 13.

FIG. 22 illustrates a specific example of this step. In an example of FIG. 22, a case is depicted where the scheduling requests were received from the nodes A to C, and data of the transmission schedule for each of 4 time slots is included. When such transmission schedules are superimposed for each time slot, a state illustrated in the right side of FIG. 22 is obtained. Data representing such a state is stored in the data format as illustrated in FIGS. 12 and 13. In this example, the first time slot is filled with 8 data blocks, which is the upper limit of the receiving resources, 6 data blocks that are less than the receiving resources are allocated to the second time slot, 9 data blocks, which exceeds the receiving resources, are allocated to the third time slot, and 7 data blocks that is less than the receiving resources are allocated to the fourth time slot.

Then, the scheduling processing unit 1092 determines whether or not the number of messages (the number of data blocks) that will be transmitted in each time slot is within a range of the receiving resources (i.e. less than the maximum value) (step S65). When the number of messages that will be transmitted in each time slot is within the range of the receiving resource, the scheduling processing unit 1092 outputs schedule notification including contents of the scheduling request stored in the scheduling data storage unit 111 as they are to the notification unit 1093, and causes the notification unit 1093 to transmit the schedule notification to each requesting source node (step S67). In such a case, this is because it is possible to receive the messages without changing the transmission schedule of each node.

Then, the scheduling processing unit 1092 stores the contents of the respective schedule notifications in the scheduling data storage unit 111 (step S69). Moreover, the scheduling processing unit 1092 discards the respective schedule requests that were received this time (step S71).

Figure 23:
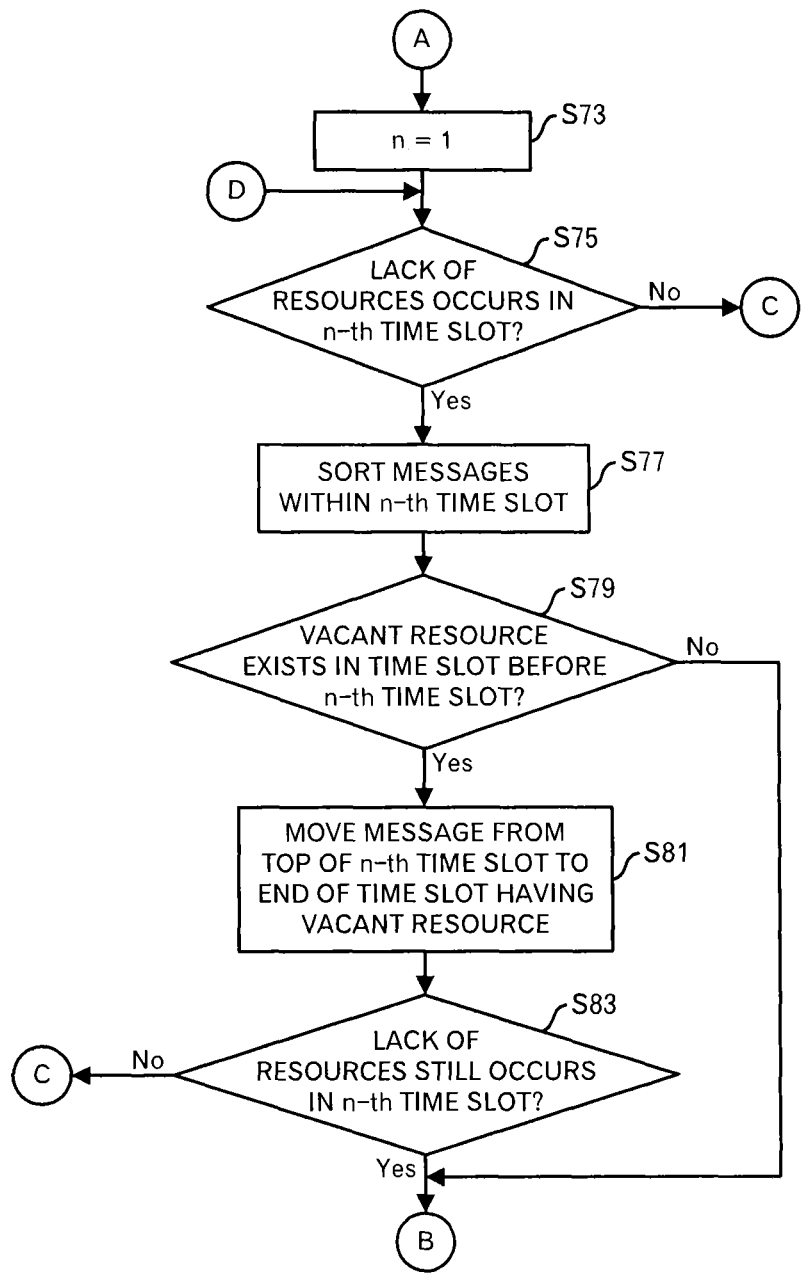
FIG. 23 is a diagram depicting a processing flow of a processing executed by the second scheduler.

On the other hand, when the number of messages for any of the time slots exceeds the range of the receiving resources, the processing shifts to a processing in FIG. 23 through terminal A.

Firstly, the scheduling processing unit 1092 initializes a counter n for the time slot to "1" (step S73). Then, the scheduling processing unit 1092 determines whether or not the number of messages for the n-th time slot exceeds the receiving resources (step S75). When the number of the messages for the n-th time slot is within the receiving resources, the processing shifts to a processing in FIG. 26 through terminal C.

On the other hand, when the number of messages for the n-th time slot exceeds the range of the receiving resources, the scheduling processing unit 1092 sorts the messages within the n-th time slot by using, as a first key, the transmission time limit of the transmission source node and by using, as a second key, the delivery time limit (step S77).

Figure 24:
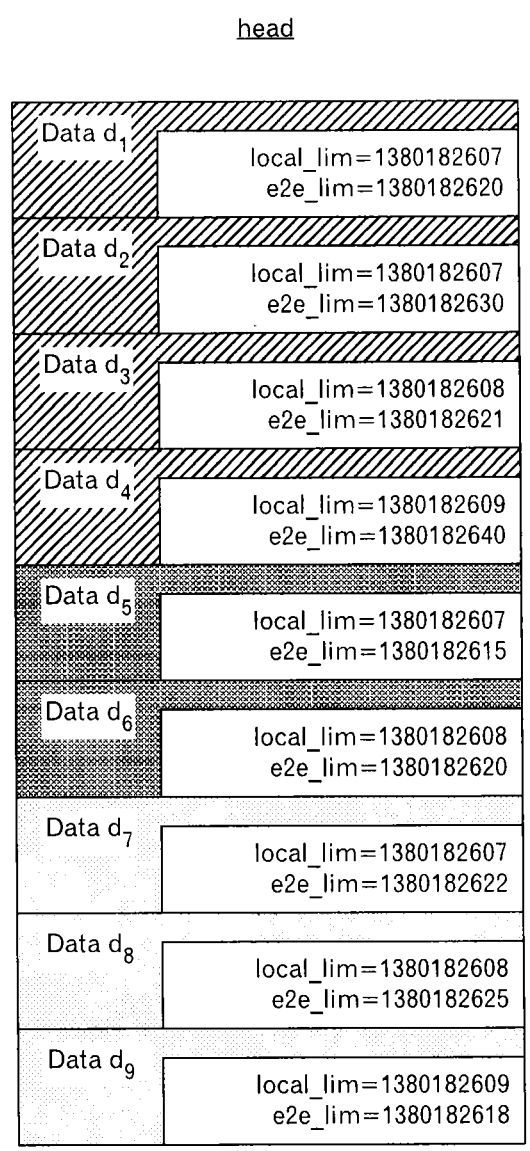
FIG. 24 is a diagram to explain sorting of messages.
Figure 25:
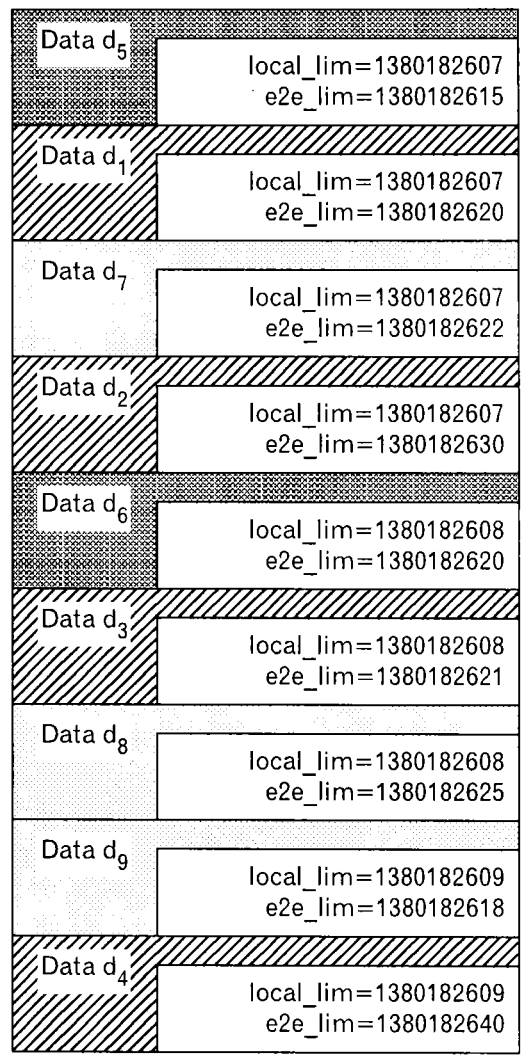
FIG. 25 is a diagram to explain sorting of messages.

A specific example of this step will be explained for the third time slot in FIG. 22 by using FIGS. 24 and 25. In this example, the top of the queue (also called "a data list") is the first and the bottom of the queue is the end. In FIG. 24, among 9 messages (i.e. data blocks), first to fourth messages are messages for the node A, fifth and sixth messages are messages for the node B, and seventh to ninth messages are messages for the node C. e2e_lim represents the delivery time limit, and local_lim represents the transmission time limit at the node. As described above, when these messages are sorted by using the transmission time limit and the delivery time limit, a result as illustrated in FIG. 25 is obtained. In other words, the messages allocated to the same time slot are prioritized by the transmission time limit and the delivery time limit.

After that, the scheduling processing unit 1092 determines whether or not there is a vacant receiving resource for a time slot before the n-th time slot (step S79). When there is no vacant receiving resource, the processing shifts to the processing in FIG. 26 through terminal B. When it is possible to schedule the transmission for an earlier time, the possibility of the data transmission delay can be suppressed. Therefore, firstly, the previous time slots are checked.

On the other hand, when there is a vacant receiving resource in the time slot before the n-th time slot, the scheduling processing unit 1092 moves a message from the top in the n-th time slot to the end of the time slot having a vacant receiving resource (step S81).

In an example illustrated in FIG. 22, because there is a vacant receiving resource in the second time slot, which is a previous time slot of the third time slot, the top message in the third time slot is moved to the end of the second time slot.

There is a case where two or more messages exceed the range of the receiving resources. In such a case, messages of the number of vacant receiving resources in the time slots before the n-th time slot are picked up and moved from the top in the n-th time slot. When three messages exceed the range of the receiving resources, however, there are only two vacant receiving resources in the previous time slot, only two messages are moved to the previous time slot. A countermeasure for one remaining message is determined in the following processing.

Then, the scheduling processing unit 1092 determines whether or not the present state is a state that messages that exceed the range of the receiving resources are still allocated to the n-th time slot (step S83). When this condition is satisfied, the processing shifts to the processing in FIG. 26 through the terminal B.

Figure 26:
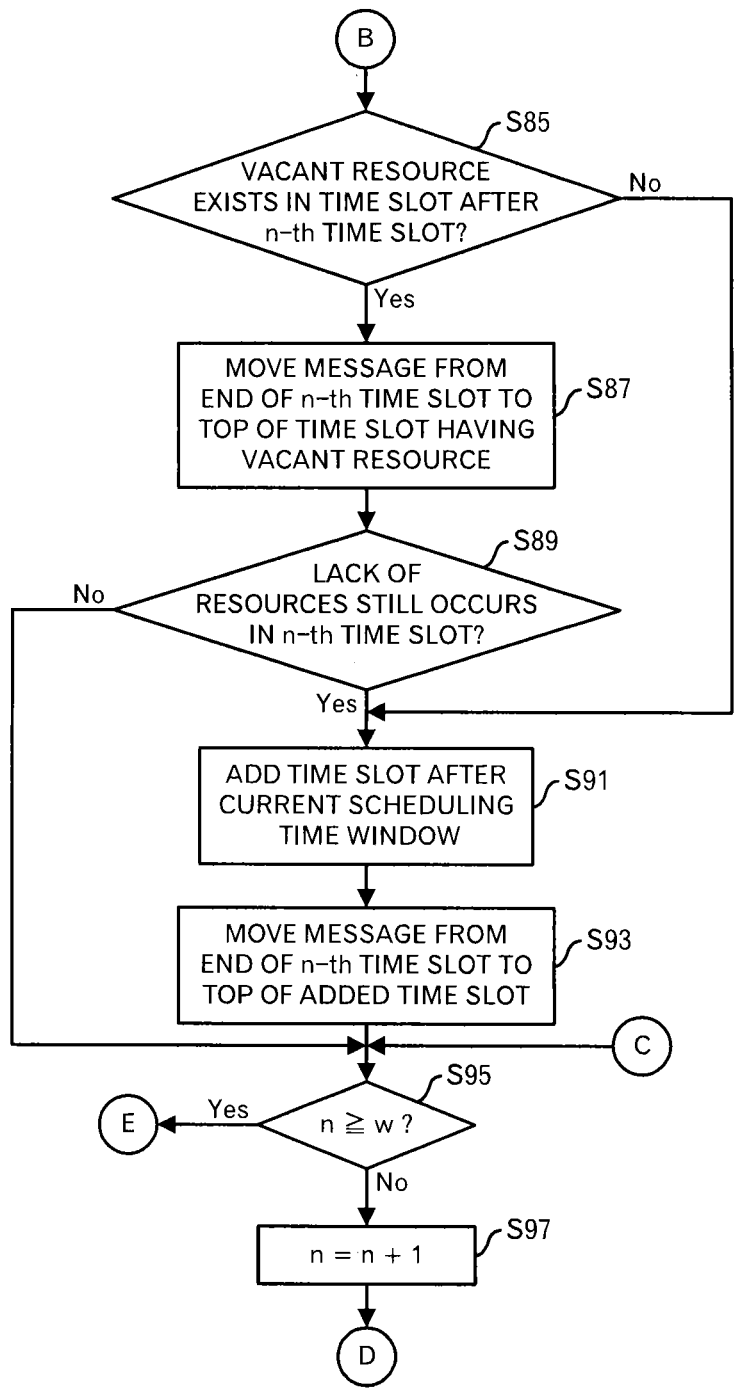
FIG. 26 is a diagram depicting a processing flow of a processing executed by the second scheduler.

On the other hand, when the messages in the n-th time slot are within the range of the receiving resources, the processing shifts to the processing in FIG. 26 through the terminal C.

Shifting to the explanation of the processing in FIG. 26, the scheduling processing unit 1092 determines whether or not there is a vacant receiving resource in a time slot after the n-th time slot (step S85). When there is no vacant receiving resource, the processing shifts to step S91.

On the other hand, when there is a vacant receiving resource in the time slot after the n-th time slot, the scheduling processing unit 1092 moves the message from the end of the n-th time slot to the top of the time slot having the vacant receiving resource (step S87).

In the example illustrated in FIG. 22, when it is assumed that there is no vacant receiving resource in the time slot before the third time slot, there is a vacant time slot also in the fourth time slot. Therefore, the message in the end of the third time slot is moved to the top of the fourth time slot.

There is a case where two or more messages exceed the range of the receiving resource. In such a case, messages of the number of vacant receiving resources in the time slots after the n-th time slot are picked up and moved from the end of the n-th time slot. When three messages exceed the range of the receiving resources, however, there are only two vacant receiving resources in the rear time slot, only two messages are moved to the rear time slot. One remaining message will be processed later.

Furthermore, the scheduling processing unit 1092 determines whether or not the present state is a state where the messages that exceed the range of the receiving resources are still allocated to the n-th time slot (step S89). When such a condition is not satisfied, the processing shifts to step S95.

When such a condition is satisfied, the scheduling processing unit 1092 adds a time slot after the current scheduling window (step S91). Then, the scheduling processing unit 1092 moves messages that exceed the range of the receiving resources at this stage from the end of the n-th time slot to the top of the added time slot (step S93).

By doing so, in each time slot in the scheduling window, it is possible to suppress the receipt of the messages within the range of the receiving resources. Therefore, the congestion is suppressed, and the delay of the data transmission is also suppressed.

Then, the scheduling processing unit 1092 determines whether or not a value of the counter n is equal to or greater than the number of time slots w within the scheduling window (step S95). When this condition is not satisfied, the scheduling processing unit 1092 increments n by "1" (step S97), and the processing returns to the step S75 in FIG. 23 through terminal D. On the other hand, when n is equal to or greater than w, the processing shifts to a processing in FIG. 27 through terminal E.

Figure 27:
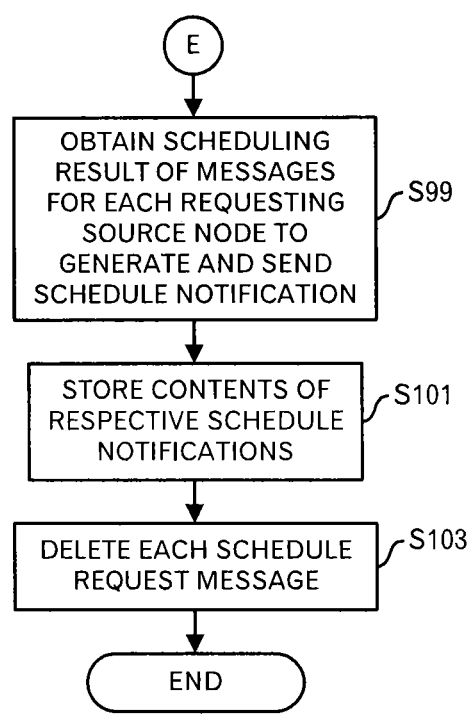
FIG. 27 is a diagram depicting a processing flow of a processing executed by the second scheduler.

Shifting to the explanation of the processing in FIG. 27, the scheduling processing unit 1092 extracts, for each requesting source node, the scheduling result (i.e. transmission schedule) of those messages to generate schedule notification, and causes the notification unit 1093 to transmit the generated schedule notification to each requesting source node (step S99).

Figure 28:
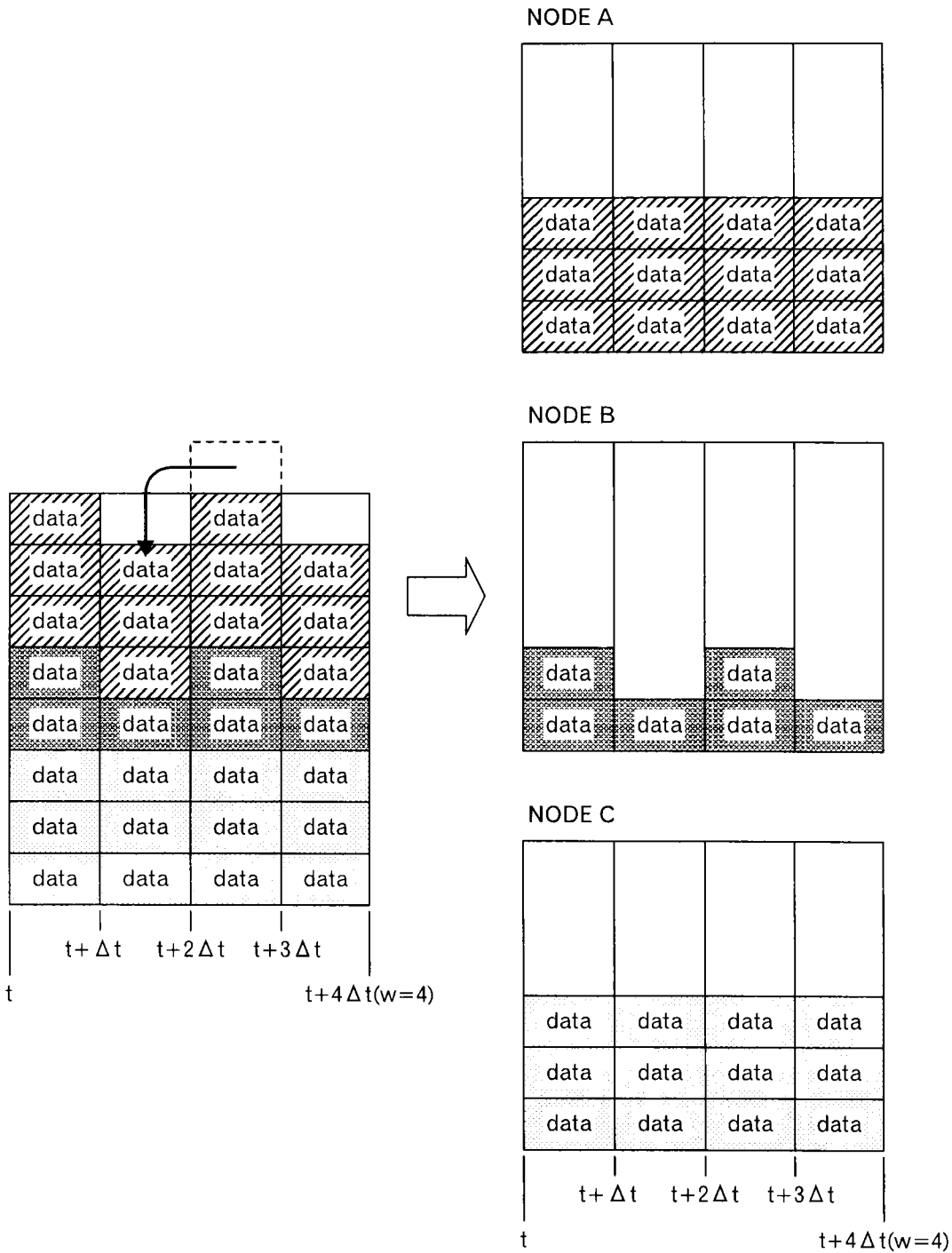
FIG. 28 is a diagram to explain sorting of messages.

As illustrated in FIG. 28, because a data block of the node A in the third time slot is moved to the second time slot, the transmission schedule that data blocks (messages) are transmitted uniformly from the first time slot to the fourth time slot is instructed in the schedule notification for the node A.

Then, the scheduling processing unit 1092 stores contents of the respective scheduling notification in the scheduling data storage unit 111 (step S101). Moreover, the scheduling processing unit 1092 discards the respective scheduling requests that were received this time (step S103).

By performing such a processing, it becomes possible to receive data from the node of the transmission source within the range of the receiving resources of data, and the congestion is suppressed, and the delay of the data transmission is also suppressed.

Embodiment 2

In the first embodiment, although the explanation was made assuming the size of each message is identical, the sizes of the messages may be different. In this embodiment, a case will be explained where a processing is performed considering the transmission abilities of links in addition to the size of the message.

The configuration of the node illustrated in FIG. 5 is almost the same as that in this embodiment, however, contents of saved data may be different.

Data is stored in the link data storage unit 103 relating to this embodiment in a data format as illustrated in FIG. 29. In an example of FIG. 29, for each link, an ID of a link, an ID of a transmission source node, an ID of a destination node and a link bandwidth [bps] from the node of the transmission source to the destination node are stored.

Moreover, data for the time slots in the data queue 106 is identical, however, as for portions of data concerning an individual message (i.e. data block), data is stored in a data format as illustrated in FIG. 30. In an example of FIG. 30, an ID of data, a delivery time limit up to the destination, a transmission time limit at this node, the size of the data (bytes) and a data body or a link to a storage area for the data body are stored.

Figures 31, 32:
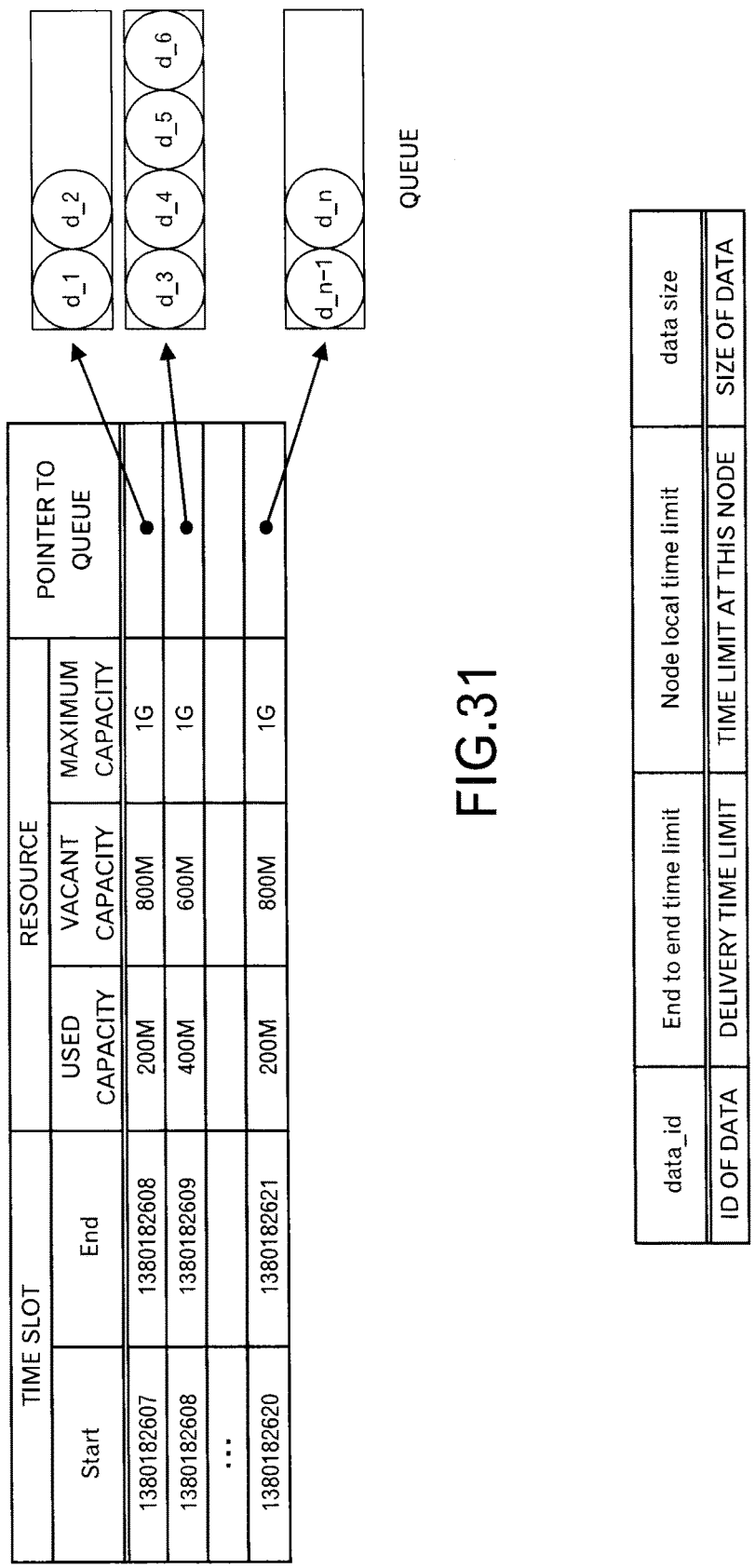
FIG. 31 is a diagram depicting a format example of data stored in the resource management data storage unit in the second embodiment.
FIG. 32 is a diagram depicting a format example of data stored in the resource management data storage unit in the second embodiment.

Furthermore, data is stored in the resource management data storage unit 110 in a data format as illustrated in FIGS. 31 and 32. In other words, in an example of FIG. 31, for each time slot identified by the start time and the end time, a used capacity (bits), vacant capacity (bits) and maximum capacity (bits) of the receiving resource of the node and a pointer to a queue (also called "a data list") for that time slot are stored. In this example, 1G bits can be received within one time slot at most, and the receipt of data of 200M bits have already been scheduled in the first time slot, and the capacity of 800M bits is vacant.

Information concerning the message (i.e. data block), which were thrown into a queue, is stored in the queue. However, as illustrated in FIG. 32, this information includes, for each message (i.e. data block), an ID of data, a delivery time limit $t_{lim,j}$, a transmission time limit $t_{lim,j,x}$ of a requesting source node j and a data size. The data size may be represented by "bits" or "bytes" and may be represented by a ratio to the maximum capacity of the time slot.

Moreover, data formats of the scheduling request and schedule notification are as illustrated in FIGS. 33 and 34. Only a portion that the data size (ds) for each message (i.e. data block) is added is different from FIGS. 17 and 18.

Figure 35:
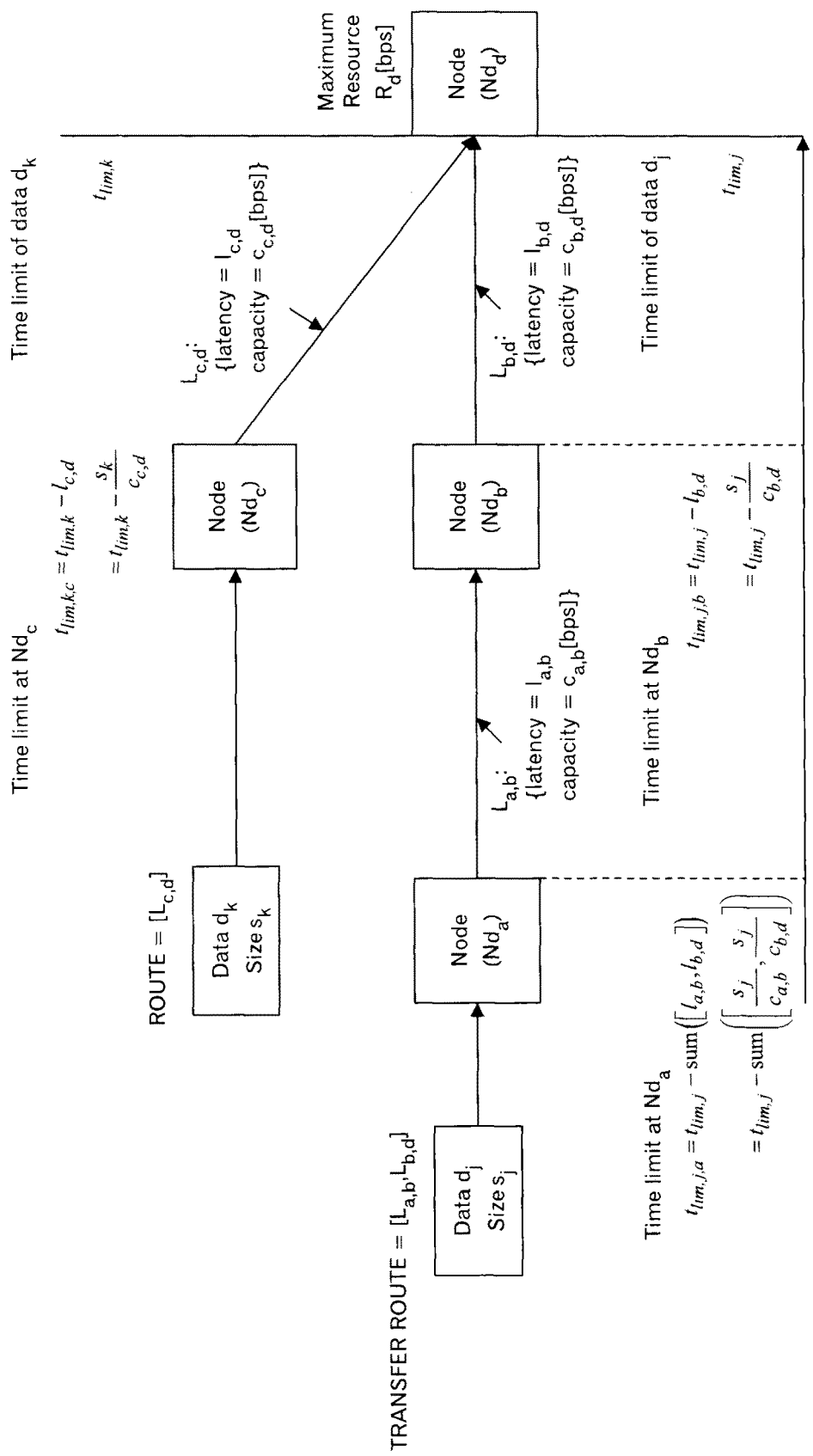
FIG. 35 is a diagram to explain calculation of latency in the second embodiment.

In this embodiment, a latency is calculated by using the data size and the bandwidths of the links. This point will be explained by using FIG. 35.

Here, the node $Nd_a$ receives data $d_j$ having the data size $s_j$ from the data source, and transmits the data $d_j$ to the node $Nd_d$ through the node $Nd_b$. Moreover, the node $Nd_c$ receives data $d_k$ having the data size $s_k$ from the data source, and transmits the data $d_k$ to the node $Nd_d$.

Here, the latency $l_{a,b}$ of the link $L_{a,b}$ from the node $Nd_a$ to the node $Nd_b$ is calculated by "the data size $s_j$/the link bandwidth $c_{a,b}$". Similarly, the latency $l_{b,d}$ of the link $L_{b,d}$ from the node $Nd_b$ to the node $Nd_d$ is calculated by "the data size $s_j$/the link bandwidth $c_{b,d}$".

Therefore, the transmission time limit $t_{lim,j,a}$ at the node $Nd_a$ is calculated as follows:

The delivery time limit $t_{lim,j}$−sum($[l_{a,b}, l_{b,d}]$)=$t_{lim,j}$−($s_j/c_{a,b}$+$s_j/c_{b,d}$).

Similarly, the transmission time limit $t_{lim,j,b}$ at the node $Nd_b$ is calculated as follows:

The delivery time limit $t_{lim,j}$−$l_{b,d}$=$t_{lim,j}$−$s_j/c_{b,d}$.

Moreover, the transmission time limit $t_{lim,j,c}$ at the node $Nd_c$ is calculated as follows:

The delivery time limit $t_{lim,k}$−$l_{c,d}$=$t_{lim,i}$−$s_k/c_{c,d}$.

Figure 36:
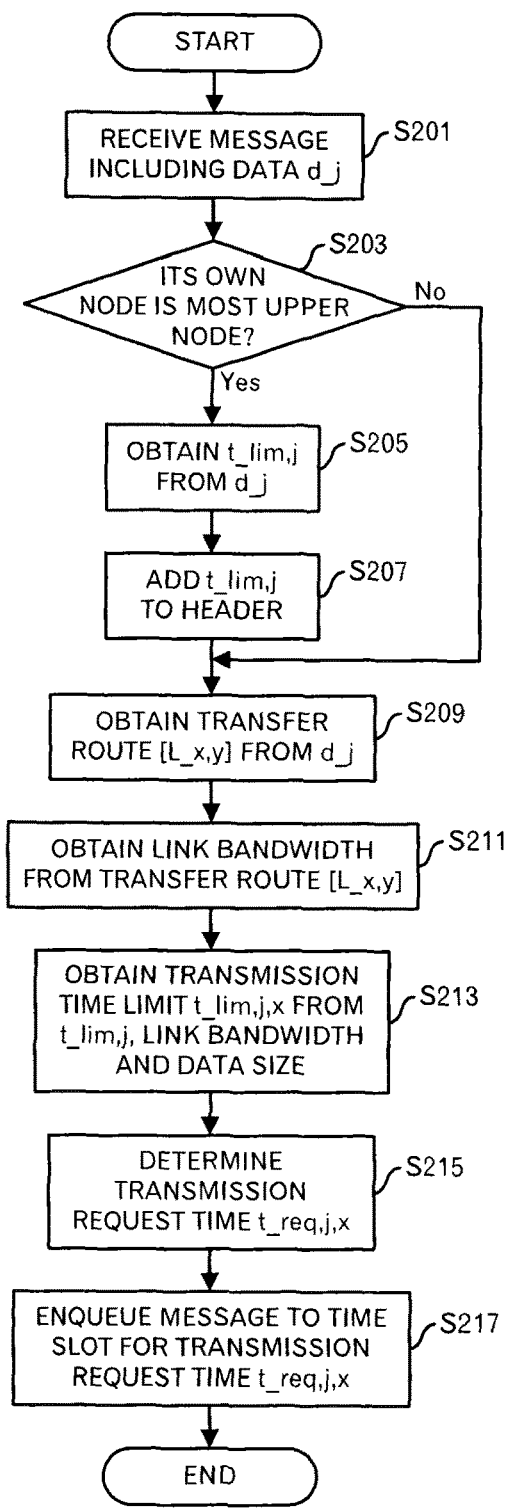
FIG. 36 is a diagram depicting a processing flow of a processing executed by the data receiver in the second embodiment.

Next, processing contents relating to this embodiment will be explained by using FIGS. 36 and 37.

Firstly, processing contents when the message is received will be explained by using FIG. 36.

The data receiver 101 receives a message including data $d_j$, and outputs the message to the first scheduler 102 (step S201). When its own node is the most upper node that is connected with the data source (step S203: Yes route), the first scheduler 102 searches the latency data storage unit 105 for the ID "$d_j$" of the data, reads out the latency that is allowed up to the destination, and obtains the delivery time limit $t_{lim,j}$ (step S205). For example, the delivery time limit is calculated by "the present time+latency". When the delivery time limit itself is stored in the latency data storage unit 105, it is used. On the other hand, when its own node is not the most upper node (step S203: No route), the processing shifts to step S209.

Moreover, the first scheduler 102 adds the delivery time limit $t_{lim,j}$ to the received message header (step S207). Then, the message as illustrated in FIG. 7 is generated.

Furthermore, the first scheduler 102 searches the data transfer route storage unit 104 for $d_j$ to read out the transfer route $[L_{x,y}]$ (step S209). The transfer route is array data of link IDs in this embodiment.

Then, the first scheduler 102 searches the latency data storage unit 105 for each link ID of the transfer route $[L_{x,y}]$ to read out the link bandwidth $c_{x,y}$ for each link (step S211).

After that, the first scheduler 102 calculates the transmission time limit $t_{lim,j,x}$ of this node from the delivery time limit $t_{lim,j}$, the link bandwidth $c_{x,y}$, and the data size of the message (step S213). Specifically, a following calculation is performed:

$$t_{lim,j} = \Sigma s_j / c_{x,y}$$

(total sum with respect to all links on the transfer route).

Then, the first scheduler 102 determines the transmission request time $t_{req,j,x}$ from the transmission time limit $t_{lim,j,x}$ (step S215). "$t_{lim,j,x} = t_{req,j,x}$" may be held, and "$t_{req,j,x} = t_{lim,j,x} - \alpha$" may be employed considering a constant margin $\alpha$. In the following explanation, "the transmission time limit=the transmission request time" is assumed in order to simplify the explanation.

Then, the first scheduler 102 throws the message and additional data to the time slot of the transmission request time $t_{req,j,x}$ (step S217).

The aforementioned processing is performed every time when the message is received.

Processing contents of the schedule negotiator 108 are almost the same as those in the first embodiment, and only the data format of the generated scheduling request as illustrated in FIGS. 33 and 34 is different.

Moreover, processing contents of the data transmitter 107 is the same as those illustrated in FIG. 20.

Furthermore, processing contents of the second scheduler 109 is similar except a portion. Specifically, a point is different that it is determined whether or not the time slot is vacant based on a data amount instead of the number of messages (i.e. the number of data blocks).

Figure 37:
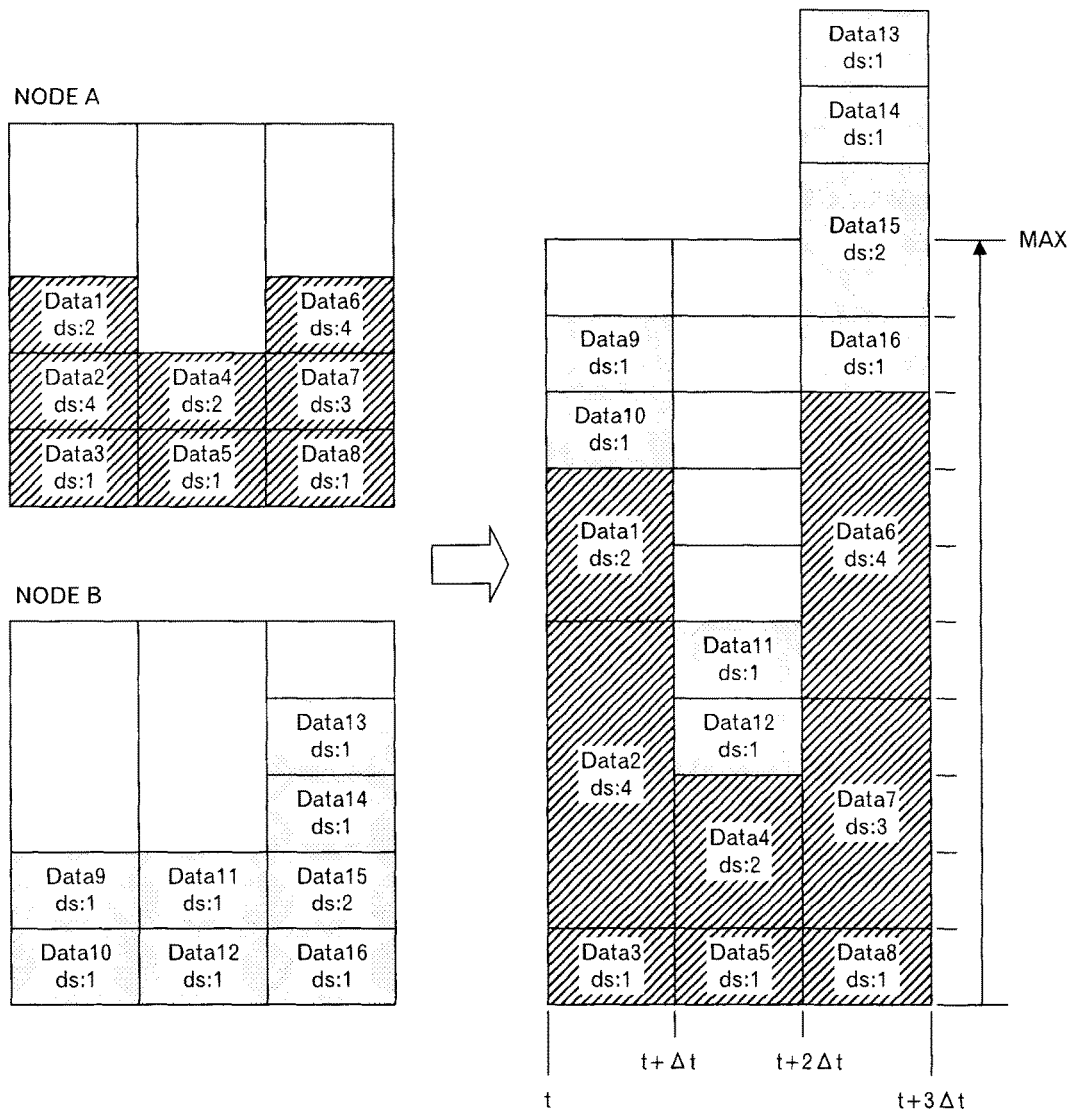
FIG. 37 is a diagram to explain a processing by the second scheduler in the second embodiment.

As illustrated in FIG. 37, the data size (ds) of each data block (i.e. each message) is considered. When the link bandwidth is different for each transmission source node, the link bandwidth is considered. However, in order to make it easy to understand this embodiment, it is assumed that they are identical.

For example, it is assumed that the time slot width Δt=one second holds and the bandwidth is 100 Mbps. Then, in case of data of 20M bits, it takes 0.2 seconds for the transmission, and it takes 0.1 seconds in case of data of 10M bits. Here, assuming 10M bits correspond to one unit, "ds: 1" represents data of 10M bits, and "ds: 2" represents data of 20M bits.

Here, when the transmission schedules of the nodes A and B are superimposed, the transmission schedules are as illustrated in the right side of FIG. 37. In the right side of FIG. 37, the height corresponding to the data size represents the data block (i.e. message). Thus, in the third time slot, the data amount of the received data blocks exceeds the maximum capacity for the receiving resources, and the data blocks that exceed the maximum capacity are moved to other time slots.

As for the vacant time slot, it is determined whether or not the data block (i.e. message) can be moved, while considering the vacant capacity. For example, when the data size of one data block (i.e. message) is large, and the vacant capacity in the time slot lacks, it is determined that the data block cannot be moved.

Processing contents of the notification unit 1093 are different in a point that the data format of the schedule notification is as illustrated in FIGS. 33 and 34.

As described above, it is possible to cope with a case of the message (i.e. data block), which has a different data size.

Embodiment 3

In the first and second embodiments, the explanation was made assuming the activation intervals $T_{SR,x}$ of the scheduling requesting unit 1081 and the initial activation time are identical in each node.

In this embodiment, in each node, the activation interval $T_{SR,x}$ and the initial activation time of the scheduling requesting unit 1081 are different. Therefore, the scheduling window is different in each node, and is set according to the activation interval $T_{SR,x}$ of that node.

In the first and second embodiments, the scheduling requests are almost simultaneously received, and in response to those, the second scheduler 109 performs a processing. However, in this embodiment, because the timing when the scheduling request is received is different for each transmission source node, the activation interval $T_{TLS-inter,x}$ of the second scheduler 109 is defined as follows:

$$T_{TLS-inter,x} = \min(T_{SR,a}, TR_b, TR_c, \ldots, T_{SR,n}).$$

In other words, the shortest activation interval of the transmission source nodes is employed as the maximum value of the activation interval of the second scheduler 109. This is because it is preferable that the node, which transmits plural scheduling requests in one $T_{TLS-inter,x}$, does not appear.

The configuration of the node that copes with such a situation is similar to the first embodiment. However, because the processing contents are partially different, different portions of the processing contents will be explained in the following.

Figure 38:
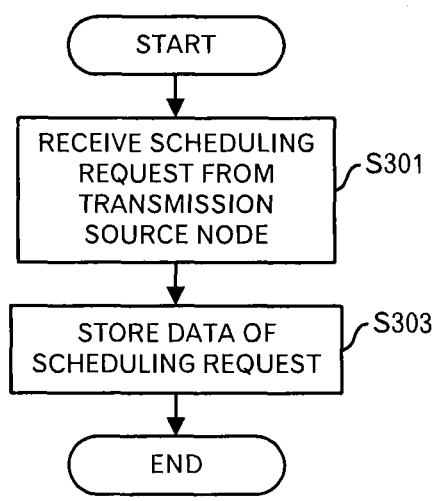
FIG. 38 is a diagram depicting a processing flow of a processing executed by the scheduling processing unit and the like in a third embodiment.

Firstly, processing contents of the request receiver 1091 will be explained by using FIG. 38. In the first embodiment, the request receiver 1091 cooperates with the scheduling processing unit 1092, however, in this embodiment, the request receiver 1091 independently operates, because the receiving timing of the scheduling request is different for each node.

In other words, when the request receiver 1091 receives a scheduling request from a transmission source node (step S301), the request receiver 1091 stores data of the scheduling request in the scheduling data storage unit 111 (step S303).

Such a processing will be repeated every time when the scheduling request is received.

Next, processing contents of the scheduling processing unit 1092 and the like will be explained by using FIGS. 39 to 46.

Figure 39:
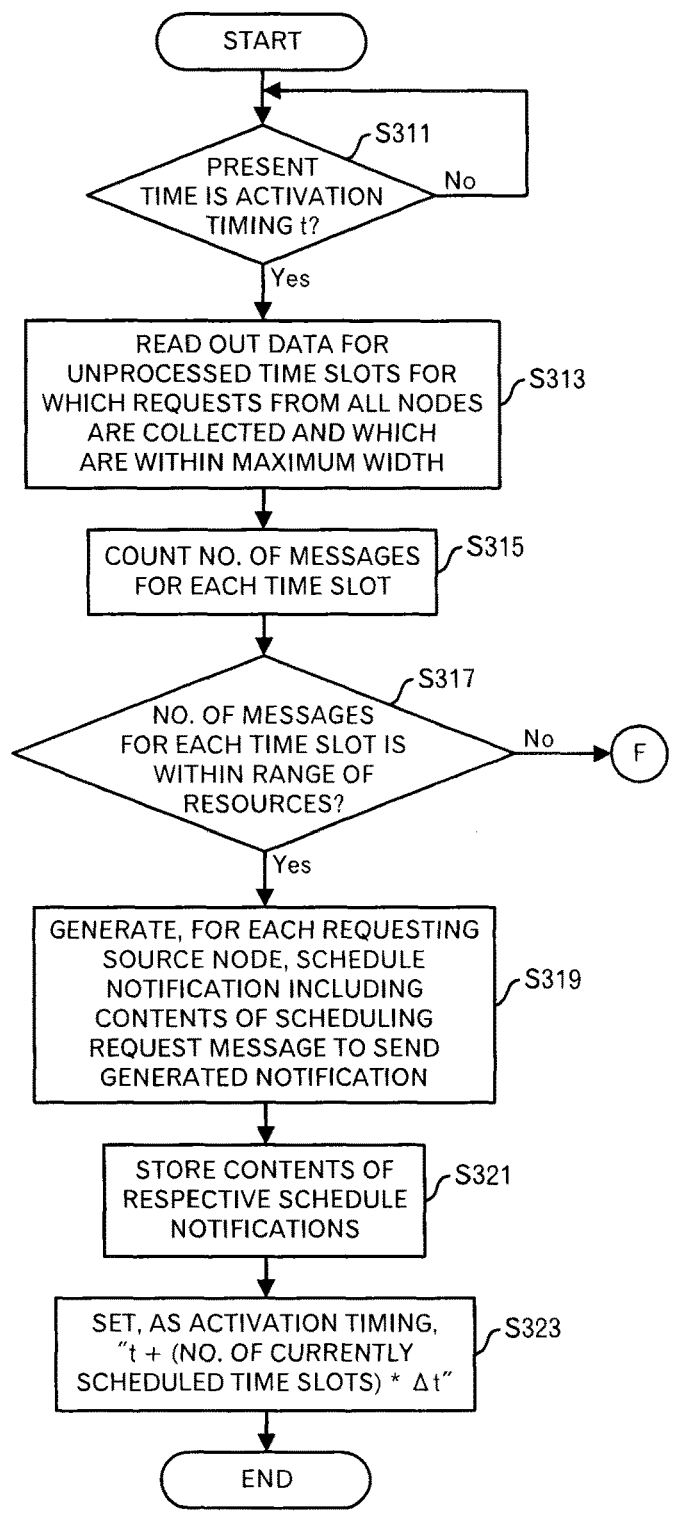
FIG. 39 is a diagram depicting a processing flow of a processing executed by the scheduling processing unit and the like in the third embodiment.

The scheduling processing unit 1092 determines whether or not the activation interval $T_{TLS-inter,x}$ or a time period that is set in the following processing elapsed and the present time is the activation timing t (FIG. 39: step S311). When the present time is not the activation timing t, the scheduling processing unit 1092 waits.

On the other hand, when the present timing is the activation timing t, the scheduling processing unit 1092 reads out data concerning unprocessed time slots for which the scheduling requests from all of the nodes are collected and which are within the maximum width $T_{TLS-inter,x}$, from the scheduling data storage unit 111 (step S313).

Figure 40:
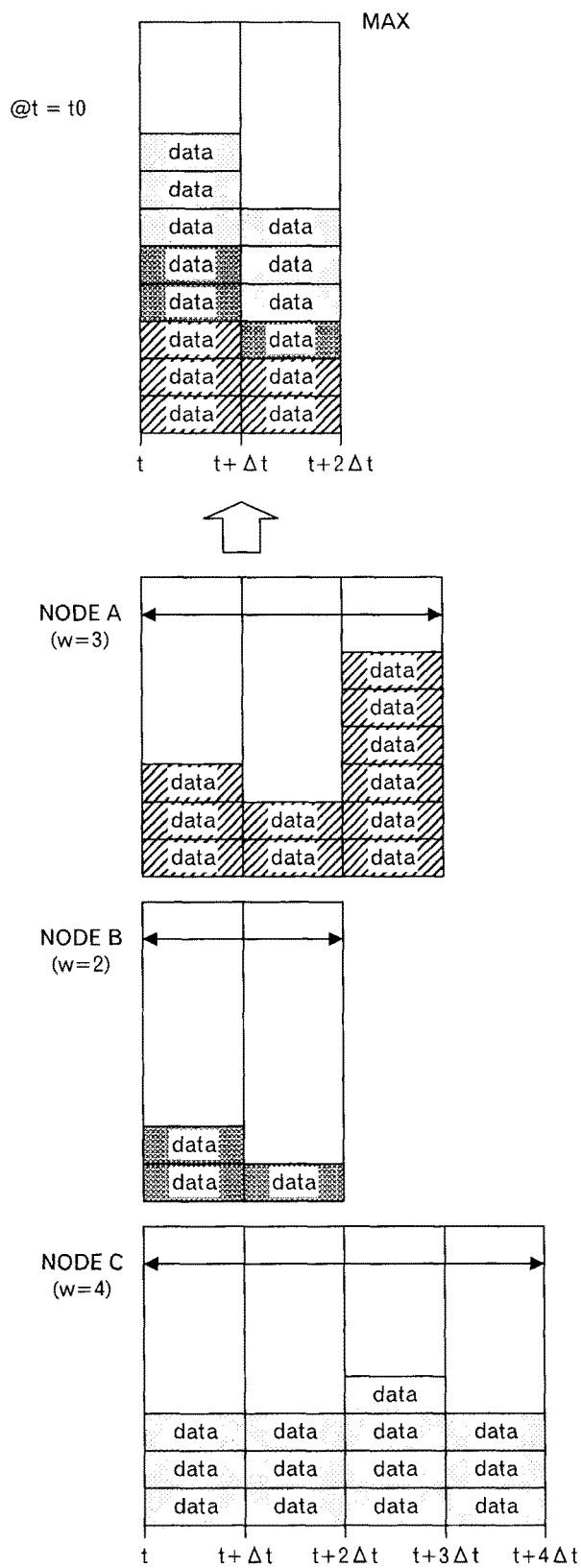
FIG. 40 is a diagram depicting processing contents of the scheduling processing unit in the third embodiment.

For example, an initial state as illustrated in FIG. 40 is assumed. In such a case, the scheduling requests are received from three nodes, however, the number of time slots w, which are included in the scheduling window, is different. Here, because the node B employs the least w=2, data concerning the time slots from "t0" to "t0+2Δt" is read out from the scheduling data storage unit 111. Data of the scheduling requests including data for the time slots from t0 to 2Δt may be read out.

Then, the scheduling processing unit 1092 expands the read data for each time slot, and counts the number of messages (i.e. the number of data blocks) for each time slot (step S315). This processing result is stored in the resource management data storage unit 110 as illustrated in FIGS. 12 and 13.

In an example of FIG. 40, as illustrated in the top stage, for each of two time slots, the number of messages (i.e. the number of data blocks) is counted. In such a case, for any time slot, the number of messages does not reach the maximum number of receiving resources.

Then, the scheduling processing unit 1092 determines whether or not the number of messages that will be transmitted in each time slot is within the range of the receiving resources (step S317). When the number of messages that will be transmitted in each time slot is within the range of the receiving resources, the scheduling processing unit 1092 outputs, for each requesting source node, schedule notification that includes contents of the scheduling request stored in the scheduling data storage unit 111 as they are to the notification unit 1093, and causes the notification unit 1093 to send the schedule notification to each requesting source node (step S319). In such a case, this is because it is possible to receive the messages without changing the transmission schedule for each node.

Then, the scheduling processing unit 1092 stores the contents of each schedule notification in the scheduling data storage unit 111 (step S321).

Furthermore, the scheduling processing unit 1092 sets "t+(No. of currently scheduled time slots)*Δt" as the next activation timing (step S323). In this embodiment, the number of time slots to be processed is different for each activation timing. Therefore, the next activation timing is set for each activation timing.

Figure 41:
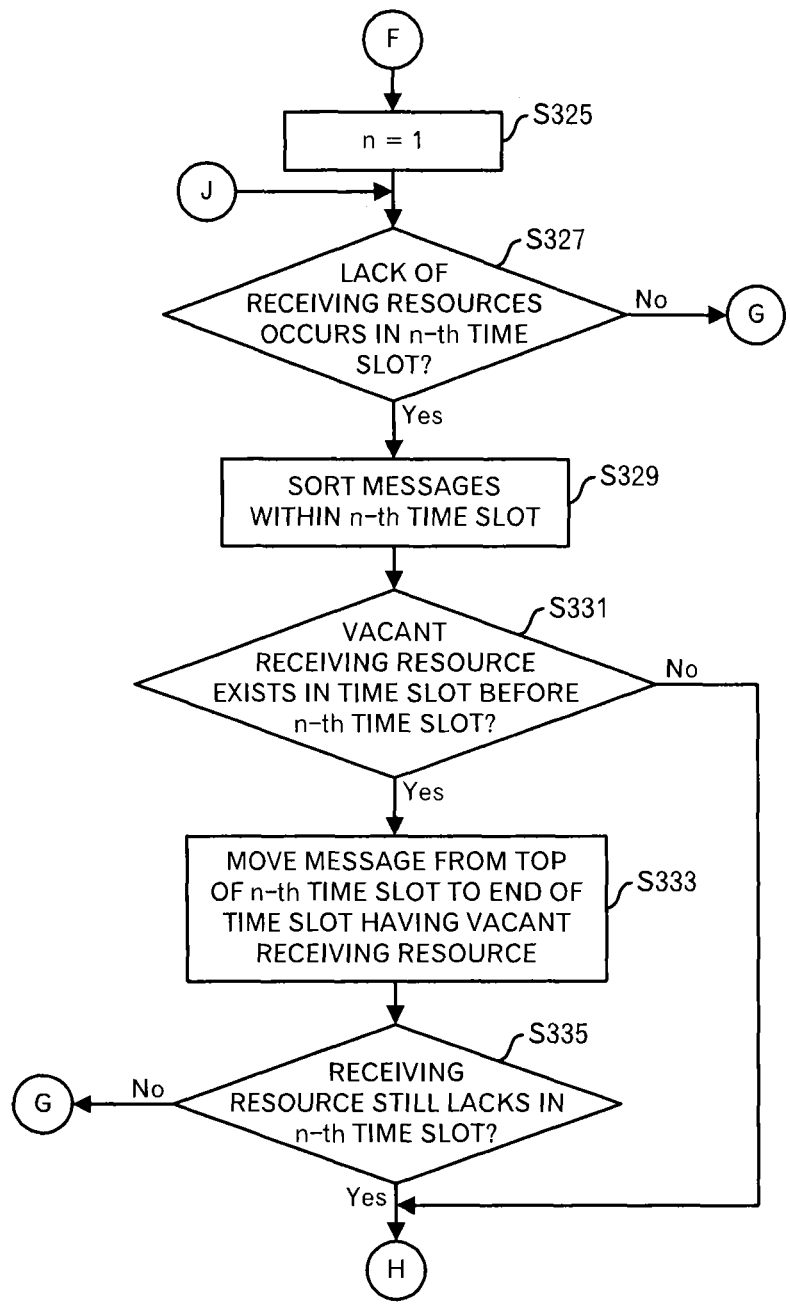
FIG. 41 is a diagram depicting a processing flow of a processing executed by the scheduling processing unit and the like in the third embodiment.

On the other hand, when the number of messages for any of the time slots exceeds the range of the receiving resource, the processing shifts to a processing in FIG. 41 through terminal F.

Firstly, the scheduling processing unit 1092 initializes a counter n of the time slot to "1" (step S325). Then, the scheduling processing unit 1092 determines whether or not the number of messages in the n-th time slot exceeds the range of the receiving resources (step S327). When the number of messages in the n-th time slot is within the range of the receiving resources, the processing shifts to a processing in FIG. 42 through terminal G.

On the other hand, when the number of messages in the n-th time slot exceeds the range of the receiving resources, the scheduling processing unit 1092 sorts the messages within the n-th time slot by using, as a first key, the transmission time limit of the transmission source node and using, as a second key, the delivery time limit (step S329). This processing is the same as that at the step S77.

After that, the scheduling processing unit 1092 determines whether or not the time slot before the n-th time slot (however, within the range of the time slots that are currently processed) has a vacant receiving resource (step S331). When there is no vacant receiving resource, the processing shifts to the processing in FIG. 42 through terminal H. When the transmission can be moved forward, it is possible to suppress the possibility of the delay of the data transmission. Therefore, firstly, the previous time slot is checked.

On the other hand, when there is a vacant receiving resource in the time slot before the n-th time slot, the scheduling processing unit 1092 moves the message in the top of the n-th time slot to the end of the time slot that has a vacant receiving resource (step S333).

There is a case where two or more messages exceed the range of the receiving resources. In such a case, only the messages of the number of vacant receiving resources in the time slot before the n-th time slot are picked up and moved from the top of the n-th time slot. When three messages exceed the range of the receiving resources, however, there are only two vacant receiving resources in the previous time slot, only two messages are moved to the previous time slot. Countermeasures for one remaining message are determined in the following processing.

Then, the scheduling processing unit 1092 determines whether or not the present state is a state that a message that exceeds the range of the receiving resource is still allocated to the n-th time slot (step S335). When such a condition is satisfied, the processing shifts to the processing in FIG. 42 through the terminal H.

Figure 42:
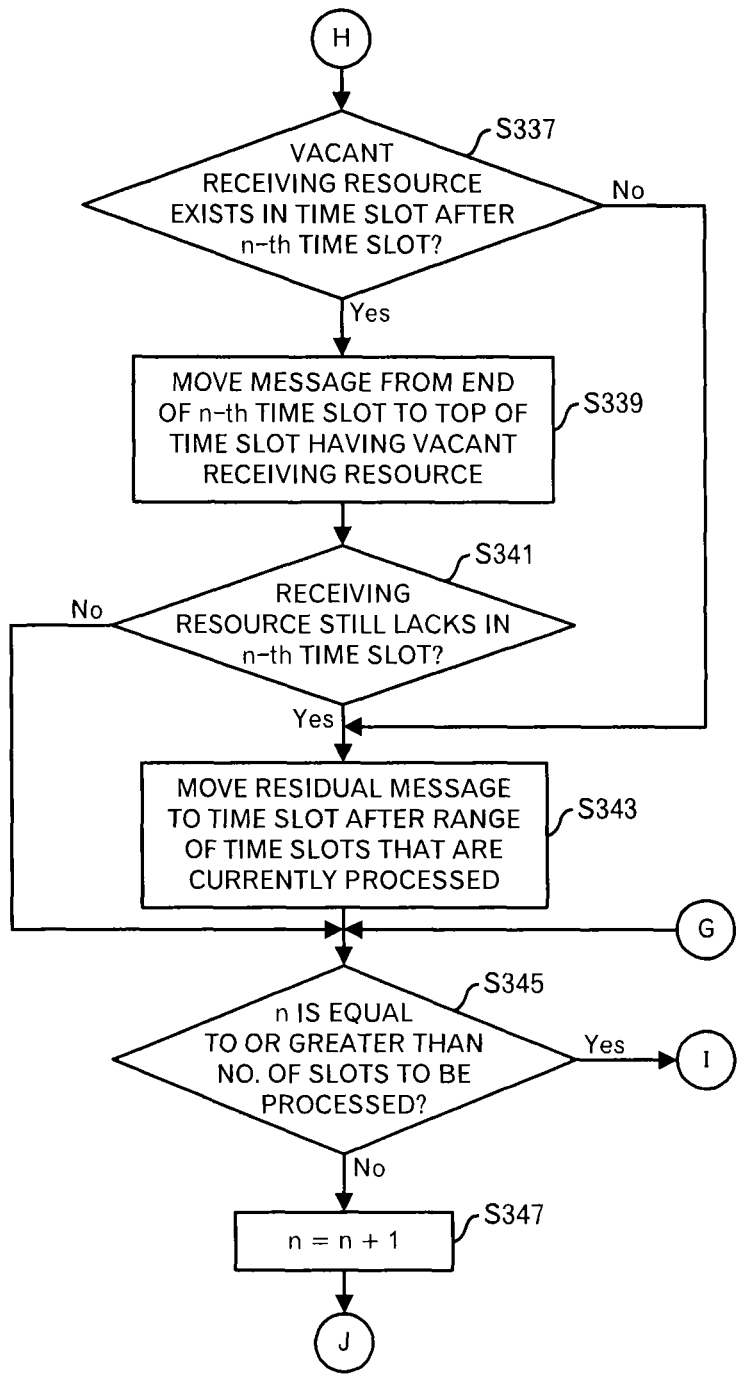
FIG. 42 is a diagram depicting a processing flow of a processing executed by the scheduling processing unit and the like in the third embodiment.

On the other hand, when the number of messages in the n-th time slots becomes within the range of the receiving resources, the processing shifts to the processing in FIG. 42 through the terminal G.

Shifting to the explanation of the processing in FIG. 42, the scheduling processing unit 1092 determines whether or not there is a vacant receiving resource in the time slot after the n-th time slot (however, within the range of the time slots that are being processed presently) (step S337). When there is no vacant receiving resource, the processing shifts to step S343.

On the other hand, when there is a vacant receiving resource in the time slot after the n-th time slot, the scheduling processing unit 1092 moves the message from the end of the n-th time slot to the top of the time slot that have a vacant receiving resource (step S339).

There is a case where two or more messages exceed the range of the receiving resources. In such a case, the messages of the number of vacant receiving resources in the time slot after the n-th time slot are picked up and moved from the end of the n-th time slot. When three messages exceed the range of the receiving resources, however, there are only two vacant receiving resource in the rear time slot, only two messages are moved to the rear time slot. One remaining messages is processed later.

Furthermore, the scheduling processing unit 1092 determines whether or not the message that exceeds the range of the receiving resources is still allocated to the n-th time slot (step S341). When this condition is not satisfied, the processing shifts to step S345.

When this condition is satisfied, a processing to generate the time slot after the scheduling window and allocate the message (i.e. data block) to the top thereof is performed in the first embodiment.

However, in this embodiment, because the time slots already exist and the messages (i.e. data blocks) are allocated to the time slots, a different processing is performed.

In other words, the scheduling processing unit 1092 moves the messages (i.e. data blocks) that could not be moved to other time slots to a time slot after the range of the time slots to be processed presently (step S343).

Figure 43:
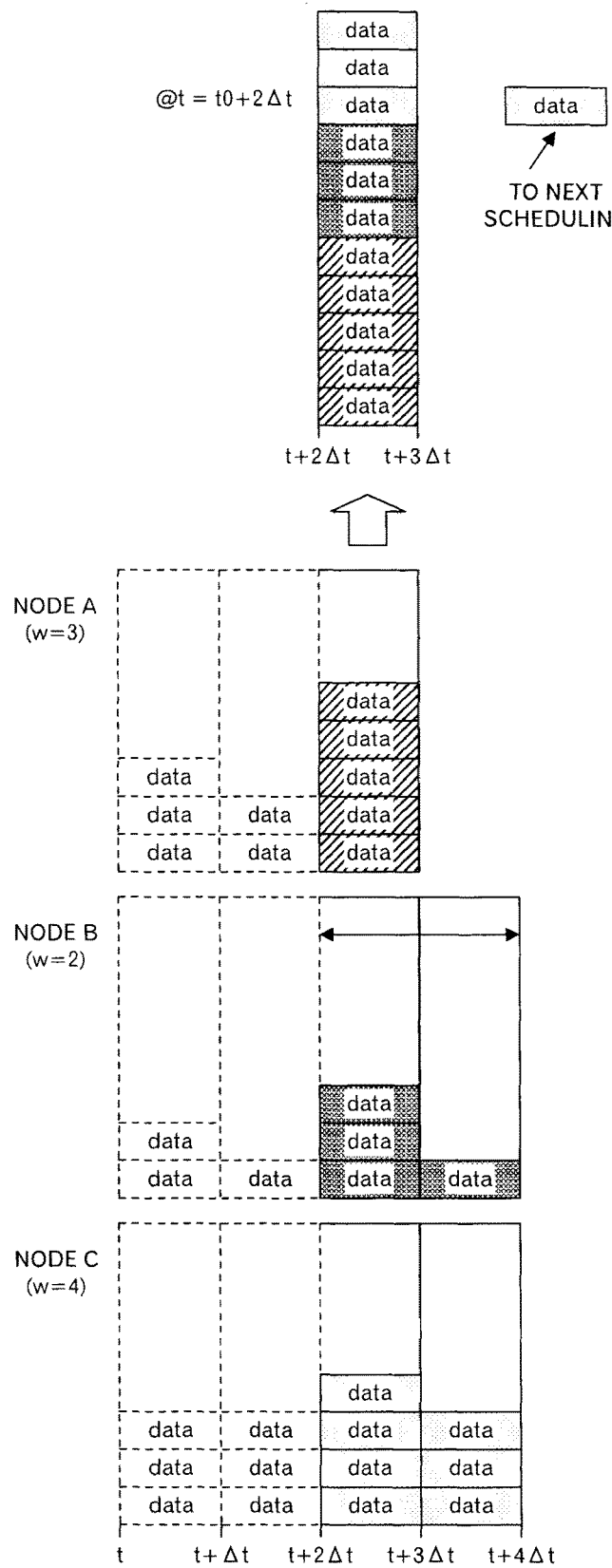
FIG. 43 is a diagram depicting processing contents of the scheduling processing unit in the third embodiment.

FIG. 43 schematically illustrates a processing at the activation timing "t0+2Δt" after FIG. 40. This is a state that the second scheduling request was received from the node B, however, only the first scheduling request was received from other nodes. Then, the time slot for which the transmission schedules from all nodes have been obtained is only the third time slot. When the number of messages is counted for this time slot, one message (i.e. one data block) exceeds the range of the receiving resources as illustrated in the top stage of FIG. 43. However, because only one time slot is processed, it is impossible to move the message to the later time slot or previous time slot. Then, the message (i.e. data block)

is moved to the time slot after (i.e. immediately after) the range of the time slots to be processed presently in ascending order of the priority.

Thus, in each time slot in the scheduling window, it is possible to suppress the receipt of the messages within the range of the receiving resources, and the congestion is suppressed, and the delay of the data transmission is also suppressed.

Then, the scheduling processing unit 1092 determines whether or not a value of the counter n is equal to or greater than the number of time slots to be processed presently (step S345). When this condition is not satisfied, the scheduling processing unit 1092 increments n by "1" (step S347), and the processing returns to the step S327 in FIG. 41 through terminal J. On the other hand, when n is equal to or greater than the number of time slots to be processed presently, the processing shifts to a processing in FIG. 44 through terminal I.

Figure 44:
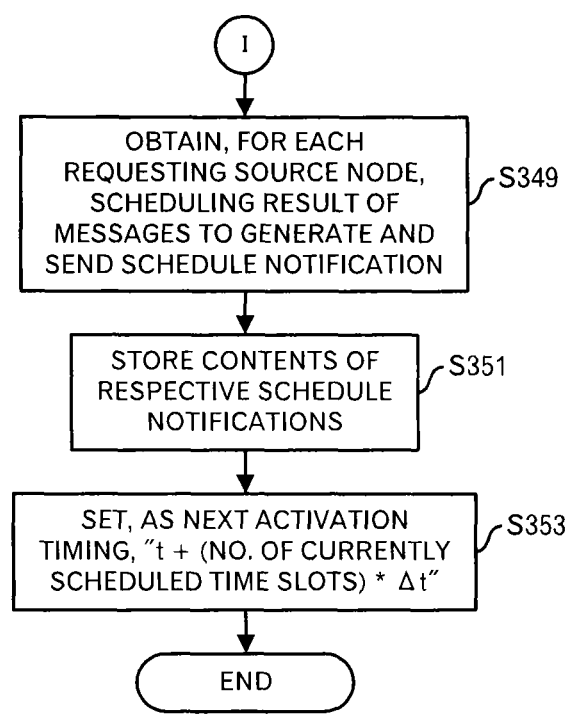
FIG. 44 is a diagram depicting a processing flow of a processing executed by the scheduling processing unit and the like in the third embodiment.

Shifting to the explanation of the processing in FIG. 44, the scheduling processing unit 1092 extracts the scheduling result (i.e. transmission schedule) of the messages for each requesting source node, generates the schedule notification, and causes the notification unit 1093 to transmit the schedule notification to each requesting source node (step S349).

Then, the scheduling processing unit 1092 stores the contents of the respective schedule notifications in the scheduling data storage unit 111 (step S351).

Furthermore, the scheduling processing unit 1092 sets "t+(No. of currently scheduled time slots)*Δt" as the next activation timing (step S353). This step is the same as that at the step S323.

Figure 45:
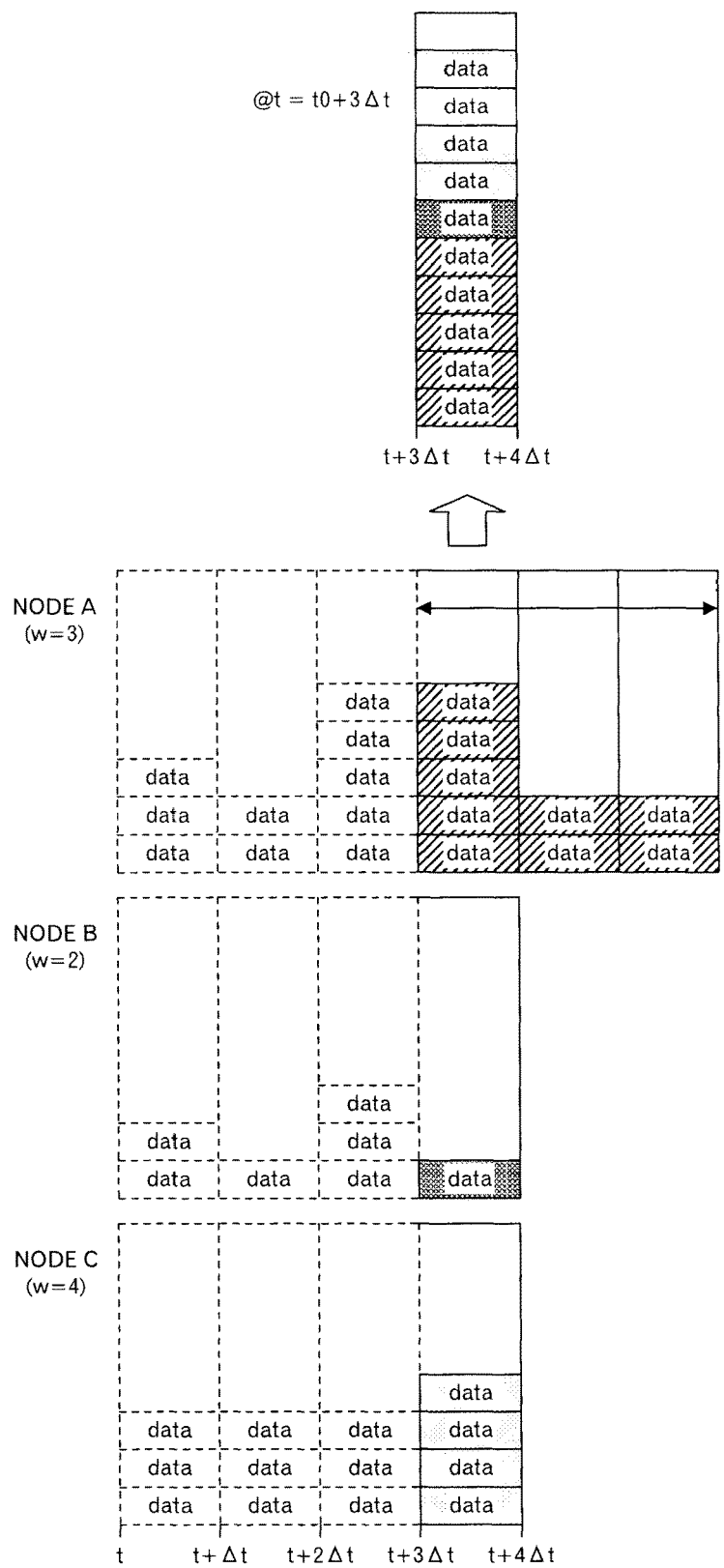
FIG. 45 is a diagram depicting processing contents of the scheduling processing unit in the third embodiment.

FIG. 45 illustrates a state after the processing for FIG. 43. Here, a state is illustrated that the second scheduling request was received from the node A. Here, there is only one common unprocessed time slot for the scheduling requests from the nodes A to C. Then, when the number of messages is counted as illustrated in the top of FIG. 45, the number of messages is within the range of the receiving resources. However, as illustrated in FIG. 43, one message (i.e. data block) is added. Therefore, the time slot of the allocation destination for that message is changed. Such a scheduling result is notified to each node.

Figure 46:
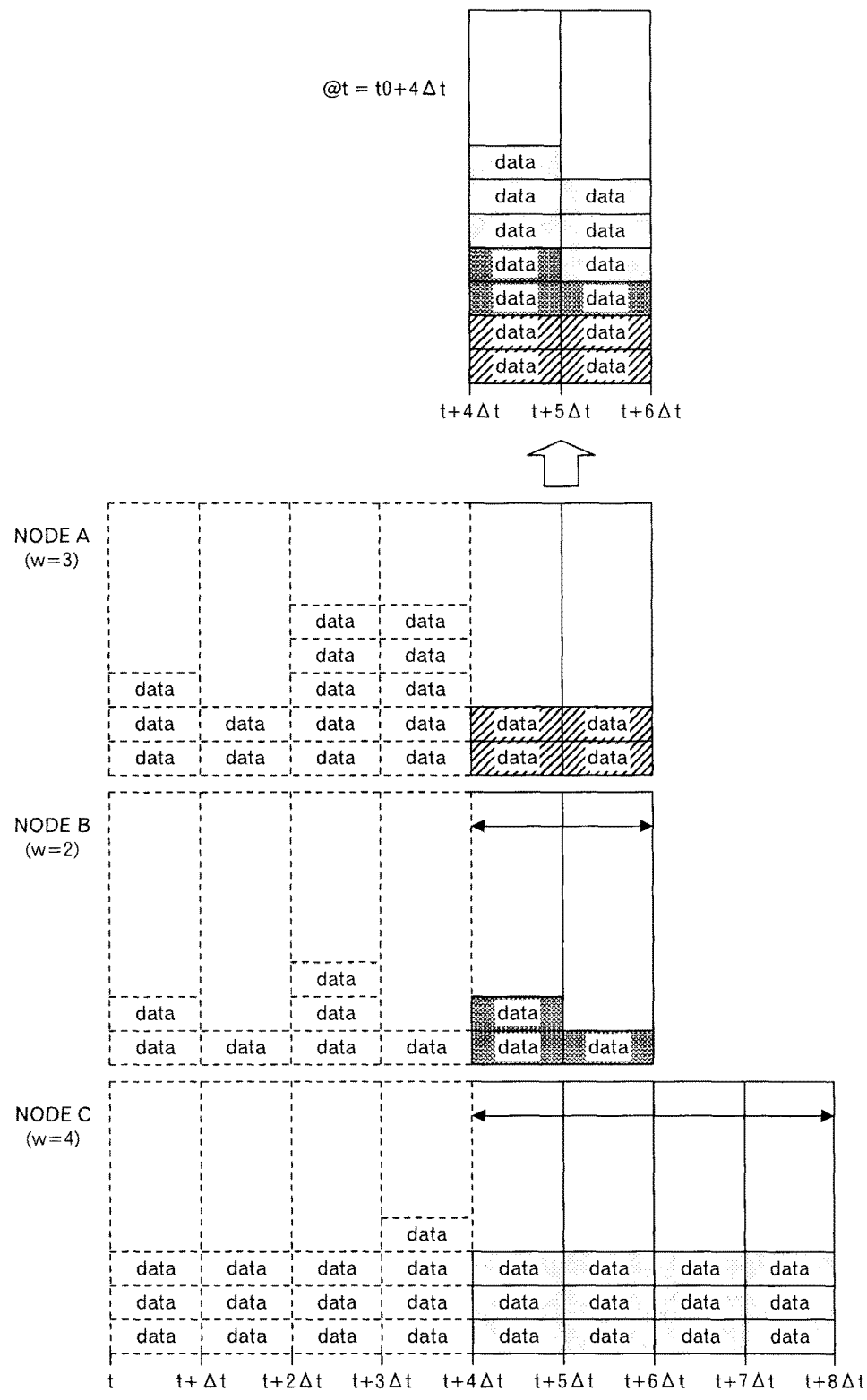
FIG. 46 is a diagram depicting processing contents of the scheduling processing unit in the third embodiment.

Furthermore, FIG. 46 illustrates a state after the processing in FIG. 45 was performed. In other words, FIG. 46 illustrates a state that the third scheduling request was received from the node B, and the second scheduling request was received from the node C. Then, two unprocessed time slots are processed this time. As illustrated in the top of FIG. 46, for any of the two time slots, only messages (i.e. data blocks) within the range of the receiving resources scheduled to be transmitted. Therefore, each node is notified so as to transmit the messages as requested.

Thus, it becomes possible to cope with the difference between the scheduling windows and gaps in the initial activation timings.

Even when the data size of each message is different like in the second embodiment, this embodiment is modified like in the second embodiment.

Embodiment 4

In this embodiment, a case is explained where the upper limit value of the transmission resource is considered.

Figure 47:
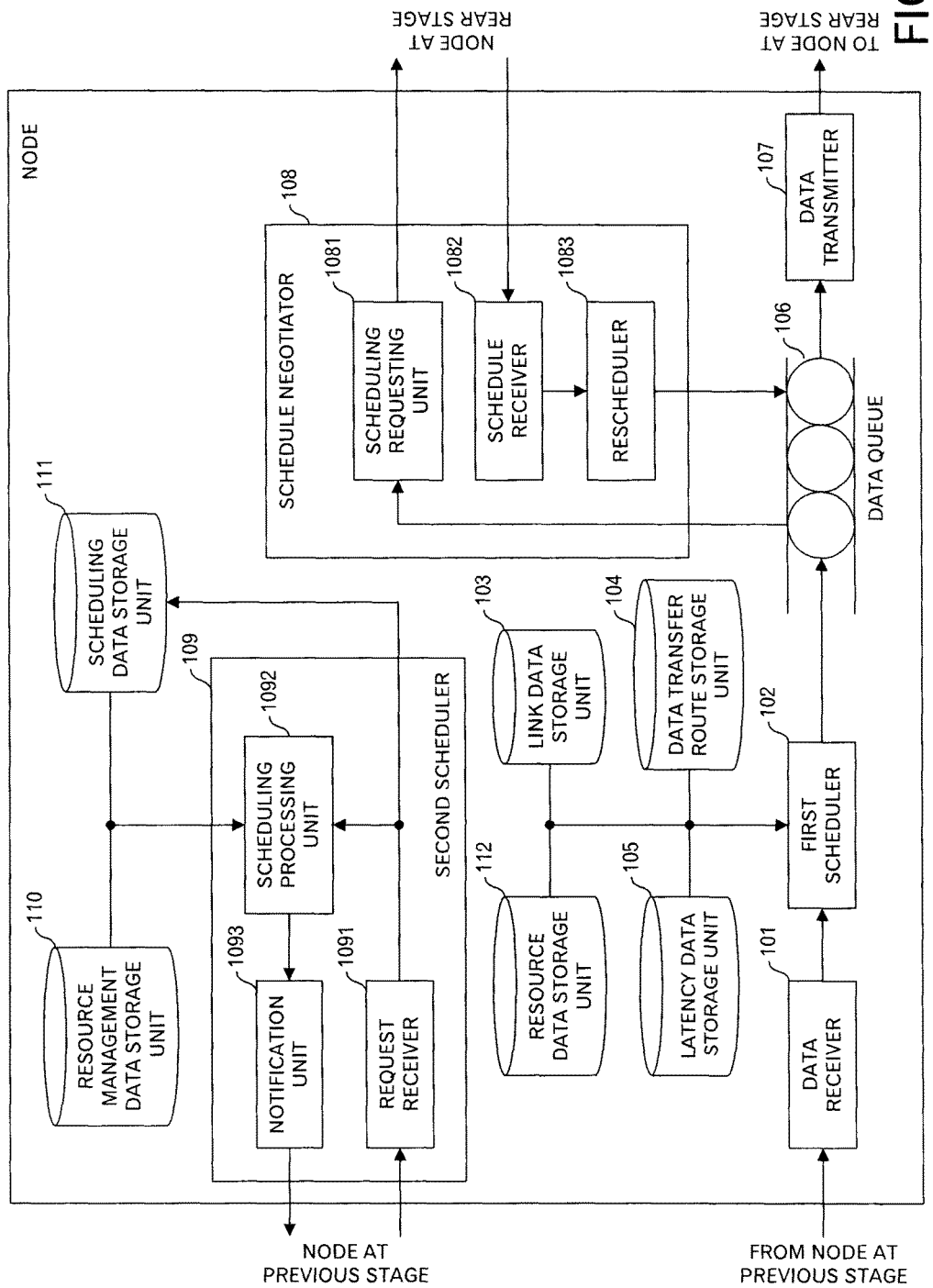
FIG. 47 is a diagram depicting a configuration example of the node in a fourth embodiment.

FIG. 47 illustrates the configuration of the node relating to this embodiment. In this embodiment, the resource data storage unit 112 is added, and the first scheduler 102 refers to data of transmission resources, which is stored in this resource data storage unit 112 to control the allocation of the messages to the time slots.

FIG. 48 illustrates a data format example of data stored in the resource data storage unit 112. As illustrated in FIG. 48, data of a time slot width and the maximum number of messages (i.e. the maximum number of data blocks) that can be transmitted in the time slot as the maximum transmission resources are stored. When the maximum number of messages (i.e. the maximum number of data blocks) is different for each time slot, the maximum number of messages (i.e. the maximum number of data blocks) may be stored in correlation with a pair of the start time and the end time of the time slot.

Next, a processing of the data receiver 101 and the first scheduler 102 relating to this embodiment will be explained by using FIGS. 49 and 50.

Figure 49:
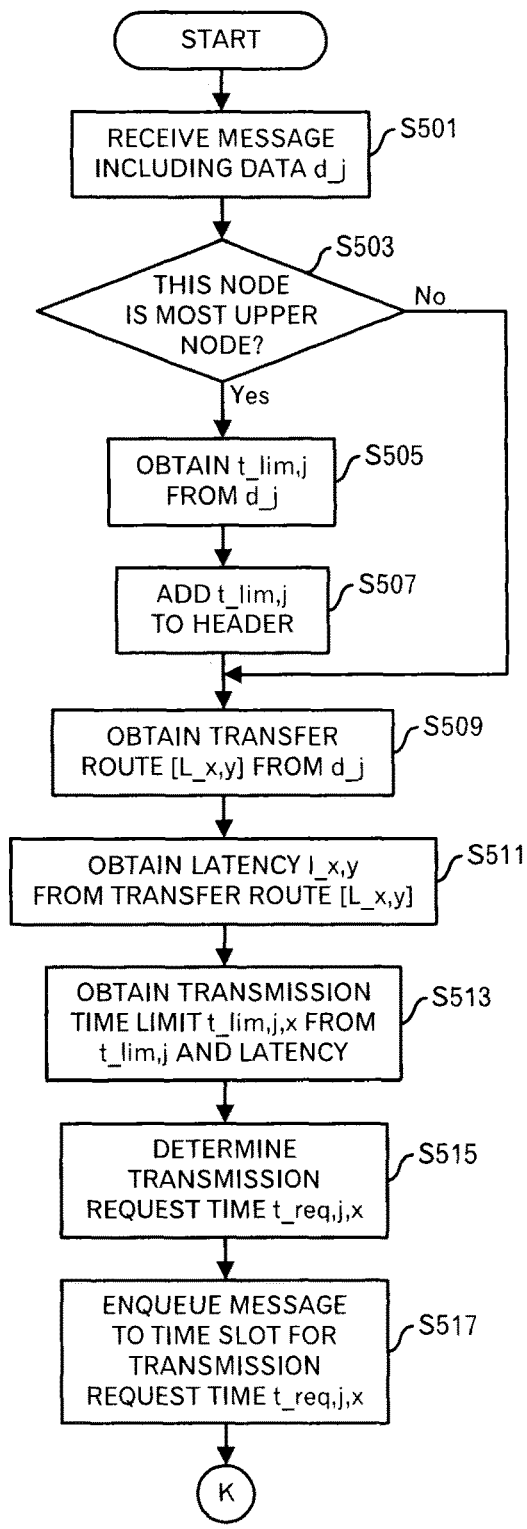
FIG. 49 is a diagram depicting a processing flow of a processing executed by the first scheduler and the like in the fourth embodiment.

The data receiver 101 receives a message including data $d_j$, and outputs the message to the first scheduler 102 (FIG. 49: step S501). When its own node is the most upper node that is connected to the data source (step S503: Yes route), the first scheduler 102 searches the latency data storage unit 105 for the ID of data "$d_j$" to read out the latency that is allowed up to the destination, and obtains the delivery time limit (step S505). For example, the delivery time limit is calculated by "the present time+the latency". When the delivery time limit itself is stored in the latency data storage unit 105, it is used. On the other hand, when its own node is not the most upper node (step S503: No route), the processing shifts to step S509.

Moreover, the first scheduler 102 adds the delivery time limit $t_{lim,j}$ to the received message header (step S507). Thus, the message as illustrated in FIG. 7 is generated.

Furthermore, the first scheduler 102 searches the data transfer route storage unit 104 for $d_j$ to read out the transfer route $[L_{x,y}]$ (step S509). The transfer route is assumed to be array data of the link IDs.

Then, the first scheduler 102 searches the latency data storage unit 105 for each link ID in the transfer route $[L_{x,y}]$, and reads out the latency $l_{x,y}$ for each link (step S511).

After that, the first scheduler 102 calculates the transmission time limit $t_{lim,j,x}$ of this node from the delivery time limit $t_{lim,j}$ and latency $l_{x,y}$ (step S513). Specifically, the transmission time limit is calculated as follows:

$$t_{lim,j} - \Sigma l_{x,y}$$

(a total sum with respect to all links on the transfer route).

Then, the first scheduler 102 determines the transmission request time $t_{req,j,x}$ from the transmission time limit $t_{lim,j,x}$ (step S515). $t_{lim,j,x} = t_{req,j,x}$ may hold, and $t_{req,j,x} = t_{lim,j,x} - \alpha$ may be employed when a constant margin $\alpha$ is considered. In the following explanation, the transmission time limit=the transmission request time holds in order to simplify the explanation.

Then, the first scheduler 102 throws the message and additional data into the time slot of the transmission request time $t_{req,j,x}$ (step S517). Data as illustrated in FIGS. 11A and 11B is stored. The processing up to this step is the same as that in the first embodiment. The processing shifts to a processing in FIG. 50 through terminal K.

Figure 50:
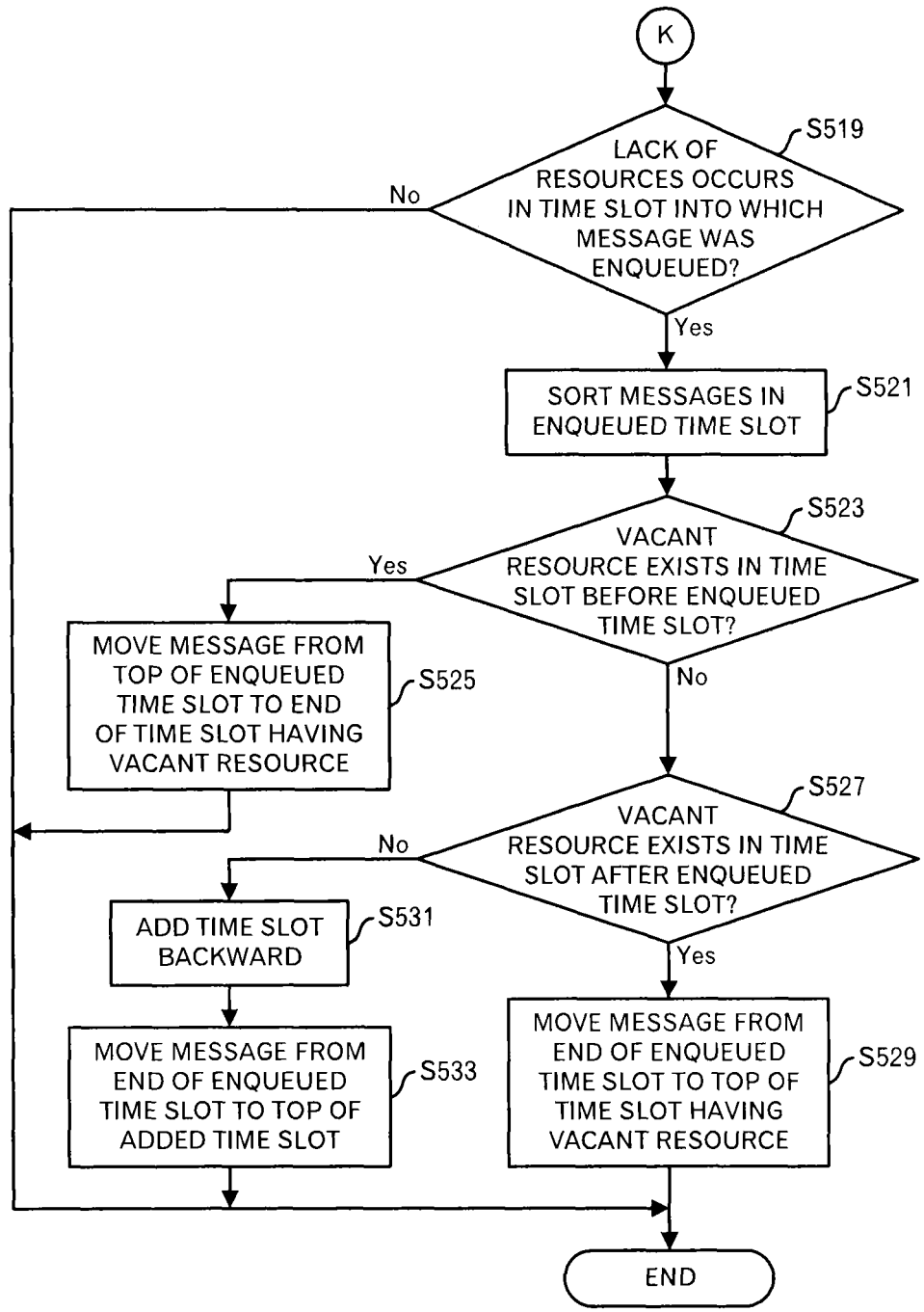
FIG. 50 is a diagram depicting a processing flow of a processing executed by the first scheduler and the like in the fourth embodiment.

Shifting to the explanation of the processing in FIG. 50, the first scheduler 102 determines, from the transmission resources (the maximum number of messages (i.e. the maximum number of data blocks)) stored in the resource data storage unit 112, whether or not lack of the resources occurs in the time slot to which the message was enqueued (step S519). When there is no shortage of the resources in the time slot to which the message was enqueued, the processing ends.

On the other hand, when the lack of the resources occurs in the time slot to which the message was enqueued, the first scheduler 102 sorts the messages within the time slot to which the message that was received at this time was enqueued by using, as a first key, the transmission time limit of this node and by using, as a second key, the delivery time limit (step S521).

Then, the first scheduler 102 determines whether or not there is a vacant transmission resource in a time slot before the time slot to which the message that was received at this time was enqueued (step S523). When the transmission is moved forward, it is possible to suppress the possibility of the delay of the data transmission. Therefore, firstly, the previous time slot is checked.

When there is a vacant time slot before the time slot to which the message was enqueued, the first scheduler 102 moves the message from the top of the time slot to which the message that was received at this time was enqueued to the end of the time slot that has a vacant resource (step S525). Then, the processing ends.

On the other hand, when there is no vacant transmission resource in the time slot before the time slot to which the message was enqueued, the first scheduler 102 determines whether or not there is a vacant resource in the time slot after the time slot to which the message that was received at this time was enqueued (step S527).

When there is a vacant resource in the time slot after the time slot to which the message was enqueued, the first scheduler 102 moves the message from the end of the time slot to which the message that was received at this time was enqueued to the top of the time slot that has a vacant resource (step S529). Then, the processing ends.

On the other hand, when there is no resource in the time slot after the time slot to which the message was enqueued, the first scheduler 102 adds a time slot after the time slots that have been defined (step S531), and moves the message that was received at this time from the end of the time slot to which the message that was received at this time was enqueued to the top of the added time slot (step S533).

When such a processing is performed, it is possible to transmit data within the range of the transmission resources of data, and the congestion is suppressed and the delay of the data transmission is also suppressed.

Because other processing contents are the same as those in the first embodiment, the further explanation is omitted.

Embodiment 5

The fourth embodiment is also transformed into a form that the data size is taken into consideration, like the second embodiment.

The node configuration is the same as that illustrated in FIG. 47. However, as explained in the second embodiment, the processing contents are different. Furthermore, because the transmission resources are taken into consideration in the fourth embodiment, the processing of the data receiver 101 and the first scheduler 102 is also different. Moreover, FIG. 51 illustrates a data format of data stored in the resource data storage unit 112. Also in FIG. 51, a time slot width and the maximum number of bits that can be transmitted in the time slot width $\Delta t$ are stored.

Next, the processing contents of the data receiver 101 and the first scheduler 102 will be explained by using FIGS. 52 and 53.

Figure 52:
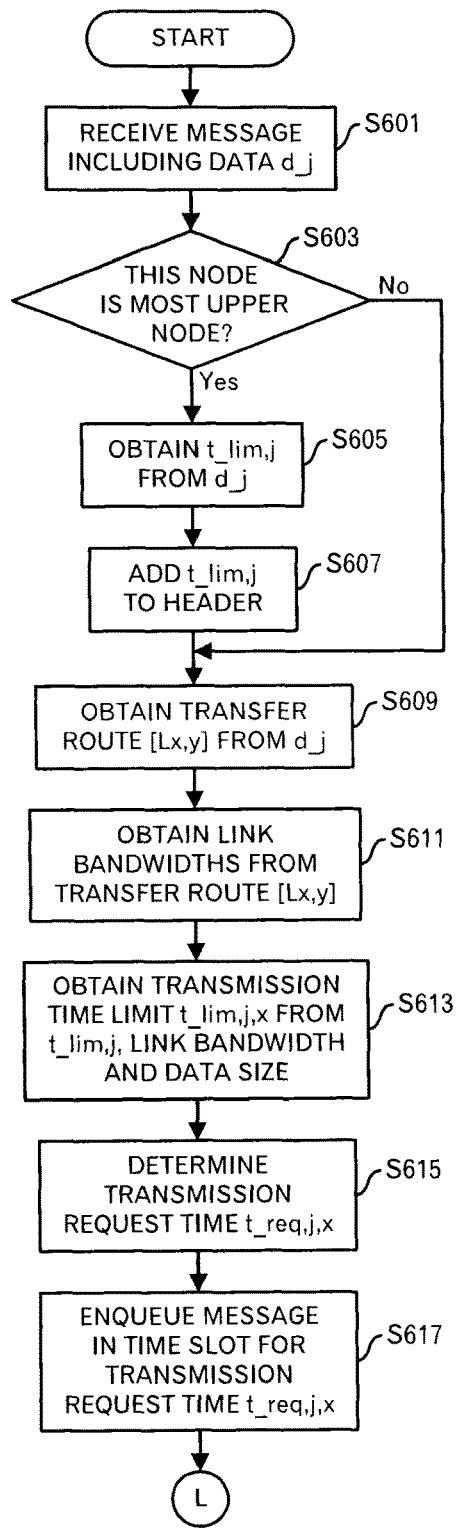
FIG. 52 is a diagram depicting a processing flow of a processing executed by the first scheduler and the like in the fifth embodiment.

The data receiver 101 receives a message including data $d_j$, and outputs the message to the first scheduler 102 (FIG. 52: step S601). When its own node is the most upper node that is connected with the data source (step S603: Yes route), the first scheduler 102 searches the latency data storage unit 105 for an ID of the data "$d_j$" to read out the latency that is allowed up to the destination, and obtains the delivery time limit $t_{lim,j}$ (step S605). For example, the delivery time limit is calculated by "the present time+the latency".

When the delivery time limit itself is stored in the latency data storage unit 105, it is employed. On the other hand, when its own node is not the most upper node (step S603: No route), the processing shifts to the step S609.

Moreover, the first scheduler 102 adds the delivery time limit $t_{lim,j}$ to the received message header (step S607). By doing so, the message as illustrated in FIG. 7 is generated.

Furthermore, the first scheduler 102 searches the data transfer route storage unit 104 for "$d_j$" to read out the transfer route $[L_{x,y}]$ (step S609). The transfer route is assumed to be array data of the link IDs.

Then, the first scheduler 102 searches the latency data storage unit 105 for each link ID of the transfer route $[L_{x,y}]$ to read out the link bandwidth $c_{x,y}$ of each link (step S611).

After that, the first scheduler 102 calculates the transmission time limit $t_{lim,j,x}$ at this node from the delivery time limit $t_{lim,j}$, link bandwidth $c_{x,y}$ and the data size of the message (step S613). Specifically, the transmission time limit is calculated as follows:

$$t_{lim,j} - \Sigma s_j / c_{x,y}$$

(a total sum with respect to all links on transfer route).

Then, the first scheduler 102 determines the transmission request time $t_{req,j,x}$ from the transmission time limit $t_{lim,j,x}$ (step S615). "$t_{lim,j,x} = t_{req,j,x}$" may hold, and "$t_{req,j,x} = t_{lim,j,x} - \alpha$" may hold when a constant margin $\alpha$ is considered. In the following explanation, it is assumed that "the transmission time limit=transmission request time" holds in order to make the explanation easy.

Then, the first scheduler 102 throws the message (i.e. data block) and additional data into a time slot for the transmission request time $t_{req,j,x}$ (step S617). Then, the processing shifts to a processing in FIG. 53 through terminal L.

Figure 53:
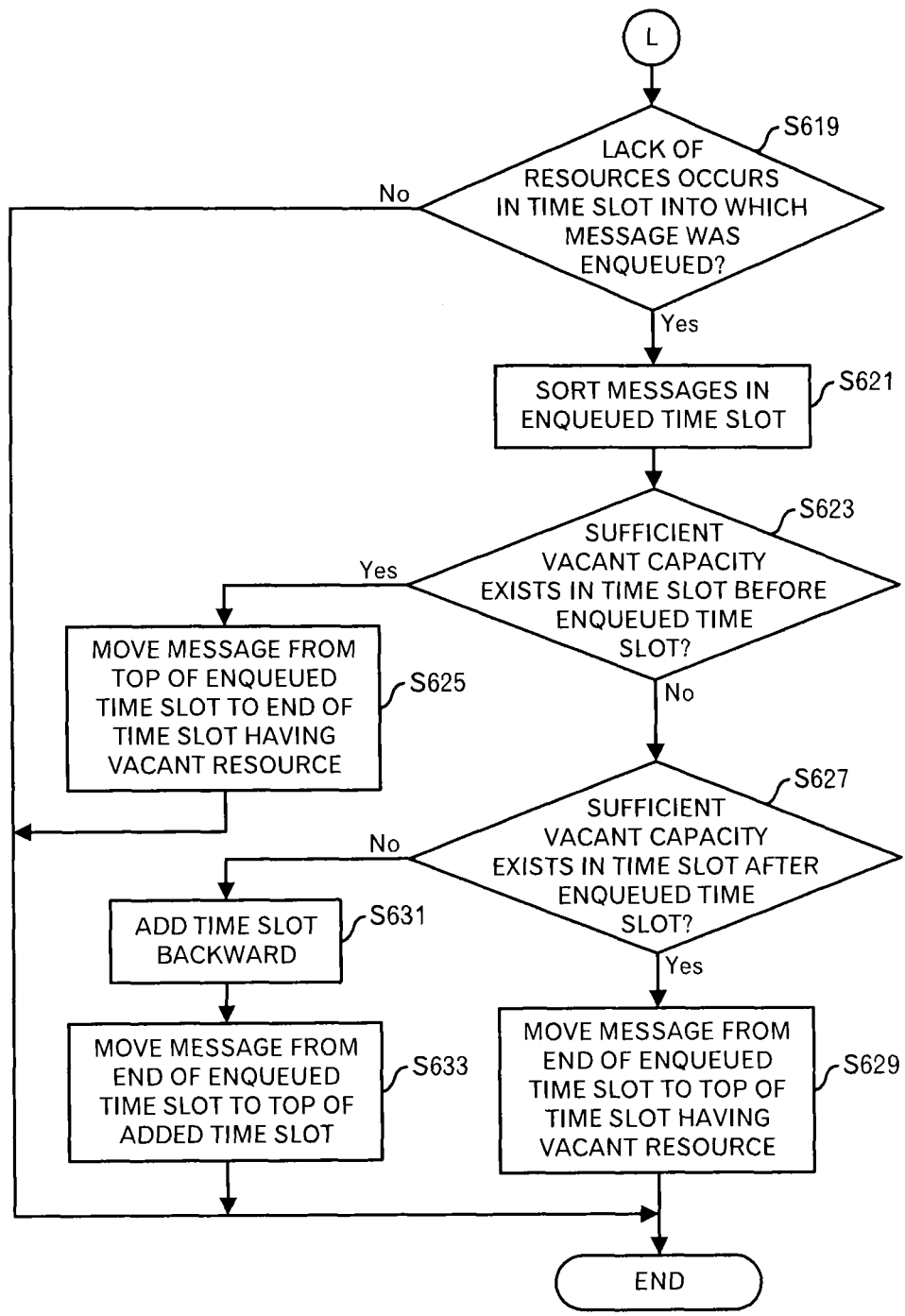
FIG. 53 is a diagram depicting a processing flow of a processing executed by the first scheduler and the like in the fifth embodiment.

Shifting to the explanation of the processing in FIG. 53, the first scheduler 102 determines whether or not lack of transmission resources in the time slot to which the message was enqueued, based on the transmission resource (the maximum number of bits) stored in the resource data storage unit 112 (step S619). In other words, a total sum of data sizes of the messages (i.e. data blocks) in the time slot to which the message was enqueued is calculated to compare the total sum with the maximum number of bits. When the transmission resources of the time slot to which the message was enqueued are sufficient, the processing ends.

On the other hand, when the lack of the transmission resources occurs in the time slot to which the message was enqueued, the first scheduler 102 sorts messages within the time slot to which the message that was received at this time was enqueued by using, as a first key, the transmission time limit at this node and using, as a second key, the delivery time limit (step S621).

Then, the first scheduler 102 determines whether or not there is a vacant capacity of the transmission resource in a time slot before the time slot to which the messages that was received at this time was enqueued (step S623). When the transmission is moved forward, it is possible to suppress the possibility of the delay of the data transmission. Therefore, firstly, the previous time slot is checked. Whether or not there is a vacant capacity of the transmission resource is determined based on whether or not the vacant capacity is equal to or greater than the data size of the top message (i.e. top data block) in the time slot to which the message that was received at this time was enqueued.

When there is a vacant capacity of the transmission resource in the time slot before the time slot to which the message was enqueued, the first scheduler 102 moves the message from the top of the time slot to which the message that was received at this time was enqueued to the end of the time slot having the vacant transmission resource (step S625). Then, the processing ends.

On the other hand, when there is no vacant transmission resource in the time slot before the time slot to which the message was enqueued, the first scheduler 102 determines whether or not there is a vacant capacity of the transmission resource in a time slot after the time slot to which the message that was received at this time was enqueued (step S627). Similarly to the step S623, whether or not there is a vacant capacity of the transmission resource is determined based on whether or not the vacant capacity is equal to or greater than the data size of the end message (i.e. end data block) in the time slot to which the message that was received at this time was enqueued.

When there is a vacant capacity of the transmission resource in the time slot after the time slot to which the message was enqueued, the first scheduler 102 moves the message from the end of the time slot to which the message that was received at this time was enqueued to the top of the time slot having the vacant capacity of the transmission resource (step S629). Then, the processing ends.

On the other hand, when there is no vacant transmission resource in the time slot after the time slot to which the message was enqueued, the first scheduler 102 adds a time slot after the time slots that has already been defined (step S631), and moves the message from the end of the time slot to which the message that was received at this time was enqueued to the top of the added time slot (step S633).

By performing such a processing, it becomes possible to transmit data within the range of the transmission resources of the data, and the congestion is suppressed, and the delay of the data transmission is also suppressed.

Other processing contents are the same as those in the fourth embodiment. Therefore, further explanation is omitted.

Embodiment 6

Figure 54:
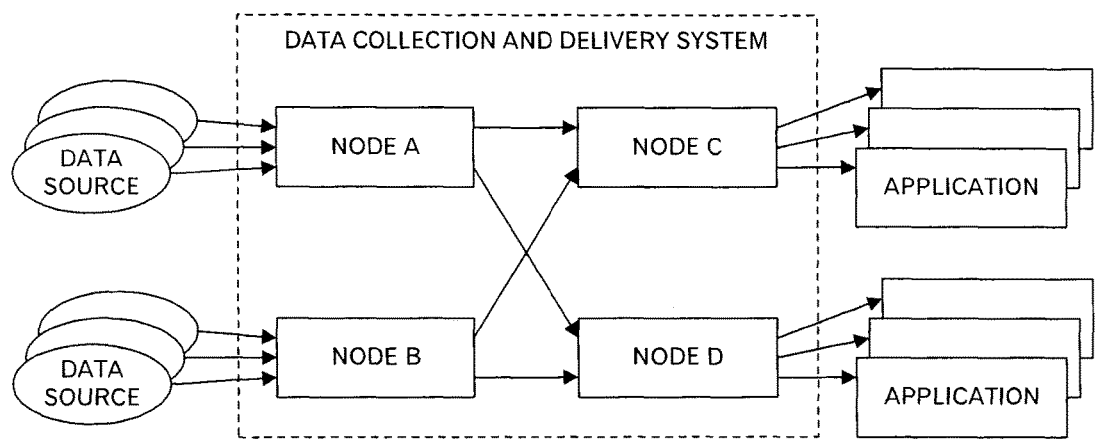
FIG. 54 is a diagram depicting an outline of the system in a sixth embodiment.

This embodiment handles a case, as illustrated in FIG. 54, the node A transmits a message (i.e. data block) to the nodes C and D, and the node B transmits a message (i.e. data block) to the nodes C and D. Thus, when plural nodes transmit the message (i.e. data block), a data queue is provided for each transmission destination node.

Figure 55:
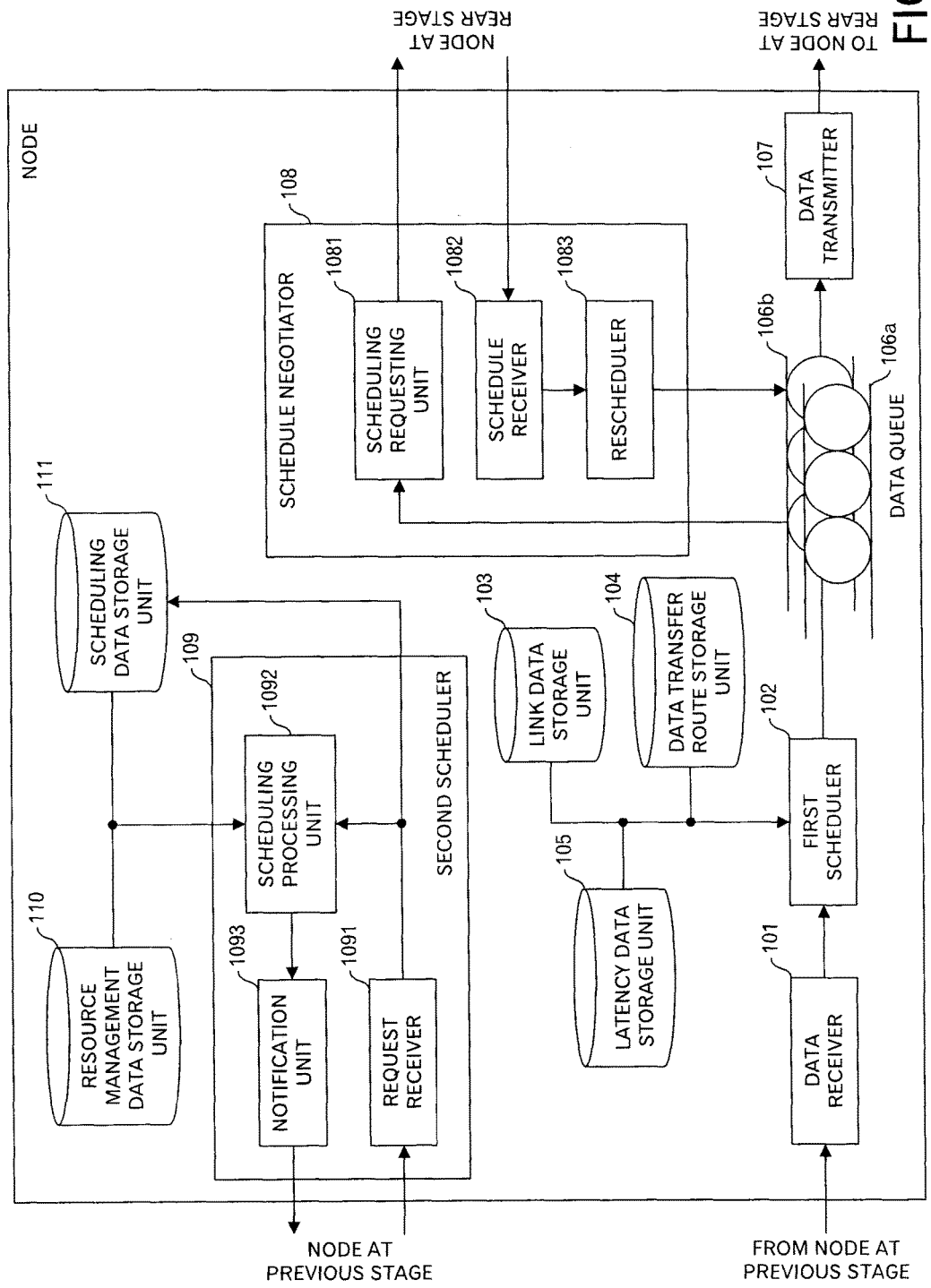
FIG. 55 is a diagram depicting a configuration example of the node in the sixth embodiment.

In other words, a configuration example of the node is modified as illustrated in FIG. 55. A point that is different from the configuration of the node in the first embodiment is that the data queues 106a and 106b are provided for the respective transmission destination nodes. In other words, data is stored in a data format as illustrated in FIGS. 11A and 11B in each of the data queues 106a and 106b.

Figure 56:
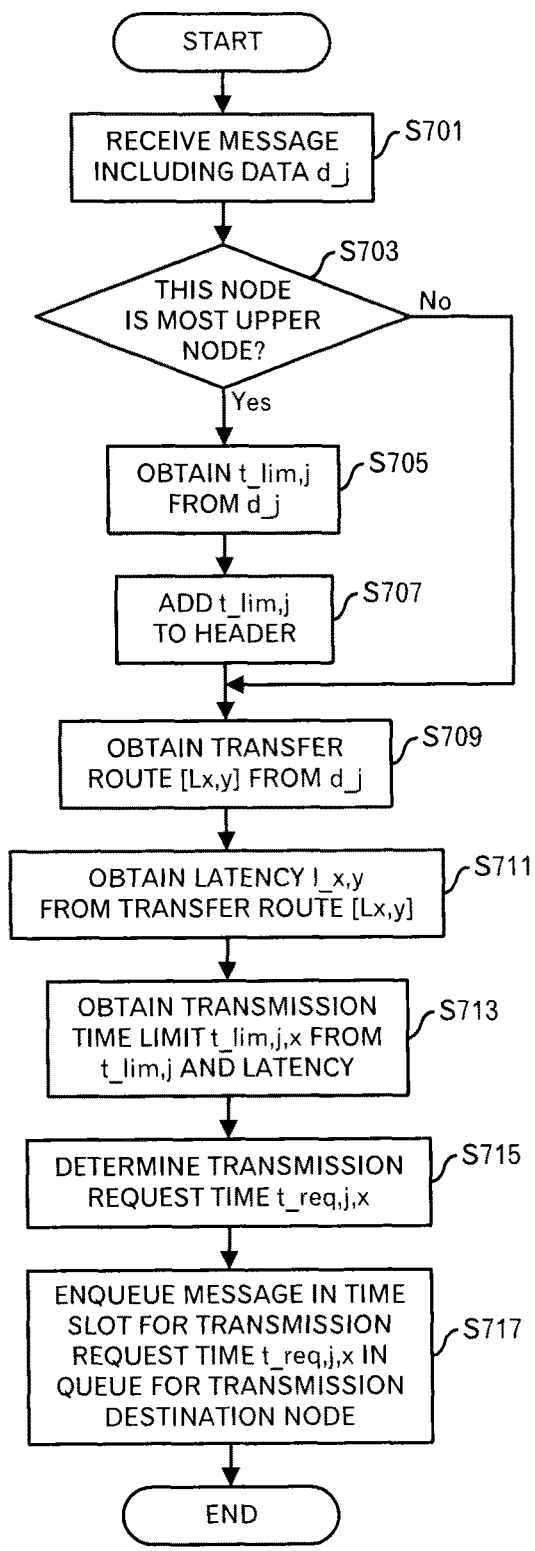
FIG. 56 is a diagram depicting a processing flow of a processing when the message is received in the sixth embodiment.

Next, processing contents when the message is received will be explained by using FIG. 56.

The data receiver 101 receives a message including data $d_j$ and outputs the message to the first scheduler 102 (step S701). When its own node is the most upper node that is connected with the data source (step S703: Yes route), the first scheduler 102 searches the latency data storage unit 105 for the ID "$d_j$" of the data to read out the latency that is allowed up to the destination, and obtains the delivery time limit $t_{lim,j}$ (step S705). For example, the delivery time limit is calculated by "the present time+latency". When the delivery time limit itself is stored in the latency data storage unit 105, it is employed. On the other hand, when its own node is not the most upper node (step S703: No route), the processing shifts to step S709.

Moreover, the first scheduler 102 adds the delivery time limit to the received message header (step S707). Thus, the message as illustrated in FIG. 7 is generated.

Furthermore, the first scheduler 102 searches the data transfer route storage unit 104 for "$d_j$" to read out the transfer route $[L_{x,y}]$ (step S709). The transfer route is assumed to be array data of the link IDs.

Then, the first scheduler 102 searches the latency data storage unit 105 for each link ID of the transfer route $[L_{x,y}]$ to read out the latency $l_{x,y}$ of each link (step S711).

After that, the first scheduler 102 calculates the transmission time limit $t_{lim,j,x}$ at this node from the delivery time limit $t_{lim,j}$ and the latency $l_{x,y}$ (step S713). Specifically, the transmission time limit is calculated as follows:

$$t_{lim,j} - \Sigma l_{x,y}$$

(a total sum with respect to all links on the transfer route).

Then, the first scheduler 102 determines the transmission request time t from the transmission time limit $t_{lim,j,x}$ (step S715). "$t_{lim,j,x} = t_{req,j,x}$" may hold, and "$t_{req,j,x} = t_{lim,j,x} - \alpha$" may hold considering a constant margin $\alpha$. In the following explanation, "the transmission time limit=the transmission request time" is employed in order to simplify the explanation.

Then, the first scheduler 102 throws the message and additional data into the time slot of the transmission request time $t_{req,j,x}$ in the data queue for the transmission destination node (step S717). Data as illustrated in FIGS. 11A and 11B is stored.

The aforementioned processing is performed every time when the message is received.

The processing contents of the second scheduler 109 are the same as those in the first embodiment. Therefore, further explanation is omitted.

Figure 57:
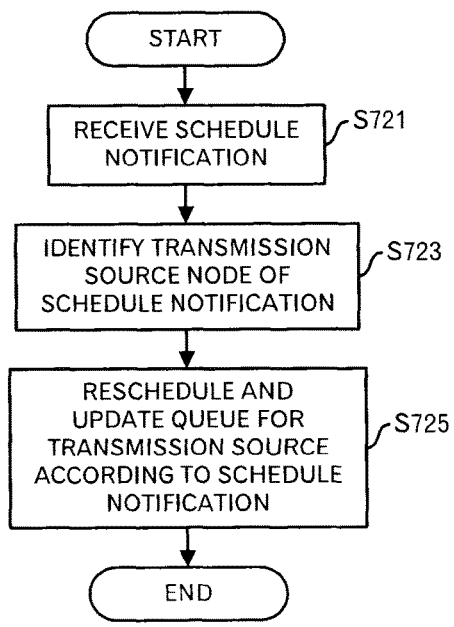
FIG. 57 is a diagram depicting a processing flow of a processing executed by a rescheduler in the sixth embodiment.

However, processing contents of the schedule negotiator 108 are partially different. In other words, the processing contents of the rescheduler 1083 are changed as illustrated in FIG. 57.

In other words, the schedule receiver 1082 receives schedule notification including a schedule result (step S721), and output the received notification to the rescheduler 1083. A data format of the schedule notification is a format as illustrated in FIGS. 17 and 18.

Then, when the rescheduler 1083 receives the schedule notification, the rescheduler 1083 identifies the data queue 106a or 106b from the ID of the transmission source node (step S723), and performs a processing to update the time slot to which the message (i.e. data block) in the data queue 106a or 106b is thrown, according to the schedule notification (step S725). When the transmission schedule notified by the schedule notification is identical to the transmission schedule in the scheduling request, no special processing is performed. When the message is moved to a different time slot, the message is enqueued into a queue of that time slot. When there is no data for that time slot, the time slot is generated at this stage.

Thus, the transmission schedule adjusted in the transmission destination node can be reflected to the data queue 106a or 106b for that transmission destination node.

The sixth embodiment may be modified so as to take into consideration the data size like the second embodiment.

Embodiment 7

In this embodiment, a case will be explained that the transmission resource is taken into consideration in the sixth embodiment. Specifically, in case where there are plural transmission destination nodes, when the transmission schedules included in the schedule notifications are superimposed, there is a case where messages (i.e. data blocks) that exceed the transmission resources are transmitted. Then, in this embodiment, by changing a processing of the rescheduler 1083, the rescheduling processing is performed taking into consideration the transmission resources.

The configuration of the node relating to the fourth embodiment is similar to that in the embodiment except the data queues 106a and 106b.

Especially, processing contents of the schedule receiver 1082 and the rescheduler 1083 in the schedule negotiator 108 will be explained by using FIGS. 58 to 60E.

In other words, the schedule receiver 1082 receives schedule notification including a schedule result (FIG. 58: step S801), and outputs the notification to the rescheduler 1083. A data format of the schedule notification is the data format as illustrated in FIGS. 17 and 18.

Then, when the rescheduler 1083 receives the schedule notification, the rescheduler 1083 identifies an ID of that transmission source node (step S803).

Then, the rescheduler 1083 identifies the data queue 106a or 106b from the ID of the transmission source node, and performs a processing to update a time slot to which the message (i.e. data block) in the data queue 106a or 106b is thrown, according to the schedule notification (step S805). When the transmission schedule notified by the schedule notification is identical to the transmission schedule in the scheduling request, no special processing is performed. When the message is moved to a different time slot, the message is enqueued in a queue of that time slot. When there is no data of that time slot, the time slot is generated at this stage.

Furthermore, the rescheduler 1083 identifies one unprocessed time slot among the updated time slots (step S807). When there is no updated time slot, the processing ends. On the other hand, plural updated time slots may exist.

Then, the rescheduler 1083 reads out data of the identified time slot for all transmission destinations from the data queue 106a or 106b, and counts the number of messages (i.e. the number of data blocks) (step S809).

Then, the rescheduler 1083 determines whether or not the number of messages that will be transmitted in the identified time slot is within a range of the transmission resources, which are stored in the resource data storage unit 112 (step S811).

When the number of messages that will be transmitted in the identified time slot is within the range of the transmission resources (i.e. the maximum number of messages), the rescheduler 1083 determines whether or not there is an unprocessed time slot among the updated time slots (step S813). When there is no unprocessed time slot, the processing ends. Moreover, when there is an unprocessed time slot, the processing returns to the step S807.

Figure 59:
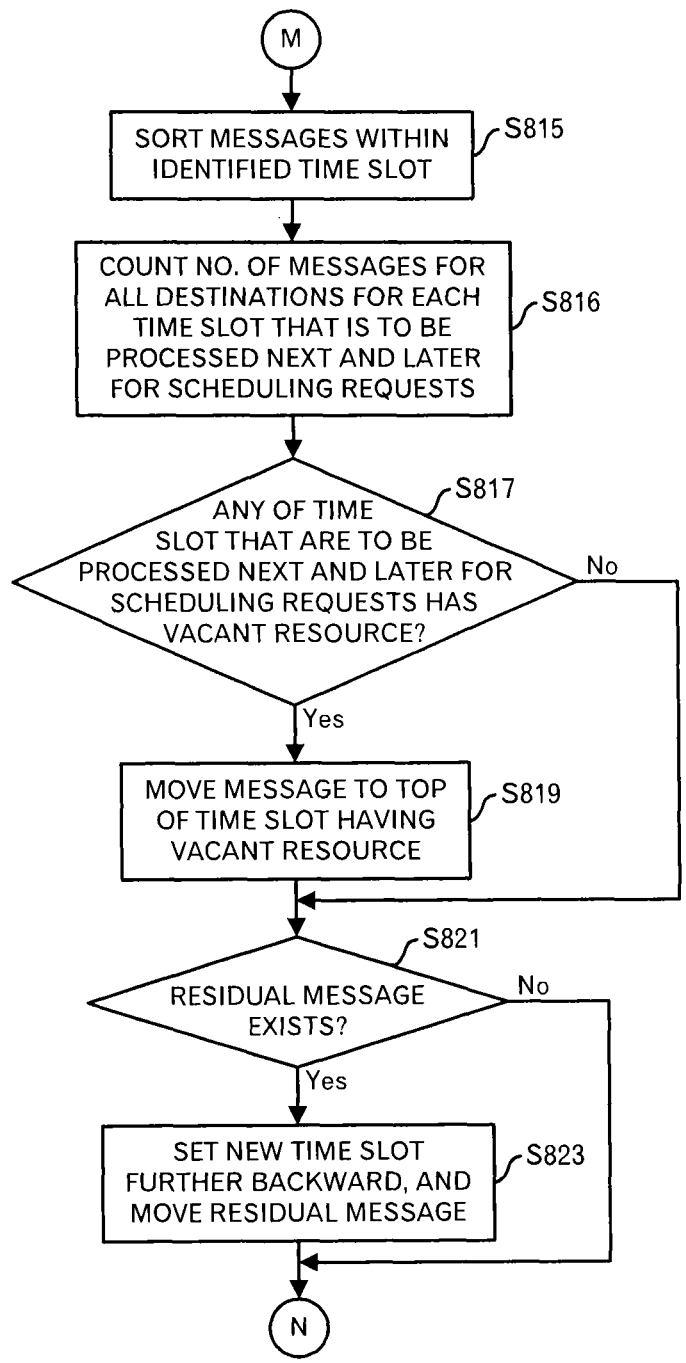
FIG. 59 is a diagram depicting a processing flow of a processing executed by the rescheduler and the like in the seventh embodiment.

On the other hand, when the number of messages that will be transmitted in the identified time slot is not within the range of the transmission resources, in other words, when lack of the transmission resources occurs, the processing shifts to a processing in FIG. 59 through terminal M.

Shifting to the explanation of the processing in FIG. 59, the rescheduler 1083 sorts the messages (i.e. data blocks) within the identified time slot, by using, as a first key, the transmission time limit at this node and by using, as a second key, the delivery time limit (step S815).

After that, the rescheduler 1083 counts the number of messages for all transmission destinations for each time slot that is to be processed next time and later for the scheduling requests (step S816).

Then, the rescheduler 1083 determines whether or not there is a vacant transmission resource in any time slot that is to be processed next time or later for the scheduling request (step S817). When there is no vacant transmission resource, the processing shifts to step S821.

On the other hand, when there is a vacant transmission resource, the rescheduler 1083 moves the message from the end of the identified time slot to the top of the time slot having a vacant transmission resource (step S819).

There is a case where two or more messages exceed the range of the transmission resources. In such a case, the messages of the number of vacant transmission resource in the time slot are picked up and moved from the end of the identified time slot. When three messages exceed the range of the transmission resource, however there is only two vacant transmission resources in the time slot that is to be processed next time or later for the scheduling requests, only two messages are moved to that time slot. Countermeasures are determined for one remaining message in the following processing.

Then, the rescheduler 1083 determines whether or not the present state is a state that the messages that exceed the range of the transmission resources are still allocated to the identified time slot (step S821). When this condition is not satisfied, the processing returns to the step S813 in FIG. 58 through terminal N.

On the other hand, when this condition is satisfied, the rescheduler 1083 additionally sets a time slot after the time slots that have already been generated, and moves the message (i.e. data block) that was not moved to other time slot to the added time slot (step S823).

Thus, in each time slot of the scheduling window, it is possible to suppress the message transmission within the range of the transmission resource, and the congestion is suppressed, and the delay of the data transmission is suppressed.

Figure 58:
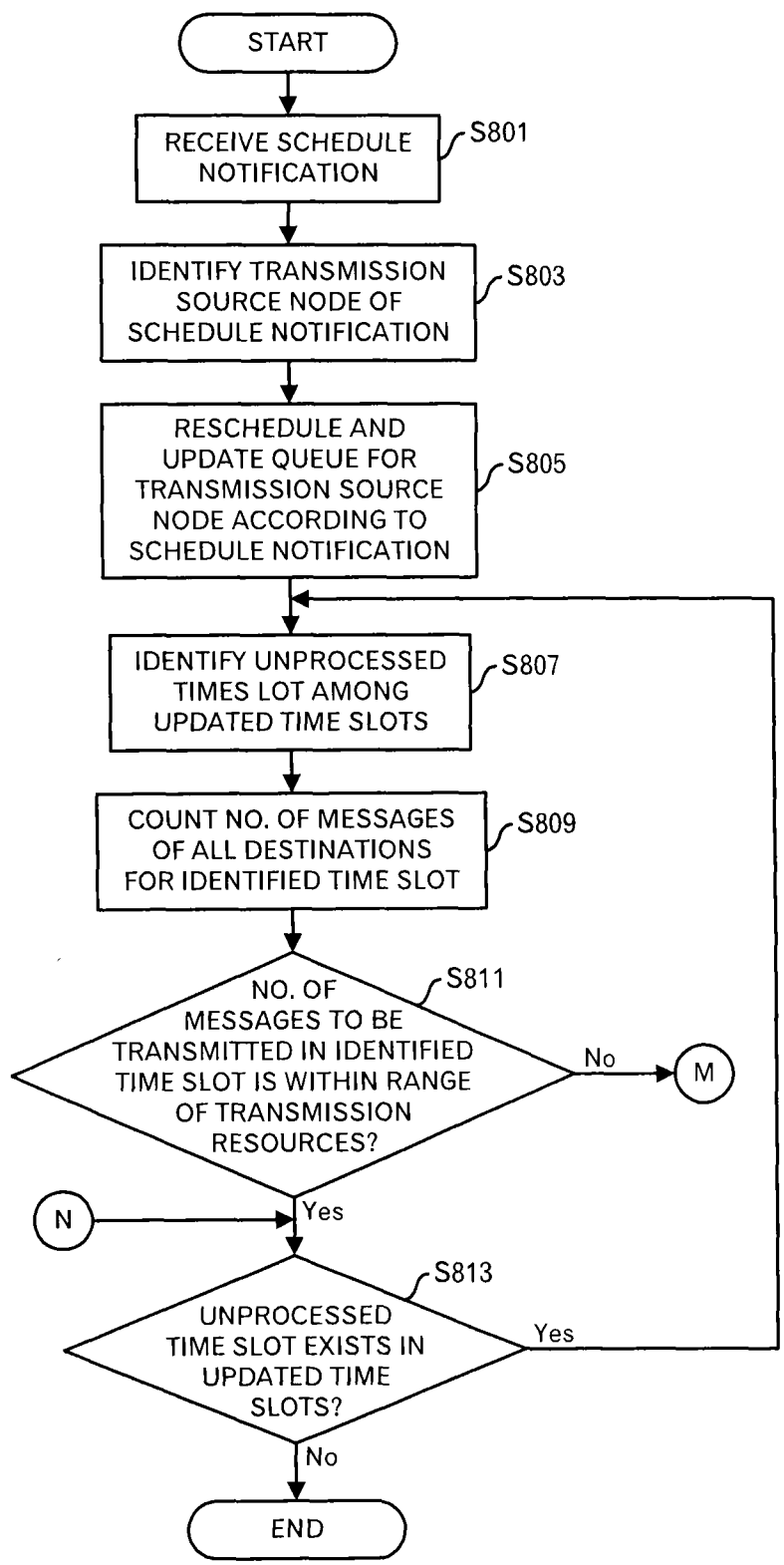
FIG. 58 is a diagram depicting a processing flow of a processing executed by the rescheduler and the like in a seventh embodiment.

In the following, a processing explained by using FIGS. 58 and 59 will be explained by using a specific example in FIGS. 60A to 60E.

Figure 60A:
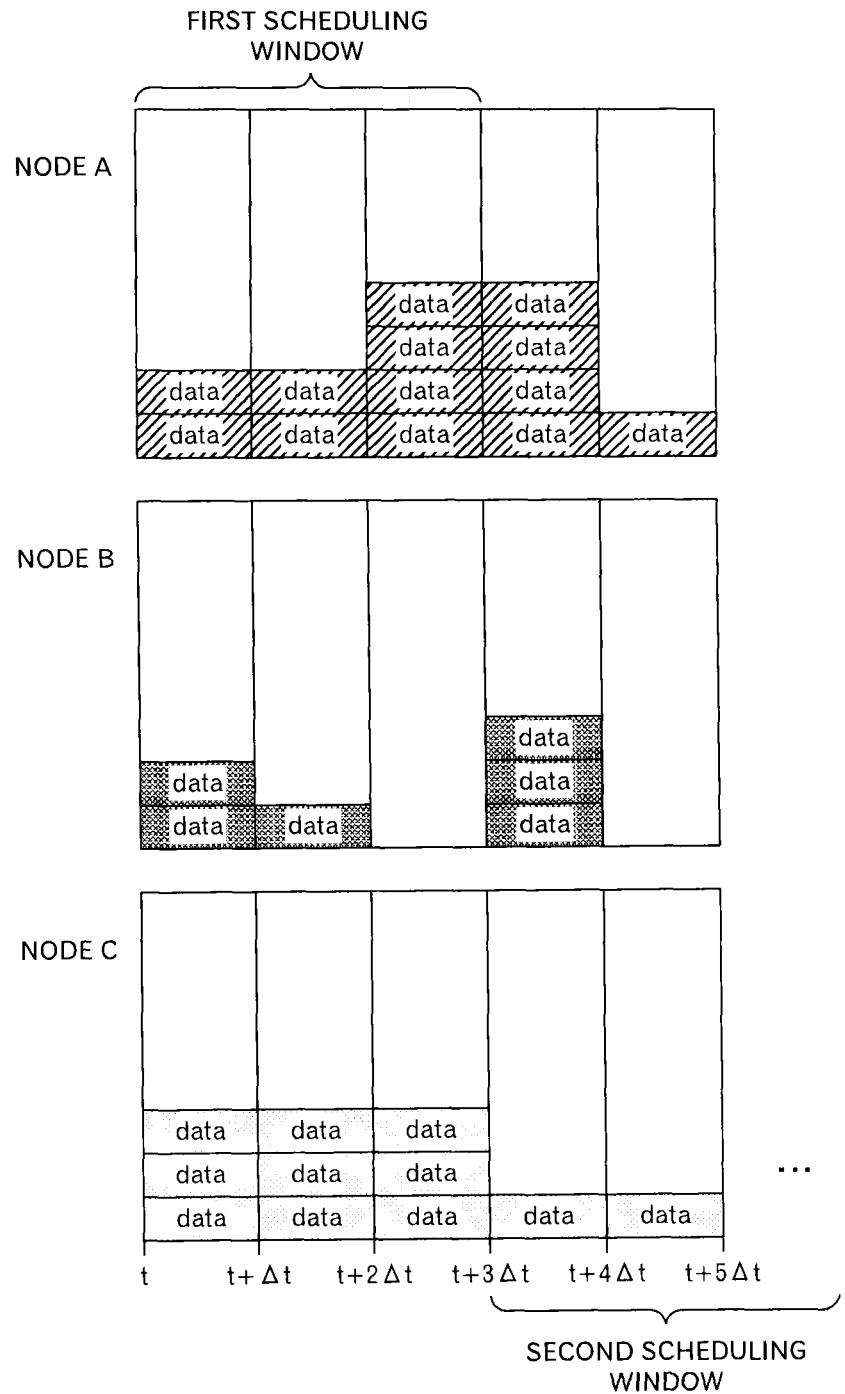
FIG. 60A is a diagram to explain a processing by the rescheduler and the like in the seventh embodiment.
Figure 60B:
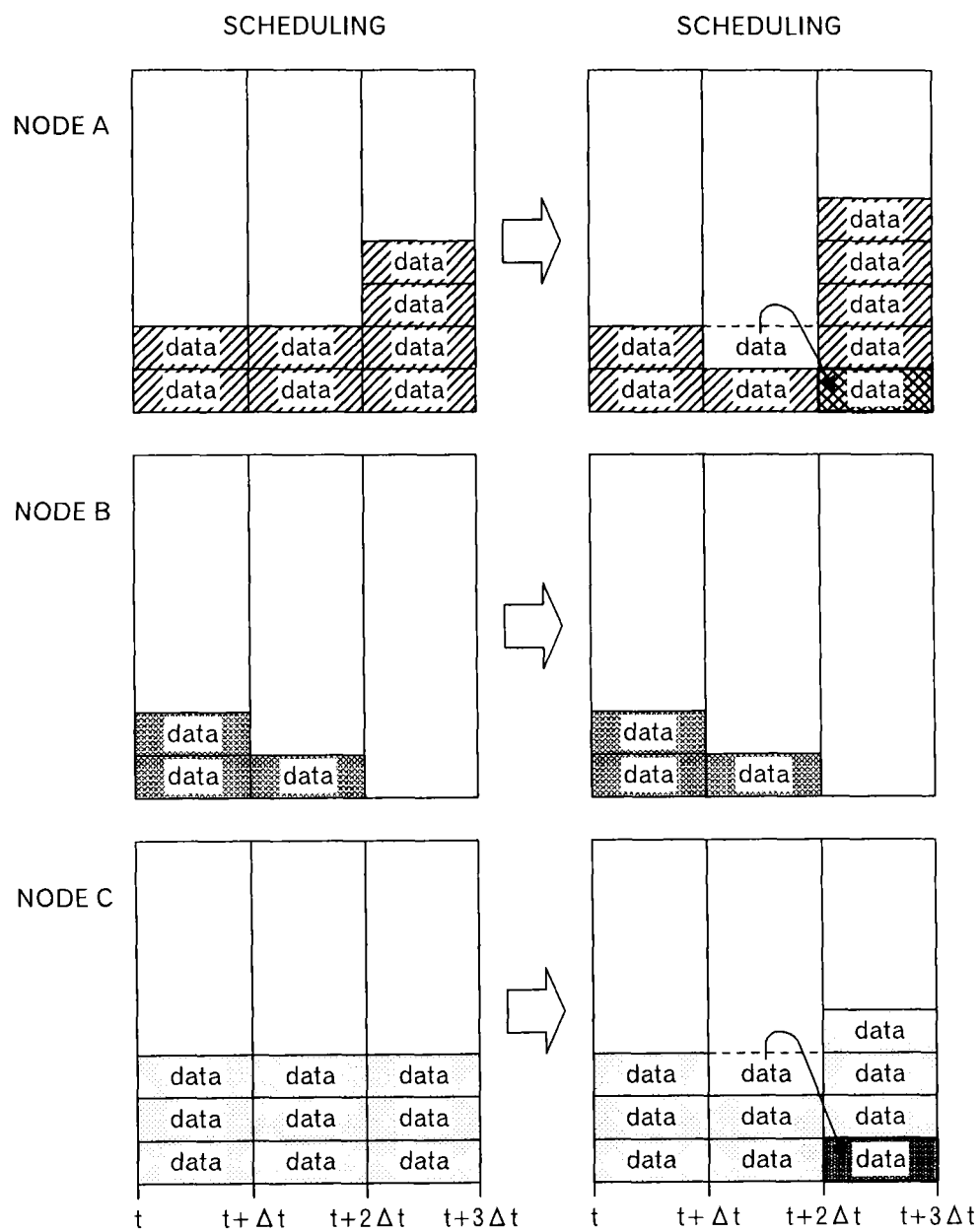
FIG. 60B is a diagram to explain a processing by the rescheduler and the like in the seventh embodiment.

Firstly, for example, as for the node D, FIG. 60A illustrates a state where the data queues 106a to 106c store messages for the transmission destination nodes A, B and C. Therefore, the scheduling requests as illustrated in the left side of FIG. 60B are transmitted to the nodes A, B and C. In the nodes A, B and C in this example, the second scheduler 109 performs the processing to generate the scheduling results as illustrated in the right side of FIG. 60B. The scheduling result in the node A represents that one message (i.e. data block) in the second time slot is moved to the third time slot. Similarly, the scheduling result in the node C represents that one message (i.e. data block) in the second time slot is moved to the third time slot.

Figure 60C:
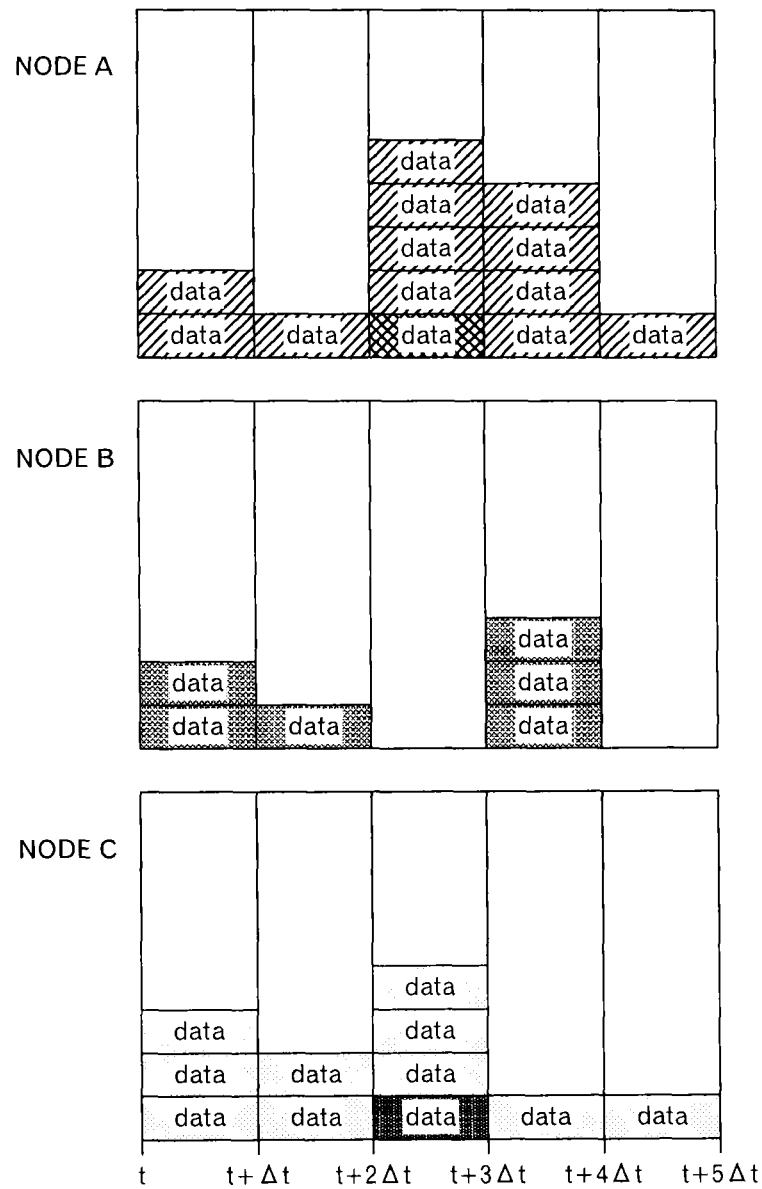
FIG. 60C is a diagram to explain a processing by the rescheduler and the like in the seventh embodiment.

Then, the data queues 106a to 106c in the node D is updated to a state as illustrated in FIG. 60C. However, the number of messages (i.e. data blocks) allocated to the third time slot increases.

Figure 60D:
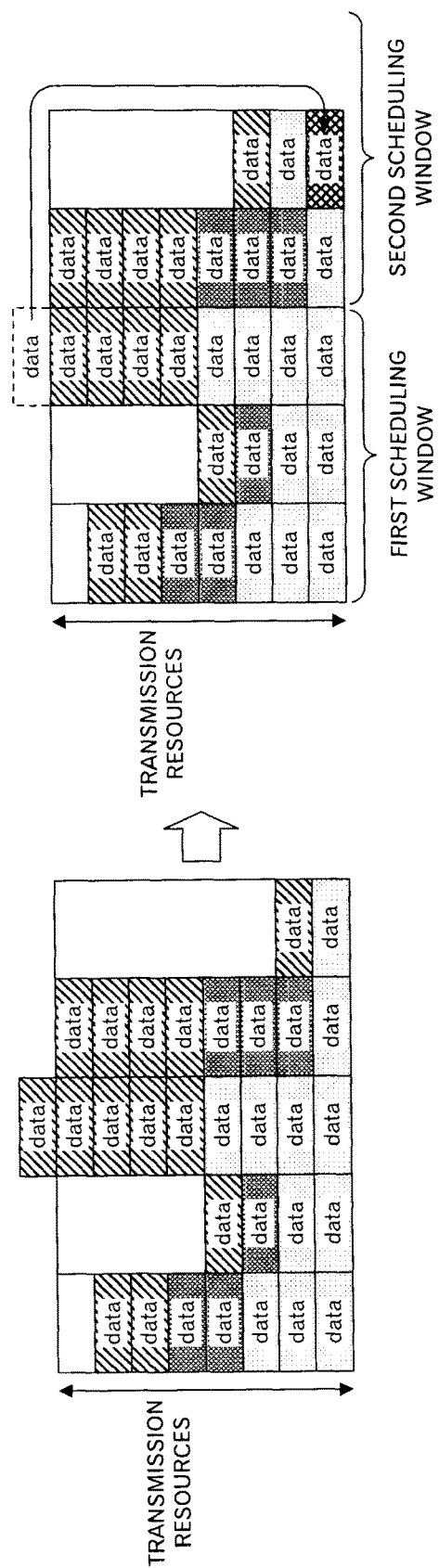
FIG. 60D is a diagram to explain a processing by the rescheduler and the like in the seventh embodiment.

Here, according to the aforementioned processing, the number of messages that will be transmitted to the nodes A to C is counted for each time slot as illustrated in the left side of FIG. 60D. Then, in the third time slot, the transmission of the messages that exceeds the range of the transmission resources is scheduled.

Figure 60E:
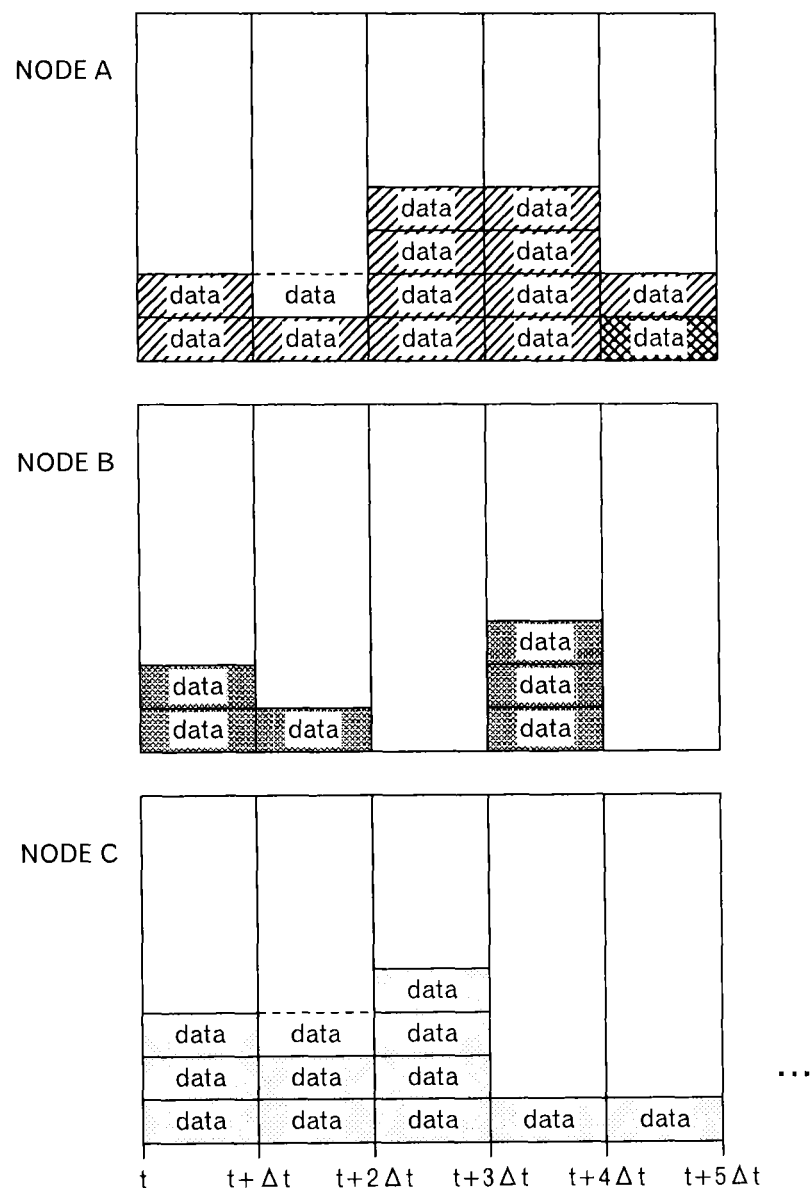
FIG. 60E is a diagram to explain a processing by the rescheduler and the like in the seventh embodiment.

However, all of the messages cannot be transmitted in the third time slot. Therefore, as illustrated in FIG. 60D, in this example, one message (i.e. data block) is moved to another time slot. However, because the scheduling for the first scheduling window has already been performed in other nodes, the message cannot be moved to the time slots included in the first scheduling window. Then, the message is moved to the time slot in the second scheduling window or later. As illustrated in the right side of FIG. 60D, because a vacant resource exists in the fifth time slot, the message (i.e. data block) having the least priority in the third time slot is moved to the fifth time slot. Then, the states of the data queues 106a to 106c for the nodes A to C change to the states as illustrated in FIG. 60E.

Thus, while suppressing the influence to the time slots that have already been scheduled to the minimum, it becomes possible to suppress the delay of the data transmission, which is caused by the congestion and the like.

This embodiment may be modified so as to take into consideration the data size like the second embodiment.

Although the embodiments of this invention were explained above, this invention is not limited to those.

For example, as for the processing flow, as long as the processing results do not change, the turns of the steps may be exchanged or plural steps may be executed in parallel. The functional block configurations are mere examples, and may not correspond to a program module configuration and file configuration.

Furthermore, the aforementioned embodiments may be combined arbitrarily.

Figure 61:
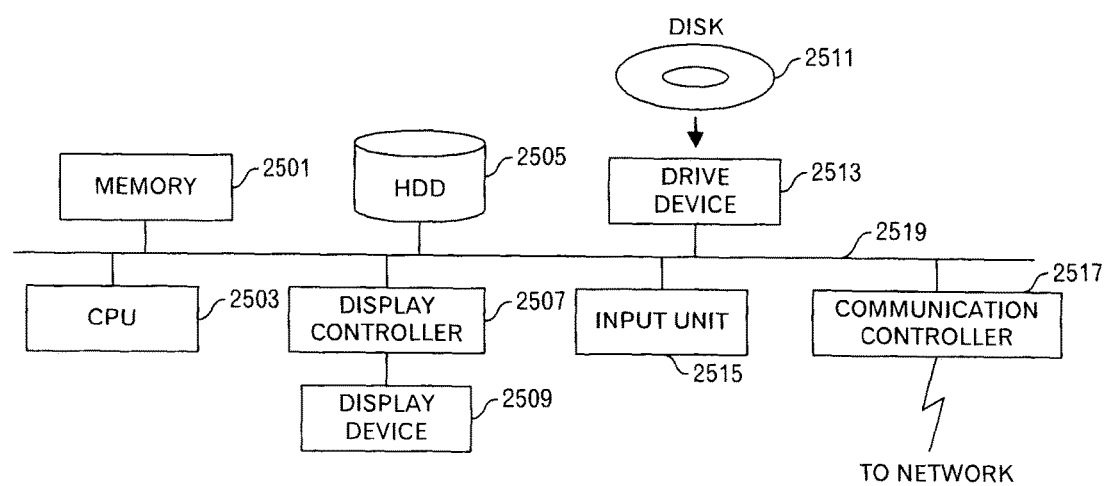
FIG. 61 is a functional block diagram of a computer.

In addition, the aforementioned node is a computer device as illustrated in FIG. 61. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrates in FIG. 61. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An information communication method relating to the embodiments includes: (A) first transmitting, by a first information processing apparatus, a first transmission schedule for one or more data blocks to a second information processing apparatus that is a transmission destination of the one or more data blocks; (B) first receiving, by the second information processing apparatus, the first transmission schedule from the first information processing apparatus; (C) determining, by the second information processing apparatus, a second transmission schedule for at least one data block among the one or more data blocks that are defined in the first transmission schedule, based on the first transmission schedule and receiving resources of the second information processing apparatus; (D) second transmitting, by the second information processing apparatus, the second transmission schedule to the first information processing apparatus; (E) second receiving, by the first information processing apparatus, the second transmission schedule from the second information processing apparatus; and (F) third transmitting, by the first information processing apparatus, one or plural data blocks that are defined in the second transmission schedule, based on the second transmission schedule to the second information processing apparatus.

By performing the aforementioned processing, it is possible to avoid receiving data blocks (e.g. messages) that exceeds receiving resources in the second information processing apparatus that is a receiving side apparatus, and also suppress the delay of the data transmission.

The aforementioned first transmission schedule may be a transmission schedule for plural time slots. Moreover, the aforementioned second transmission schedule may be a transmission schedule for at least one time slot among the plural time slots. Thus, by processing plural time slots together, it is easy to schedule the data transmission so as to avoid receiving data blocks that exceeds the receiving resources.

In addition, the aforementioned determining may include: (c1) prioritizing the one or more data blocks by at least one of a transmission time limit in the first information processing apparatus and an arrival time limit in a destination. Thus, it becomes possible to suppress the delay of the data transmission to the minimum level.

Furthermore, the aforementioned determining may include: (c2) determining, for a certain time slot among the plural time slots, whether a number of data blocks or a data amount of data blocks, which are scheduled to be transmitted in the certain time slot, is equal to or less than a threshold; and (c3) upon determining that the number of data blocks or the data amount of data blocks, which are scheduled to be transmitted in the certain time slot, exceeds the threshold, allocating a first data block that is selected based on a priority among the data blocks, which are scheduled to be transmitted in the certain time slot, to a time slot before or after the certain time slot. According to this processing, it becomes possible to surely receive data blocks (e.g. messages) within a range of the receiving resources.

Moreover, the aforementioned allocating may include: (c31) determining whether the first data block (e.g. data block selected from the top of the priorities) can be allocated to a time slot before the certain time slot; and (c32) upon determining that the first data block can not be allocated to the time slot before the certain time slot, allocating a data block that is selected based on a priority among the data blocks, which are scheduled to be transmitted in the certain time slot (e.g. data block selected from the bottom of the priorities) to a time slot after the certain time slot. Thus, it is possible to suppress the delay caused by changing the transmission schedule to the minimum level.

Furthermore, there may be plural first information processing apparatuses, and time slots that are scheduled in the first transmission schedule may be different among the plural first information processing apparatuses. In such a case, the determining may include: (c4) determining, for a certain time slot among time slots that are defined commonly in first transmission schedules received from the plural first information processing apparatuses, whether a number of data blocks or a data amount of data blocks, which are scheduled to be transmitted in the certain time slot, is equal to or less than a threshold; and (c5) upon determining that the number of data blocks or the data amount of data blocks, which are scheduled to be transmitted in the certain time slot, exceeds the threshold, allocating a data block that is selected based on a priority among the data blocks, which are scheduled to be transmitted in the certain time slot, to a time slot before or after the certain time slot.

When the time slots in the first transmission schedules are different among the first information processing apparatuses that are transmission source of the data blocks, the second transmission schedules are generated while absorbing the difference in the time slots.

Furthermore, the aforementioned information communication method may further include: (G) generating, by the first information processing apparatus, a first transmission schedule according to a transmission time limit of a received data block.

Moreover, the aforementioned information communication method may further include: (H) identifying, by the first information processing apparatus, a time slot in which a received data block is transmitted according to a transmission time limit of the received data block; (I) determining, by the first information processing apparatus, the number of data blocks or a data amount of data blocks, which are to be transmitted in the identified time slot, is equal to or less than a threshold; and (J) upon determining that the number of data blocks or the data amount of data blocks, which are to be transmitted in the identified time slot, exceeds the threshold, allocating a data block that is selected based on a priority among the data blocks, which are to be transmitted in the identified time slot, to a time slot before or after the identified time slot.

By this processing, the transmission of the data blocks (i.e. messages) that exceeds the transmission resources is suppressed.

Furthermore, there may be plural second information processing apparatuses. In such a case, the information communication method may further include: (K) generating a first transmission schedule according to a transmission time limit of a received data block and a destination of the plural second information processing apparatuses. The processing is performed for each transmission destination.

Furthermore, there may be plural second information processing apparatuses. In such a case, the information communication method may further include (L) generating a first transmission schedule according to a transmission time limit of a received data block and a destination of the plural second information processing apparatuses. Moreover, the second receiving may include: (e1) receiving, by the first information processing apparatus, the second transmission schedule from a second information processing apparatus of the plural second information processing apparatuses. In addition, the aforementioned third transmitting may include: (f1) when the received second transmission schedule is different from a first transmission schedule that was transmitted to a second information processing apparatus that is a transmission source of the received second transmission schedule, and when a number of data blocks or a data amount of data blocks, which are to be transmitted in a first time slot in which a difference between the received second transmission schedule and the first transmission schedule is detected, exceeds a threshold, allocating a data block that is selected based on a priority among data blocks that are scheduled to be transmitted in the first time slot to a time slot after the second transmission schedule.

When there are plural second information processing apparatuses, there is a case where the transmission schedule that causes the data transmission that exceeds the transmission resources is defined in the second transmission schedule. Therefore, such a case is properly corrected.

An information processing apparatus that is an upper-side in a data flow has (M) circuitry configured or programmed to transmit a first transmission schedule for one or more data blocks to an information processing apparatus that is a transmission destination of the one or more data blocks and determines a second transmission schedule for at least one data block among the one or more data blocks based on the first transmission schedule and receiving resources of the information processing apparatus; (N) circuitry configured or programmed to receive the second transmission schedule from the information processing apparatus; and (O) circuitry configured or programmed to transmit one or plural data blocks that are defined in the second transmission schedule, based on the second transmission schedule to the information processing apparatus.

An information processing apparatus that is a lower-side on the data flow has (P) circuitry configured or programmed to receive a first transmission schedule for one or more data blocks from an information processing apparatus that will transmit the one or more data blocks; (Q) circuitry configured or programmed to determine a second transmission schedule for at least one data block among the one or more data blocks that are defined in the first transmission schedule, based on the first transmission schedule and receiving resources; and (R) circuitry configured or programmed to transmit the second transmission schedule to the information processing apparatus.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information communication method, comprising:

first transmitting, by a first information processing apparatus, a first transmission schedule including information for one or more data blocks in a plurality of time slots to a second information processing apparatus that is a transmission destination of the one or more data blocks in the plurality of time slots;

first receiving, by the second information processing apparatus, the first transmission schedule from the first information processing apparatus;

determining, by the second information processing apparatus, whether a data amount of data blocks in a certain time slot of the plurality of time slots of the first transmission schedule is greater than an amount of receivable data blocks in the certain time slot;

upon determining that the data amount of the data blocks in the certain time slot is greater than the amount of the receivable data blocks in the certain time slot, determining, by the second information processing apparatus and based on a vacant receiving resource in each time slot, whether it is possible to allocate a first data block that is selected based on a priority among the data blocks in the certain time slot to a time slot before the certain time slot;

upon determining that it is possible to allocate the first data block to the time slot before the certain time slot, allocating, by the second information processing apparatus, the first data block to the time slot before the certain time slot;

upon determining that it is impossible to allocate the first data block to the time slot before the certain time slot, allocating, by the second information processing apparatus, the first data block to a time slot after the certain time slot;

generating, by the second information processing apparatus, a second transmission schedule based on a result of allocation of the first data block, wherein the second transmission schedule includes information for one or more data blocks in at least one time slot of the plurality of time slots, which are allowed to be transmitted from the first information processing apparatus to the second information processing apparatus;

second transmitting, by the second information processing apparatus, the second transmission schedule to the first information processing apparatus;

second receiving, by the first information processing apparatus, the second transmission schedule from the second information processing apparatus; and third transmitting, by the first information processing apparatus, one or a plurality of data blocks that are defined in the second transmission schedule, based on the second transmission schedule to the second information processing apparatus.

2. The information communication method as set forth in claim 1, wherein the generating comprises prioritizing the one or more data blocks in the plurality of time slots by at least one of a transmission time limit in the first information processing apparatus and an arrival time limit in a destination.

3. The information communication method as set forth in claim 1, wherein there are a plurality of first information processing apparatuses, time slots that are defined in the first transmission schedule are different among the plurality of first information processing apparatuses, the certain time slot is a time slot that is defined commonly in first transmission schedules received from the plurality of first information processing apparatuses.

4. The information communication method as set forth in claim 1, further comprising generating, by the first information processing apparatus, the first transmission schedule according to a transmission time limit of a received data block.

5. The information communication method as set forth in claim 1, further comprising:

identifying, by the first information processing apparatus, a time slot in which a received data block is transmitted according to a transmission time limit of the received data block;

determining, by the first information processing apparatus, a data amount of data blocks in the identified time slot is equal to or less than a threshold; and upon determining that the data amount of the data blocks in the identified time slot exceeds the threshold, allocating, by the first information processing apparatus, a data block that is selected based on a priority among the data blocks in the identified time slot to a time slot before or after the identified time slot.

6. The information communication method as set forth in claim 1, wherein there are a plurality of second information processing apparatuses, and the information communication method further comprises generating, by the first information processing apparatus and for each of the plurality of second information processing apparatuses, the first transmission schedule according to a transmission time limit of a data block among received data blocks, which is to be transmitted to the second information processing apparatus.

7. The information communication method as set forth in claim 1, wherein there are a plurality of second information processing apparatuses, the information communication method further comprises generating, by the first information processing apparatus and for each of the plurality of second information processing apparatuses, the first transmission schedule according to a transmission time limit of a data block among received data blocks, which is to be transmitted to the second information processing apparatus, the second receiving comprises receiving the second transmission schedule from a second information processing apparatus of the plurality of second information processing apparatuses, and the third transmitting comprises upon detecting that the received second transmission schedule is different from a first transmission schedule that was transmitted to the second information processing apparatus that is a transmission source of the received second transmission schedule and a data amount of data blocks that are allowed to be transmitted in the received second transmission schedule and are in a first time slot in which a difference between the received second transmission schedule and the first transmission schedule is detected exceeds a threshold, allocating a data block that is selected based on a priority among data blocks in the first time slot to a time slot after the second transmission schedule.

8. A non-transitory computer-readable storage medium storing computer readable instruction, which when executed by one or more processing devices, cause the one or more processing device to perform a method, the method comprising:

receiving a first transmission schedule including information for one or more data blocks in a plurality of time slots from an information processing apparatus that is configured to transmit the one or more data blocks in the plurality of time slots;

determining whether a data amount of data blocks in a certain time slot among the plurality of time slots of the first transmission schedule is greater than an amount of receivable data blocks in the certain time slot;

upon determining that the data amount of the data blocks in the certain time slot is greater than the amount of the receivable data blocks in the certain time slot, determining, based on a vacant receiving resource in each time slot, whether it is possible to allocate a first data block that is selected based on a priority among the data blocks in the certain time slot to a time slot before the certain time slot;

upon determining that it is possible to allocate the first data block to the time slot before the certain time slot, allocating the first data block to a time slot before the certain time slot;

upon determining that it is impossible to allocate the first data block to the time slot before the certain time slot, allocating the first data block to a time slot after the certain time slot;

generating a second transmission schedule based on a result of allocation of the first data block, wherein the second transmission schedule includes information for one or more data blocks in at least one time slot of the plurality of time slots, which are allowed to be transmitted from the information processing apparatus to the computer; and transmitting the second transmission schedule to the information processing apparatus.

9. An information processing apparatus, comprising:
a memory; and
a processor coupled to the memory and configured to:
receive a first transmission schedule including information for one or more data blocks in a plurality of time slots from another information processing apparatus that is configured to transmit the one or more data blocks in the plurality of time slots;
determine whether a data amount of data blocks in a certain time slot among the plurality of time slots of the first transmission schedule is greater than an amount of receivable data blocks in the certain time slot;
upon determining that the data amount of the data blocks in the certain time slot is greater than the amount of the receivable data blocks in the certain time slot, determine, based on a vacant receiving resource in each time slot, whether it is possible to allocate a first data block that is selected based on a priority among the data blocks in the certain time slot to a time slot before the certain time slot;
upon determining that it is possible to allocate the first data block to the time slot before the certain time slot, allocate the first data block to a time slot before the certain time slot;
upon determining that it is impossible to allocate the first data block to the time slot before the certain time slot, allocate the first data block to a time slot after the certain time slot;
generate a second transmission schedule based on a result of allocation of the first data block, wherein the second transmission schedule includes information for one or more data blocks in at least one time slot of the plurality of time slots, which are allowed to be transmitted from the another information processing apparatus to the processing apparatus; and
transmit the second transmission schedule to the another information processing apparatus.

* * * * *